United States Patent
Honda

(10) Patent No.: US 9,581,361 B2
(45) Date of Patent: Feb. 28, 2017

(54) HEAT PUMP SYSTEM

(75) Inventor: Masahiro Honda, Oostende (BE)

(73) Assignee: Daikin Industries, Ltd., Osaka (JP)

( * ) Notice: Subject to any disclaimer, the term of this patent is extended or adjusted under 35 U.S.C. 154(b) by 932 days.

(21) Appl. No.: 13/202,372

(22) PCT Filed: Feb. 22, 2010

(86) PCT No.: PCT/JP2010/001144
§ 371 (c)(1),
(2), (4) Date: Aug. 19, 2011

(87) PCT Pub. No.: WO2010/098061
PCT Pub. Date: Sep. 2, 2010

(65) Prior Publication Data
US 2011/0296861 A1  Dec. 8, 2011

(30) Foreign Application Priority Data
Feb. 24, 2009  (JP) .................................. 2009-041319

(51) Int. Cl.
*F25B 1/00* (2006.01)
*F25B 13/00* (2006.01)
(Continued)

(52) U.S. Cl.
CPC .............. *F25B 13/00* (2013.01); *F24D 3/08* (2013.01); *F24D 3/18* (2013.01); *F24H 6/00* (2013.01);
(Continued)

(58) Field of Classification Search
CPC .. F25B 6/02; F25B 13/00; F25B 30/02; F25B 2700/193; F25B 49/00; F25B 49/022;
(Continued)

(56) References Cited

U.S. PATENT DOCUMENTS

| 2006/0005558 A1* | 1/2006 | Otake et al. ................... 62/260 |
| 2007/0199337 A1 | 8/2007 | Otake et al. |
| 2009/0031739 A1* | 2/2009 | Kasahara et al. ............ 62/196.1 |

FOREIGN PATENT DOCUMENTS

| JP | 60-48468 A | 3/1985 |
| JP | 60-164157 A | 8/1985 |

(Continued)

OTHER PUBLICATIONS

International Search Report of corresponding PCT Application No. PCT/JP2010/001144.
(Continued)

*Primary Examiner* — Larry Furdge
(74) *Attorney, Agent, or Firm* — Global IP Counselors

(57) ABSTRACT

A heat pump system includes a heat source unit, a discharge refrigerant communication tube, a liquid refrigerant communication tube, a gas refrigerant communication tube, a first usage unit and a second usage unit. The first usage unit has a first usage-side heat exchanger capable of functioning as a radiator of the heat-source-side refrigerant introduced from the discharge refrigerant communication tube. The first usage unit is capable of performing operation in which an aqueous medium is heated by radiation of the heat-source-side refrigerant in the first usage-side heat exchanger. The second usage unit has a second usage-side heat exchanger capable of functioning as an evaporator of the heat-source-side refrigerant introduced from the liquid refrigerant communication tube. The second usage unit is capable of performing operation in which an air medium is cooled by evaporation of the heat-source-side refrigerant in the second usage-side heat exchanger.

2 Claims, 23 Drawing Sheets

(51) Int. Cl.
*F24D 3/08* (2006.01)
*F24D 3/18* (2006.01)
*F24H 6/00* (2006.01)
*F25B 47/02* (2006.01)
*F25B 7/00* (2006.01)

(52) U.S. Cl.
CPC ........ *F25B 47/022* (2013.01); *F24D 2200/12* (2013.01); *F25B 7/00* (2013.01); *F25B 2313/003* (2013.01); *F25B 2313/007* (2013.01); *F25B 2313/0231* (2013.01); *F25B 2313/02332* (2013.01); *F25B 2313/02741* (2013.01)

(58) Field of Classification Search
CPC ............ F25B 2600/02; F25B 2600/027; F25B 2600/0271; F25B 2600/272; F25B 2600/17; F25B 2600/19; F25B 2600/21; F25B 2313/029; F25B 2313/0291; F25B 2313/0293; F25B 2313/031; F25B 2313/0311; F25B 2313/0313; F25B 2313/0314; F25B 2313/0315

USPC .......................................................... 62/230
See application file for complete search history.

(56) References Cited

FOREIGN PATENT DOCUMENTS

| | | |
|---|---|---|
| JP | 1-210771 A | 8/1989 |
| JP | 2-169968 A | 6/1990 |
| JP | 7-225064 A | 8/1995 |
| JP | 10-141796 A | 5/1998 |
| JP | 2004-132647 A | 4/2004 |
| JP | WO2006004046 A1 * | 1/2006 |
| JP | 2007-232225 A | 9/2007 |
| JP | 2008032376 A * | 2/2008 ............. F24D 17/00 |

OTHER PUBLICATIONS

International Preliminary Report of corresponding PCT Application No. PCT/JP2010/001144.

* cited by examiner

HEAT PUMP SYSTEM

CROSS-REFERENCE TO RELATED APPLICATIONS

This U.S. National stage application claims priority under 35 U.S.C. §119(a) to Japanese Patent Application No. 2009-041319, filed in Japan on Feb. 24, 2009, the entire contents of which are hereby incorporated herein by reference.

TECHNICAL FIELD

The present invention relates to a heat pump system, and particularly relates to a heat pump system capable of heating an aqueous medium by utilizing a heat pump cycle.

BACKGROUND ART

Heat pump water heaters, such as the one described in Japanese Laid-open Patent Publication No. 60-164157 are known which are capable of utilizing a heat pump cycle to heat water. Such a heat pump water heater has primarily a compressor, a refrigerant/water heat exchanger, and a heat-source-side heat exchanger, and is configured so that water is heated by the radiation of refrigerant in the refrigerant/water heat exchanger, and the hot water thereby obtained is fed to a storage tank.

SUMMARY

In the conventional heat pump water heater described above, since operation is performed for cooling outside air as the heat source in the heat-source-side heat exchanger, an energy-saving heat pump system can be obtained by enabling the heat of cooling obtained by the refrigerant to be utilized for another application.

An object of the present invention is to obtain energy-saving effects in a heat pump system capable of heating an aqueous medium by utilizing a heat pump cycle.

A heat pump system according to a first aspect of the present invention comprises a heat source unit, a discharge refrigerant communication tube, a liquid refrigerant communication tube, a gas refrigerant communication tube, a first usage unit, and a second usage unit. The heat source unit has a heat-source-side compressor for compressing a heat-source-side refrigerant; a heat-source-side heat exchanger; and a heat-source-side switching mechanism capable of switching between a heat-source-side radiating operation state for causing the heat-source-side heat exchanger to function as a radiator of a heat-source-side refrigerant, and a heat-source-side evaporating operation state for causing the heat-source-side heat exchanger to function as an evaporator of the heat-source-side refrigerant. The discharge refrigerant communication tube is capable of directing the heat-source-side refrigerant to the outside of the heat source unit from a discharge of the heat-source-side compressor in the heat-source-side radiating operation state and the heat-source-side evaporating operation state of the heat-source-side switching mechanism. The liquid refrigerant communication tube is capable of directing the heat-source-side refrigerant to the outside of the heat source unit from an outlet of the heat-source-side heat exchanger functioning as a radiator of the heat-source-side refrigerant in the heat-source-side radiating operation state of the heat-source-side switching mechanism, and of introducing the heat-source-side refrigerant into an inlet of the heat-source-side heat exchanger functioning as an evaporator of the heat-source-side refrigerant from outside the heat source unit in the heat-source-side evaporating operation state of the heat-source-side switching mechanism. The gas refrigerant communication tube is capable of introducing the heat-source-side refrigerant into an intake of the heat-source-side compressor from outside the heat source unit. The first usage unit is connected to the discharge refrigerant communication tube and the liquid refrigerant communication tube, and has a first usage-side heat exchanger capable of functioning as a radiator of the heat-source-side refrigerant introduced from the discharge refrigerant communication tube, and the first usage unit is capable of directing the heat-source-side refrigerant radiated in the first usage-side heat exchanger to the liquid refrigerant communication tube, and performing operation in which an aqueous medium is heated by radiation of the heat-source-side refrigerant in the first usage-side heat exchanger. The second usage unit is connected to the liquid refrigerant communication tube and the gas refrigerant communication tube, and has a second usage-side heat exchanger capable of functioning as an evaporator of the heat-source-side refrigerant introduced from the liquid refrigerant communication tube in the heat-source-side radiating operation state of the heat-source-side switching mechanism, and the second usage unit is capable of performing operation in which directing the heat-source-side refrigerant evaporated in the second usage-side heat exchanger to the gas refrigerant communication tube and an air medium is cooled by evaporation of the heat-source-side refrigerant in the second usage-side heat exchanger.

In this heat pump system, not only can operation be performed for heating an aqueous medium by radiation of the heat-source-side refrigerant in the first usage-side heat exchanger, but operation is performed for heating the aqueous medium by radiation of the heat-source-side refrigerant in the first usage-side heat exchanger, and it is possible to utilize the heat of cooling obtained by the heat-source-side refrigerant by heating of the aqueous medium for operation in which an air medium is cooled by evaporation of the heat-source-side refrigerant in the second usage-side heat exchanger. Therefore, in such cases as when the aqueous medium heated in the first usage unit is used to supply hot water, and the air medium cooled in the second usage unit is used for indoor air cooling, for example, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

A heat pump system according to a second aspect of the present invention is the heat pump system according to the first aspect, wherein the first usage unit performs operation in which the aqueous medium is heated by radiation of the heat-source-side refrigerant in the first usage-side heat exchanger when the second usage unit performs operation in which the air medium is cooled by evaporation of the heat-source-side refrigerant in the second usage-side heat exchanger.

In this heat pump system, the second usage unit performs operation in which an air medium is cooled by evaporation of the heat-source-side refrigerant in the second usage-side heat exchanger, and it is possible to utilize the heat obtained by the heat-source-side refrigerant by cooling of the air medium for operation in which the aqueous medium is heated by radiation of the heat-source-side refrigerant in the first usage-side heat exchanger in the first usage unit, as needed.

A heat pump system according to a third aspect of the present invention is the heat pump system according to the second aspect, further comprising a hot-water storage unit for storing the aqueous medium heated in the first usage unit, or the aqueous medium heated by heat exchange with the aqueous medium heated in the first usage unit; wherein the first usage unit performs operation in which the aqueous medium is heated by radiation of the heat-source-side refrigerant in the first usage-side heat exchanger in a case in which the hot-water storage temperature, which is the temperature of the aqueous medium stored in the hot-water storage unit, is equal to or less than a predetermined set temperature for hot-water storage.

In this heat pump system, since the second usage unit performs operation in which the air medium is cooled by evaporation of the heat-source-side refrigerant in the second usage-side heat exchanger, and the first usage unit is configured so that operation is performed for heating the aqueous medium by radiation of the heat-source-side refrigerant in the first usage-side heat exchanger in a case in which the hot-water storage temperature is equal to or less than the set temperature for hot-water storage, the hot-water storage temperature can be kept equal to or higher than the set temperature for hot-water storage, while the heat obtained by the heat-source-side refrigerant by cooling of the air medium is effectively utilized.

A heat pump system according to a fourth aspect of the present invention is the heat pump system according to any of the first through third aspects, wherein the gas refrigerant communication tube is capable of introducing the heat-source-side refrigerant to an intake of the heat-source-side compressor from outside the heat source unit in the heat-source-side radiating operation state of the heat-source-side switching mechanism, and of directing the heat-source-side refrigerant to the outside of the heat source unit from a discharge of the heat-source-side compressor in the heat-source-side evaporating operation state of the heat-source-side switching mechanism; and the second usage unit is capable of performing operation in which the second usage-side heat exchanger functions as a radiator of the heat-source-side refrigerant introduced from the gas refrigerant communication tube in the heat-source-side evaporating operation state of the heat-source-side switching mechanism, the heat-source-side refrigerant radiated in the second usage-side heat exchanger is directed to the liquid refrigerant communication tube, and the air medium is heated by radiation of the heat-source-side refrigerant in the second usage-side heat exchanger.

In this heat pump system, in the heat-source-side radiating operation state of the heat-source-side switching mechanism, operation can be performed for cooling the air medium by evaporation of the heat-source-side refrigerant in the second usage-side heat exchanger, and in the heat-source-side evaporating operation state of the heat-source-side switching mechanism, operation can be performed for heating the air medium by radiation of the heat-source-side refrigerant in the second usage-side heat exchanger. Therefore, the aqueous medium heated in the first usage unit can be used to supply hot water, and the second usage unit can be used for indoor air cooling or air warming, for example.

A heat pump system according to a fifth aspect of the present invention is the heat pump system according to any of the first through fourth aspects, wherein the first usage unit is further connected to the gas refrigerant communication tube, and a usage-side switching mechanism is further provided which is capable of switching between an aqueous-medium heating operation state in which the first usage-side heat exchanger functions as a radiator of the heat-source-side refrigerant introduced from the discharge refrigerant communication tube, and an aqueous-medium cooling operation state in which the first usage-side heat exchanger functions as an evaporator of the heat-source-side refrigerant introduced from the liquid refrigerant communication tube. The first usage unit is capable of performing operation in which the heat-source-side refrigerant radiated in the first usage-side heat exchanger is directed to the liquid refrigerant communication tube, and the aqueous medium is heated by radiation of the heat-source-side refrigerant in the first usage-side heat exchanger in the aqueous-medium heating operation state of the usage-side switching mechanism; and of performing operation in which the heat-source-side refrigerant evaporated in the first usage-side heat exchanger is directed to the gas refrigerant communication tube, and the aqueous medium is cooled by evaporation of the heat-source-side refrigerant in the first usage-side heat exchanger in the aqueous-medium cooling operation state of the usage-side switching mechanism.

In this heat pump system, it is possible to switch between operation in which the aqueous medium is heated by radiation of the heat-source-side refrigerant in the first usage-side heat exchanger, and operation in which the aqueous medium is cooled by evaporation of the heat-source-side refrigerant in the first usage-side heat exchanger. It is also possible to perform operation in which the air medium is cooled by evaporation of the heat-source-side refrigerant in the second usage-side heat exchanger, and operation in which the aqueous medium is cooled by evaporation of the heat-source-side refrigerant in the first usage-side heat exchanger. It is therefore possible to provide comfortable air conditioning by a combination of the first usage unit and the second usage unit, whereby the air medium cooled in the second usage unit is used for indoor air cooling while the aqueous medium cooled in the first usage unit is used in a radiator, a floor air-warming panel, or the like, for example.

A heat pump system according to a sixth aspect of the present invention is the heat pump system according to the fourth aspect, wherein the first usage unit is further connected to the gas refrigerant communication tube, and a usage-side switching mechanism is further provided which is capable of switching between an aqueous-medium heating operation state in which the first usage-side heat exchanger functions as a radiator of the heat-source-side refrigerant introduced from the discharge refrigerant communication tube, and an aqueous-medium cooling operation state in which the first usage-side heat exchanger functions as an evaporator of the heat-source-side refrigerant introduced from the liquid refrigerant communication tube. The first usage unit is capable of performing operation in which the heat-source-side refrigerant radiated in the first usage-side heat exchanger is directed to the liquid refrigerant communication tube, and the aqueous medium is heated by radiation of the heat-source-side refrigerant in the first usage-side heat exchanger in the aqueous-medium heating operation state of the usage-side switching mechanism; and of performing operation in which the heat-source-side refrigerant evaporated in the first usage-side heat exchanger is directed to the gas refrigerant communication tube, and the aqueous medium is cooled by evaporation of the heat-source-side refrigerant in the first usage-side heat exchanger in the aqueous-medium cooling operation state of the usage-side switching mechanism; and defrosting operation is performed in which the heat-source-side heat exchanger is caused to function as a radiator of the heat-source-side refrigerant, and the second usage-side heat exchanger is caused to function as an evaporator of the heat-source-side refrigerant by placing the heat-source-side switching mechanism in the heat-source-side radiating operation state, and the first usage-side heat exchanger is caused to function as an evaporator of the heat-source-side refrigerant by placing the usage-side switching mechanism in the aqueous-medium cooling operation state in a case in which defrosting of the heat-source-side heat exchanger is determined to be necessary.

In this heat pump system, during defrosting of the heat-source-side heat exchanger, since the second usage-side heat exchanger is caused to function as an evaporator of the heat-source-side refrigerant, and the first usage-side heat exchanger is caused to function as an evaporator of the heat-source-side refrigerant, the defrosting operation time can be reduced in comparison with a case in which only the second usage-side heat exchanger is caused to function as an evaporator of the heat-source-side refrigerant, and it is possible to prevent the air medium cooled in the second usage unit from reaching a low temperature.

A heat pump system according to a seventh aspect of the present invention is the heat pump system according to the sixth aspect, wherein functioning of the first usage-side heat exchanger as an evaporator of the heat-source-side refrigerant is stopped in a case in which the temperature of the aqueous medium cooled by evaporation of the heat-source-side refrigerant in the first usage-side heat exchanger is equal to or less than a predetermined freezing-lower-limit temperature during the defrosting operation.

In this heat pump system, functioning of the first usage-side heat exchanger as an evaporator of the heat-source-side refrigerant is stopped in a case in which the temperature of the aqueous medium cooled by evaporation of the heat-source-side refrigerant in the first usage-side heat exchanger is equal to or less than a predetermined freezing-lower-limit temperature during the defrosting operation. The aqueous medium can therefore be prevented from freezing due to the defrosting operation.

A heat pump system according to an eighth aspect of the present invention is the heat pump system according to the sixth aspect, further comprising a first usage-side flow rate adjustment valve capable of varying the flow rate of the heat-source-side refrigerant that flows through the first usage-side heat exchanger. In this heat pump system, during the defrosting operation, control is performed to reduce the opening degree of the first usage-side flow rate adjustment valve in a case in which the temperature of the aqueous medium cooled by evaporation of the heat-source-side refrigerant in the first usage-side heat exchanger is equal to or less than a predetermined freeze-warning temperature, and in a case in which a defrosting operation time, which is the elapsed time from the start of defrosting operation, is equal to or less than a predetermined defrosting operation set time, and defrosting of the heat-source-side heat exchanger is not completed, a predetermined defrosting time interval setting value until the start of the next defrosting of the heat-source-side heat exchanger is reduced.

In this heat pump system, control is performed to reduce the opening degree of the first usage-side flow rate adjustment valve in a case in which the temperature of the aqueous medium cooled by evaporation of the heat-source-side refrigerant in the first usage-side heat exchanger is equal to or less than the freeze-warning temperature during the defrosting operation. The defrosting operation can therefore be continued while the aqueous medium is prevented from freezing.

However, when such control is performed to reduce the opening degree of the first usage-side flow rate adjustment valve, although it is possible to prevent the aqueous medium from freezing, the heat-source-side heat exchanger is not adequately defrosted, and ice remains, and repeating such a defrosting operation causes ice-up in which ice forms in the heat-source-side heat exchanger, and the heat-source-side heat exchanger may no longer function adequately as an evaporator of the heat-source-side refrigerant.

Therefore, in this heat pump system, in addition to controlling the first usage-side flow rate adjustment valve, the defrosting time interval setting value until the start of the next defrosting of the heat-source-side heat exchanger is reduced in a case in which defrosting of the heat-source-side heat exchanger is not completed in a time equal to or less than the defrosting operation setting time. Defrosting operation can thereby be performed while the aqueous medium is prevented from freezing, and icing up is suppressed.

A heat pump system according to a ninth aspect of the present invention is the heat pump system according to any of the fifth through eighth aspects, further comprising a first refrigerant recovery mechanism for communicating the discharge refrigerant communication tube and the gas refrigerant communication tube in any of the aqueous medium heating operation state and the aqueous medium cooling operation state of the usage-side switching mechanism.

In a configuration such as that of the heat pump system according to any of the fifth through eighth aspects, which is further provided with a usage-side switching mechanism capable of switching between an aqueous medium heating operation state in which the first usage-side heat exchanger is caused to function as a radiator of the heat-source-side refrigerant introduced from the discharge refrigerant communication tube, and an aqueous medium cooling operation state in which the first usage-side heat exchanger is caused to function as an evaporator of the heat-source-side refrigerant introduced from the liquid refrigerant communication tube, in a case in which the first usage unit operates so as to cool the aqueous medium by evaporation of the heat-source-side refrigerant, operation of the first usage unit is stopped, and the second usage unit operates (i.e., in a case of operation not using the discharge refrigerant communication tube), the heat-source-side refrigerant discharged from the heat-source-side compressor may stagnate in the discharge refrigerant communication tube, and the flow rate of the heat-source-side refrigerant taken into the heat-source-side compressor may be inadequate (i.e., the refrigerant circulation rate may be inadequate).

Therefore, in this heat pump system, by providing the first refrigerant recovery mechanism for communicating the discharge refrigerant communication tube and the gas refrigerant communication tube in any of the aqueous medium heating operation state and the aqueous medium cooling operation state of the usage-side switching mechanism, the heat-source-side refrigerant is less prone to stagnate in the discharge refrigerant communication tube, and the occurrence of an inadequate refrigerant circulation rate can thereby be suppressed.

A heat pump system according to a tenth aspect of the present invention is the heat pump system according to any of the fifth through ninth aspects, further comprising a second refrigerant recovery mechanism for communicating the first usage-side heat exchanger and the gas refrigerant communication tube in any of the aqueous medium heating operation state and the aqueous medium cooling operation state of the usage-side switching mechanism.

In a configuration such as that of the heat pump system according to any of the fifth through ninth aspects, which is further provided with a usage-side switching mechanism capable of switching between an aqueous medium heating operation state in which the first usage-side heat exchanger is caused to function as a radiator of the heat-source-side refrigerant introduced from the discharge refrigerant communication tube, and an aqueous medium cooling operation state in which the first usage-side heat exchanger is caused to function as an evaporator of the heat-source-side refrigerant introduced from the liquid refrigerant communication tube, in a case in which operation of the first usage unit is stopped, and the second usage unit operates, the heat-source-side refrigerant may stagnate in the first usage-side heat exchanger, and the flow rate of the heat-source-side refrigerant taken into the heat-source-side compressor may be inadequate (i.e., the refrigerant circulation rate may be inadequate).

Therefore, in this heat pump system, by providing the second refrigerant recovery mechanism for communicating the first usage-side heat exchanger and the gas refrigerant communication tube in any of the aqueous medium heating operation state and the aqueous medium cooling operation state of the usage-side switching mechanism, the heat-source-side refrigerant is less prone to stagnate in the first usage-side heat exchanger, and the occurrence of an inadequate refrigerant circulation rate can thereby be suppressed.

A heat pump system according to an eleventh aspect of the present invention is the heat pump system according to any of the fifth through tenth aspects, wherein refrigerant recovery operation is performed in which the usage-side switching mechanism is placed in the aqueous medium heating operation state, and the first usage-side heat exchanger is thereby caused to function as a radiator of the heat-source-side refrigerant in a case in which the flow rate of the heat-source-side refrigerant taken into the heat-source-side compressor is determined to be inadequate in a case in which the usage-side switching mechanism is in the aqueous medium cooling operation state and the second usage unit is at least operating.

In a configuration such as that of the heat pump system according to any of the fifth through tenth aspects, which is further provided with a usage-side switching mechanism capable of switching between an aqueous medium heating operation state in which the first usage-side heat exchanger is caused to function as a radiator of the heat-source-side refrigerant introduced from the discharge refrigerant communication tube, and an aqueous medium cooling operation state in which the first usage-side heat exchanger is caused to function as an evaporator of the heat-source-side refrigerant introduced from the liquid refrigerant communication tube, in a case in which the first usage unit operates so as to cool the aqueous medium by evaporation of the heat-source-side refrigerant, operation of the first usage unit is stopped, and the second usage unit operates, the heat-source-side refrigerant discharged from the heat-source-side compressor may stagnate in the discharge refrigerant communication tube, and the flow rate of the heat-source-side refrigerant taken into the heat-source-side compressor may be inadequate (i.e., the refrigerant circulation rate may be inadequate). In a case in which operation of the first usage unit is stopped, and the second usage unit operates, the heat-source-side refrigerant may stagnate in the first usage-side heat exchanger, and the flow rate of the heat-source-side refrigerant taken into the heat-source-side compressor may be inadequate (i.e., the refrigerant circulation rate may be inadequate).

Therefore, in this heat pump system, refrigerant recovery operation is performed in which the usage-side switching mechanism is placed in the aqueous medium heating operation state, and the first usage-side heat exchanger is thereby caused to function as a radiator of the heat-source-side refrigerant in a case in which the flow rate of the heat-source-side refrigerant taken into the heat-source-side compressor is determined to be inadequate in a case in which the usage-side switching mechanism is in the aqueous medium cooling operation state and the second usage unit is at least operating. The heat-source-side refrigerant is thereby made less prone to stagnate in the discharge refrigerant communication tube, and the heat-source-side refrigerant is made less prone to stagnate in the first usage-side heat exchanger. The occurrence of an inadequate refrigerant circulation rate can thereby be suppressed.

A heat pump system according to a twelfth aspect of the present invention is the heat pump system according to any of the first through eleventh aspects, wherein the first usage-side heat exchanger is a heat exchanger for exchanging heat between the heat-source-side refrigerant and the aqueous medium.

A heat pump system according to a thirteenth aspect of the present invention is the heat pump system according to the twelfth aspect, further comprising an aqueous medium circuit through which circulates an aqueous medium for exchanging heat with the heat-source-side refrigerant in the first usage-side heat exchanger, the aqueous medium circuit having a variable-capacity circulation pump. In this heat pump system, the capacity of the circulation pump is controlled so that the flow rate of the aqueous medium circulated through the aqueous medium circuit decreases in a case in which a heat-source-side outlet/inlet pressure difference, which is the difference between the pressure of the heat-source-side refrigerant in the discharge of the heat-source-side compressor and the pressure of the heat-source-side refrigerant in the intake of the heat-source-side compressor, is equal to or less than a predetermined heat-source-side low differential pressure protection pressure difference.

In a configuration in which the aqueous medium is circulated through an aqueous medium circuit, under operating conditions in which the temperature of the aqueous medium is low, such as immediately after the start of operation by the first usage unit, the pressure of the heat-source-side refrigerant in the discharge of the heat-source-side compressor decreases, the heat-source-side outlet/inlet pressure difference decreases, and lubrication deficiency may occur due to poor circulation of the refrigeration machine oil in the heat-source-side compressor.

However, when the capacity of the circulation pump is controlled so that the flow rate of the aqueous medium circulated through the aqueous medium circuit increases, the temperature of the aqueous medium flowing through the first usage-side heat exchanger is less prone to increase, and the heat-source-side outlet/inlet pressure difference is prevented from increasing.

Therefore, in this heat pump system, since a variable-capacity circulation pump is provided, and the capacity of the circulation pump is controlled so that the flow rate of the aqueous medium circulated through the aqueous medium circuit decreases in a case in which a heat-source-side outlet/inlet pressure difference, which is the difference between the pressure of the heat-source-side refrigerant in the discharge of the heat-source-side compressor and the pressure of the heat-source-side refrigerant in the intake of the heat-source-side compressor, is equal to or less than a predetermined heat-source-side low differential pressure protection pressure difference, the heat-source-side compressor is not forced to operate unstably, the heat-source-side outlet/inlet pressure difference is maintained, and lubrication deficiency in the heat-source-side compressor can be suppressed even in a case in which the temperature of the aqueous medium is low, and the heat-source-side outlet/inlet pressure difference is prone to decrease, such as immediately after the start of operation by the first usage unit.

A heat pump system according to a fourteenth aspect of the present invention is the heat pump system according to the thirteenth aspect, wherein the capacity of the circulation pump is controlled so that the aqueous medium outlet/inlet temperature difference, which is the difference between the temperature of the aqueous medium in an outlet of the first usage-side heat exchanger and the temperature of the aqueous medium in an inlet of the first usage-side heat exchanger, is equal to a predetermined target aqueous medium outlet/inlet temperature difference in a case in which the heat-source-side outlet/inlet pressure difference is greater than the heat-source-side low differential pressure protection pressure difference.

In this heat pump system, the capacity of the circulation pump is controlled so that the aqueous medium outlet/inlet temperature difference, which is the difference between the temperature of the aqueous medium in an outlet of the first usage-side heat exchanger and the temperature of the aqueous medium in an inlet of the first usage-side heat exchanger, is equal to a predetermined target aqueous medium outlet/inlet temperature difference in a case in which the heat-source-side outlet/inlet pressure difference is greater than the heat-source-side low differential pressure protection pressure difference, and lubrication deficiency is not prone to occur in the heat-source-side compressor. The heat pump system can therefore operate in conditions suited to the heat exchange capability of the first usage-side heat exchanger.

A heat pump system according to a fifteenth aspect of the present invention is the heat pump system according to the fourteenth aspect, wherein the target aqueous medium outlet/inlet temperature difference is increased in a case in which the heat-source-side outlet/inlet pressure difference is equal to or less than the heat-source-side low differential pressure protection pressure difference.

In this heat pump system, the flow rate of the aqueous medium circulated through the aqueous medium circuit is reduced by increasing the target aqueous medium outlet/inlet temperature difference in the control of the capacity of the circulation pump, which is performed to make the aqueous medium outlet/inlet temperature difference equal to the target aqueous medium outlet/inlet temperature difference. Control of the capacity of the circulation pump can therefore be employed which makes the aqueous medium outlet/inlet temperature difference equal to the target aqueous medium outlet/inlet temperature difference regardless of whether the heat-source-side outlet/inlet pressure difference is equal to or less than the heat-source-side low differential pressure protection pressure difference.

A heat pump system according to a sixteenth aspect of the present invention is the heat pump system according to any of the first through eleventh aspects, wherein the first usage-side heat exchanger is a heat exchanger for exchanging heat with the heat-source-side refrigerant introduced from the discharge refrigerant communication tube and a usage-side refrigerant other than the heat-source-side refrigerant; and the first usage unit further has a usage-side compressor for compressing the usage-side refrigerant; and a refrigerant/water heat exchanger which is capable of functioning as a radiator of the usage-side refrigerant and heating the aqueous medium; and the first usage unit together with the first usage-side heat exchanger constitute a usage-side refrigerant circuit for circulating the usage-side refrigerant.

In this heat pump system, in the first usage-side heat exchanger, the usage-side refrigerant circulated through the usage-side refrigerant circuit is heated by radiation of the heat-source-side refrigerant, the usage-side refrigerant circuit utilizes the heat obtained from the heat-source-side refrigerant, and a refrigeration cycle is obtained which has a higher temperature than the refrigeration cycle in the refrigerant circuit through which the heat-source-side refrigerant circulates. A high-temperature aqueous medium can therefore be obtained by radiation of the usage-side refrigerant in the refrigerant/water heat exchanger.

A heat pump system according to a seventeenth aspect of the present invention is the heat pump system according to the sixteenth aspect, further comprising an aqueous medium circuit through which circulates an aqueous medium for exchanging heat with the usage-side refrigerant in the refrigerant/water heat exchanger, the aqueous medium circuit having a variable-capacity circulation pump. In this heat pump system, the capacity of the circulation pump is controlled so that the flow rate of the aqueous medium circulated through the aqueous medium circuit decreases in a case in which a usage-side outlet/inlet pressure difference, which is the difference between the pressure of the usage-side refrigerant in the discharge of the usage-side compressor and the pressure of the usage-side refrigerant in the intake of the usage-side compressor, is equal to or less than a predetermined usage-side low differential pressure protection pressure difference.

In a configuration in which the aqueous medium is circulated through an aqueous medium circuit, under operating conditions in which the temperature of the aqueous medium is low, such as immediately after the start of operation by the first usage unit, the pressure of the usage-side refrigerant in the discharge of the usage-side compressor decreases, the usage-side outlet/inlet pressure difference decreases, and lubrication deficiency may occur due to poor circulation of the refrigeration machine oil in the usage-side compressor.

However, when the capacity of the circulation pump is controlled so that the flow rate of the aqueous medium circulated through the aqueous medium circuit increases, the temperature of the aqueous medium flowing through the refrigerant/water heat exchanger is less prone to increase, and the usage-side outlet/inlet pressure difference is prevented from increasing.

Therefore, in this heat pump system, by providing a variable-capacity circulation pump and controlling the capacity of the circulation pump so that the flow rate of the aqueous medium circulating through the aqueous medium circuit decreases in a case in which the usage-side outlet/inlet pressure difference, which is the difference between the pressure of the usage-side refrigerant in the discharge of the usage-side compressor and the pressure of the usage-side refrigerant in the intake of the usage-side compressor, is equal to or less than a predetermined usage-side low differential pressure protection pressure difference, the usage-side compressor is not forced to operate unstably, the usage-side outlet/inlet pressure difference is maintained, and lubrication deficiency in the usage-side compressor can be suppressed even in a case in which the temperature of the aqueous medium is low, and the usage-side outlet/inlet pressure difference is prone to decrease, such as immediately after the start of operation by the first usage unit.

A heat pump system according to an eighteenth aspect of the present invention is the heat pump system according to the seventeenth aspect, wherein the capacity of the circulation pump is controlled so that the aqueous medium outlet/inlet temperature difference, which is the difference between the temperature of the aqueous medium in an outlet of the refrigerant/water heat exchanger and the temperature of the aqueous medium in an inlet of the refrigerant/water heat exchanger, is equal to a predetermined target aqueous medium outlet/inlet temperature difference in a case in which the usage-side outlet/inlet pressure difference is greater than the usage-side low differential pressure protection pressure difference.

In this heat pump system, the capacity of the circulation pump is controlled so that the aqueous medium outlet/inlet temperature difference, which is the difference between the temperature of the aqueous medium in an outlet of the refrigerant/water heat exchanger and the temperature of the aqueous medium in an inlet of the refrigerant/water heat exchanger, is equal to a predetermined target aqueous medium outlet/inlet temperature difference in a case in which the usage-side outlet/inlet pressure difference is greater than the usage-side low differential pressure protection pressure difference, and lubrication deficiency is not prone to occur in the usage-side compressor. The heat pump system can therefore operate in conditions suited to the heat exchange capability of the refrigerant/water heat exchanger.

A heat pump system according to a nineteenth aspect of the present invention is the heat pump system according to the eighteenth aspect, wherein the target aqueous medium outlet/inlet temperature difference is increased in a case in which the usage-side outlet/inlet pressure difference is equal to or less than the usage-side low differential pressure protection pressure difference.

In this heat pump system, the flow rate of the aqueous medium circulated through the aqueous medium circuit is reduced by increasing the target aqueous medium outlet/inlet temperature difference in the control of the capacity of the circulation pump, which is performed to make the aqueous medium outlet/inlet temperature difference equal to the target aqueous medium outlet/inlet temperature difference. Control of the capacity of the circulation pump can therefore be employed which makes the aqueous medium outlet/inlet temperature difference equal to the target aqueous medium outlet/inlet temperature difference regardless of whether the usage-side outlet/inlet pressure difference is equal to or less than the usage-side low differential pressure protection pressure difference.

A heat pump system according to a twentieth aspect of the present invention is the heat pump system according to any of the first through nineteenth aspects, wherein a plurality of the second usage unit are connected to each other in parallel via the liquid refrigerant communication tube and the gas refrigerant communication tube.

In this heat pump system, it is possible to adapt to a plurality of locations and/or applications in which cooling of an air medium is necessary.

A heat pump system according to a twenty-first aspect of the present invention is the heat pump system according to any of the first through twentieth aspects, wherein a plurality of the first usage unit are connected to each other in parallel via the discharge refrigerant communication tube and the liquid refrigerant communication tube.

In this heat pump system, it is possible to adapt to a plurality of locations and/or applications in which heating of an aqueous medium is necessary.

DESCRIPTION OF EMBODIMENTS

Embodiments of the heat pump system according to the present invention will be described based on the drawings.

First Embodiment

Configuration

—Overall Configuration—

Figure 1:
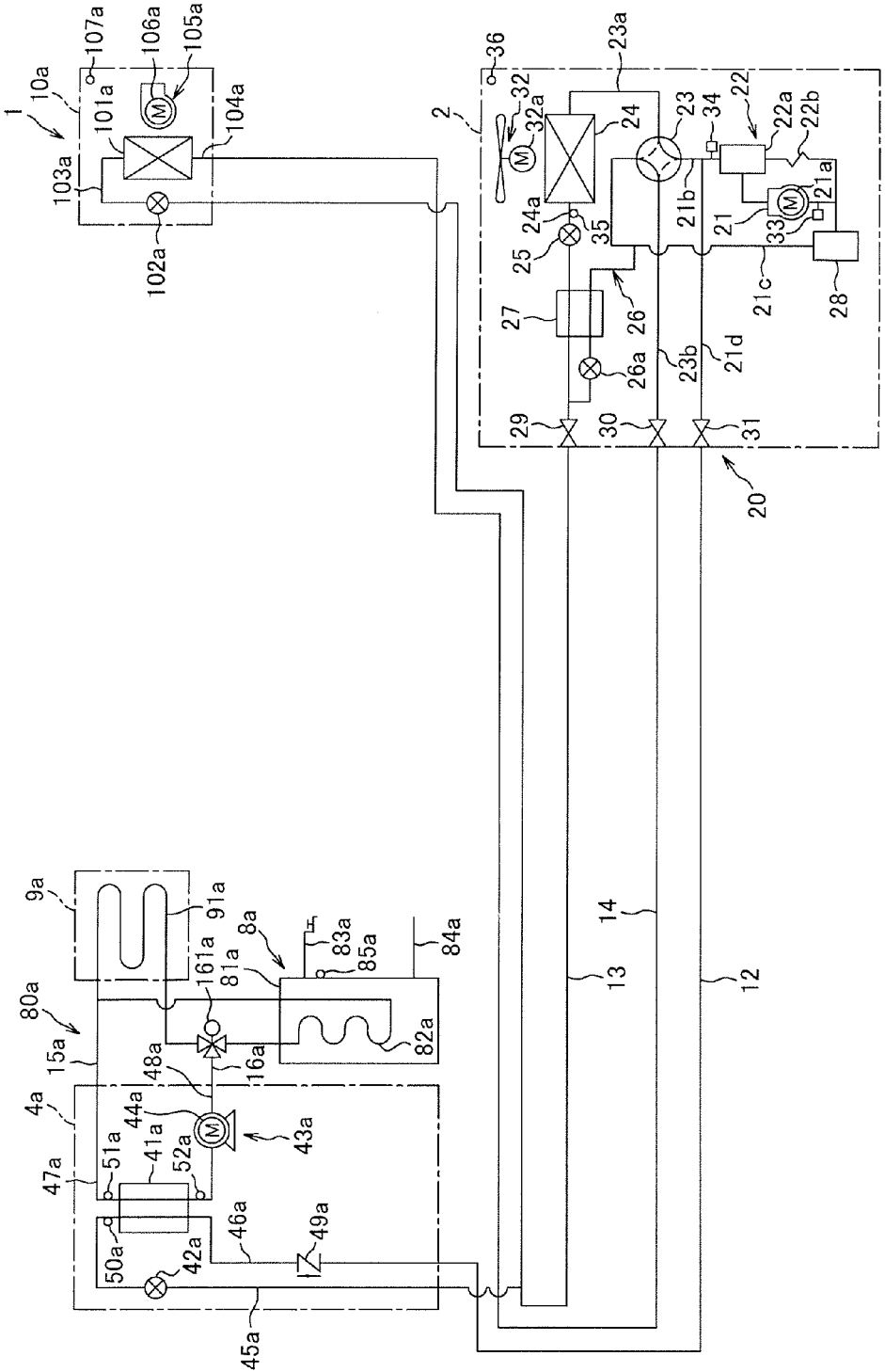
FIG. 1 is a view showing the general configuration of the heat pump system according to a first embodiment and first modification of the present invention.

FIG. 1 is a view showing the general configuration of a heat pump system 1 according to a first embodiment of the present invention. The heat pump system 1 is an apparatus capable of operation for heating an aqueous medium, and other operation by utilizing a vapor compression heat pump cycle.

The heat pump system 1 has primarily a heat source unit 2, a first usage unit 4a, a second usage unit 10a, a discharge refrigerant communication tube 12, a liquid refrigerant communication tube 13, a gas refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14, thereby constituting a heat-source-side refrigerant circuit 20. The first usage unit 4a, the hot-water storage unit 8a, and the hot-water air-warming unit 9a are connected via the aqueous medium communication tubes 15a, 16a, thereby constituting an aqueous medium circuit 80a. HFC-410A, which is a type of HFC-based refrigerant is enclosed as heat-source-side refrigerant in the heat-source-side refrigerant circuit 20, and an ester-based or ether-based refrigeration machine oil that is compatible with a HFC-based refrigerant is enclosed for lubricating a heat-source-side compressor 21 (described hereinafter). Water as the aqueous medium is circulated in the aqueous medium circuit 80a.

—Heat Source Unit—

The heat source unit 2 is installed outdoors, is connected to the usage unit 4a and 10a via the refrigerant communication tubes 12, 13, 14, and constitutes a portion of the heat-source-side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, a gas-side shutoff valve 30, and a discharge-side shutoff valve 31.

The heat-source-side compressor 21 is a mechanism for compressing the heat-source-side refrigerant. The heat-source-side compressor 21 used herein is an airtight compressor in which a rotary-type, scroll-type, or other positive-displacement compression element (not shown) housed in a casing (not shown) is driven by a heat-source-side compressor motor 21a which is also housed in the casing. A high-pressure space (not shown) filled by the heat-source-side refrigerant after compression in the compression element is formed inside the casing of the heat-source-side compressor 21, and refrigeration machine oil is stored in the high-pressure space. The rotation speed (i.e., the operating frequency) of the heat-source-side compressor motor 21a can be varied by an inverter apparatus (not shown), and the capacity of the heat-source-side compressor 21 can thereby be controlled.

The oil separation mechanism 22 is a mechanism for separating refrigeration machine oil included in the heat-source-side refrigerant that is discharged from the heat-source-side compressor 21 and returning the refrigeration machine oil to the intake of the heat-source-side compressor. The oil separation mechanism 22 has primarily an oil separator 22a provided to a heat-source-side discharge tube 21b of the heat-source-side compressor 21; and an oil return tube 22b for connecting the oil separator 22a and a heat-source-side intake tube 21c of the heat-source-side compressor 21. The oil separator 22a is a device for separating refrigeration machine oil included in the heat-source-side refrigerant that is discharged from the heat-source-side compressor 21. The oil return tube 22b has a capillary tube, and is a refrigerant tube for returning the refrigeration machine oil separated from the heat-source-side refrigerant in the oil separator 22a to the heat-source-side intake tube 21c of the heat-source-side compressor 21.

The heat-source-side switching mechanism 23 is a four-way switching valve capable of switching between a heat-source-side radiating operation state in which the heat-source-side heat exchanger 24 functions as a radiator of the heat-source-side refrigerant, and a heat-source-side evaporating operation state in which the heat-source-side heat exchanger 24 functions as a evaporator of the heat-source-side refrigerant. The heat-source-side switching mechanism 23 is connected to the heat-source-side discharge tube 21b, the heat-source-side intake tube 21c, a first heat-source-side gas refrigerant tube 23a connected to the gas side of the heat-source-side heat exchanger 24, and a second heat-source-side gas refrigerant tube 23b connected to the gas-side shutoff valve 30. The heat-source-side switching mechanism 23 is capable of switching for communicating the heat-source-side discharge tube 21b with the first heat-source-side gas refrigerant tube 23a, and communicating the second heat-source-side gas refrigerant tube 23b with the heat-source-side intake tube 21c (this switching corresponding to the heat-source-side radiating operation state, indicated by solid lines in the heat-source-side switching mechanism 23 in FIG. 1). The heat-source-side switching mechanism 23 is also capable of switching for communicating the heat-source-side discharge tube 21b with the second heat-source-side gas refrigerant tube 23b, and communicating the first heat-source-side gas refrigerant tube 23a with the heat-source-side intake tube 21c (this switching corresponding to the heat-source-side evaporating operation state, indicated by dashed lines in the heat-source-side switching mechanism 23 in FIG. 1). The heat-source-side switching mechanism 23 is not limited to a four-way switching valve, and may configured so as to have a function for switching the same directions of heat-source-side refrigerant flow as those described above, through the use of a combination of a plurality of solenoid valves or the like, for example.

The heat-source-side heat exchanger 24 is a heat exchanger for functioning as a radiator or evaporator of the heat-source-side refrigerant by exchanging heat between the heat-source-side refrigerant and outdoor air. A heat-source-side liquid refrigerant tube 24a is connected to the liquid side of the heat-source-side heat exchanger 24, and the first heat-source-side gas refrigerant tube 23a is connected to the gas side thereof. The outdoor air for heat exchange with the heat-source-side refrigerant in the heat-source-side heat exchanger 24 is fed by a heat-source-side fan 32 which is driven by a heat-source-side fan motor 32a.

The heat-source-side expansion valve 25 is an electrical expansion valve for performing such functions as depressurizing the heat-source-side refrigerant flowing through the heat-source-side heat exchanger 24, and is provided to the heat-source-side liquid refrigerant tube 24a.

The intake return tube 26 is a refrigerant tube for diverting a portion of the heat-source-side refrigerant flowing through the heat-source-side liquid refrigerant tube 24a and returning the diverted refrigerant to the intake of the heat-source-side compressor 21, and in the present embodiment, one end of the intake return tube 26 is connected to the heat-source-side liquid refrigerant tube 24a, and the other end is connected to the heat-source-side intake tube 21c. An intake return expansion valve 26a, the opening degree of which can be controlled, is provided to the intake return tube 26. The intake return expansion valve 26a is composed of an electrical expansion valve.

The subcooler 27 is a heat exchanger for exchanging heat between the heat-source-side refrigerant flowing through the heat-source-side liquid refrigerant tube 24a and the heat-source-side refrigerant flowing through the intake return tube 26 (more specifically, the heat-source-side refrigerant that has been depressurized by the intake return expansion valve 26a).

The heat-source-side accumulator 28 is provided to the heat-source-side intake tube 21c, and is a container for temporarily storing the heat-source-side refrigerant circulated through the heat-source-side refrigerant circuit 20 before the heat-source-side refrigerant is drawn into the heat-source-side compressor 21 from the heat-source-side intake tube 21c.

The liquid-side shutoff valve 29 is a valve provided at the connection between the heat-source-side liquid refrigerant tube 24a and the liquid refrigerant communication tube 13. The gas-side shutoff valve 30 is a valve provided at the connection between the second heat-source-side gas refrigerant tube 23b and the gas refrigerant communication tube 14. The discharge-side shutoff valve 31 is a valve provided at the connection between the gas refrigerant communication tube 14 and a heat-source-side discharge branch tube 21d which is diverted from the heat-source-side discharge tube 21b.

Various sensors are provided to the heat source unit 2. Specifically, the heat source unit 2 is provided with a heat-source-side intake pressure sensor 33 for detecting a heat-source-side intake pressure Ps1, which is the pressure of the heat-source-side refrigerant in the intake of the heat-source-side compressor 21; a heat-source-side discharge pressure sensor 34 for detecting a heat-source-side discharge pressure Pd1, which is the pressure of the heat-source-side refrigerant in the discharge of the heat-source-side compressor 21; a heat-source-side heat exchange temperature sensor 35 for detecting a heat-source-side heat exchanger temperature Thx, which is the temperature of the heat-source-side refrigerant in the liquid side of the heat-source-side heat exchanger 24; and an outdoor air temperature sensor 36 for detecting an outdoor air temperature To.

—Discharge Refrigerant Communication Tube—

The discharge refrigerant communication tube 12 is connected to the heat-source-side discharge branch tube 21d via the discharge-side shutoff valve 31, and is a refrigerant tube capable of directing the heat-source-side refrigerant to the outside of the heat source unit 2 from the discharge of the heat-source-side compressor 21 in any of the heat-source-side radiating operation state and the heat-source-side evaporating operation state of the heat-source-side switching mechanism 23.

—Liquid Refrigerant Communication Tube—

The liquid refrigerant communication tube 13 is connected to the heat-source-side liquid refrigerant tube 24a via the liquid-side shutoff valve 29, and the liquid refrigerant communication tube 13 is a refrigerant tube capable of directing the heat-source-side refrigerant to the outside of the heat source unit 2 from the outlet of the heat-source-side heat exchanger 24 which functions as a radiator of the heat-source-side refrigerant when the heat-source-side switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 24 which functions as an evaporator of the heat-source-side refrigerant when the heat-source-side switching mechanism 23 is in the heat-source-side evaporating operation state.

—Gas Refrigerant Communication Tube—

The gas refrigerant communication tube 14 is connected to the second heat-source-side gas refrigerant tube 23b via the gas-side shutoff valve 30. The gas refrigerant communication tube 14 is a refrigerant tube capable of introducing the heat-source-side refrigerant into the intake of the heat-source-side compressor 21 from outside the heat source unit 2 when the heat-source-side switching mechanism 23 is in the heat-source-side radiating operation state. The gas refrigerant communication tube 14 is also a refrigerant tube capable of directing the heat-source-side refrigerant to the outside of the heat source unit 2 from the discharge of the heat-source-side compressor 21 when the heat-source-side switching mechanism 23 is in the heat-source-side evaporating operation state.

—First Usage Unit—

The first usage unit 4a is installed indoors, is connected to the heat source unit 2 via the refrigerant communication tubes 12, 13, and constitutes a portion of the heat-source-side refrigerant circuit 20. The first usage unit 4a is also connected to the hot-water storage unit 8a and the hot-water air-warming unit 9a via the aqueous medium communication tubes 15a, 16a, and constitutes a portion of the aqueous medium circuit 80a.

The first usage unit 4a has primarily a first usage-side heat exchanger 41a, a first usage-side flow rate adjustment valve 42a, and a circulation pump 43a.

The first usage-side heat exchanger 41a is a heat exchanger for functioning as a radiator of the heat-source-side refrigerant by exchanging heat between the heat-source-side refrigerant and the aqueous medium, a first usage-side liquid refrigerant tube 45a is connected to the liquid side of the flow passage through which the heat-source-side refrigerant flows, a first usage-side discharge refrigerant tube 46a is connected to the gas side of the flow passage through which the heat-source-side refrigerant flows, a first usage-side water inlet tube 47a is connected to the inlet side of the flow passage through which the aqueous medium flows, and a first usage-side water outlet tube 48a is connected to the outlet side of the flow passage through which the aqueous medium flows. The liquid refrigerant communication tube 13 is connected to the first usage-side liquid refrigerant tube 45a, the discharge refrigerant communication tube 12 is connected to the first usage-side discharge refrigerant tube 46a, the aqueous medium communication tube 15a is connected to the first usage-side water inlet tube 47a, and the aqueous medium communication tube 16a is connected to the first usage-side water outlet tube 48a.

The first usage-side flow rate adjustment valve 42a is an electrical expansion valve whereby the flow rate of heat-source-side refrigerant flowing through the first usage-side heat exchanger 41a can be varied by controlling the opening degree of the first usage-side flow rate adjustment valve 42a, and the first usage-side flow rate adjustment valve 42a is provided to the first usage-side liquid refrigerant tube 45a.

The first usage-side discharge refrigerant tube 46a is provided with a first usage-side discharge non-return valve 49a for allowing the heat-source-side refrigerant to flow toward the first usage-side heat exchanger 41a from the discharge refrigerant communication tube 12 and preventing the heat-source-side refrigerant from flowing toward the discharge refrigerant communication tube 12 from the first usage-side heat exchanger 41a.

The circulation pump 43a is a mechanism for pressurizing the aqueous medium, and the circulation pump 43a used herein is a pump in which a centrifugal and/or positive-displacement pump element (not shown) is driven by a circulation pump motor 44a. The circulation pump 43a is provided to the first usage-side water outlet tube 48a. The rotation speed (i.e., the operating frequency) of the circulation pump motor 44a can be varied by an inverter apparatus (not shown), and the capacity of the circulation pump 43a can thereby be controlled.

The first usage unit 4a is thereby configured so that a hot-water supply operation can be performed in which the first usage-side heat exchanger 41a is caused to function as a radiator of the heat-source-side refrigerant introduced from the discharge refrigerant communication tube 12, whereby the heat-source-side refrigerant radiated in the first usage-side heat exchanger 41a is directed to the liquid refrigerant communication tube 13, and the aqueous medium is heated by radiation of the heat-source-side refrigerant in the first usage-side heat exchanger 41a.

Various sensors are provided to the first usage unit 4a. Specifically, the first usage unit 4a is provided with a first usage-side heat exchange temperature sensor 50a for detecting a first usage-side refrigerant temperature Tsc1, which is the temperature of the heat-source-side refrigerant in the liquid side of the first usage-side heat exchanger 41a; an aqueous medium inlet temperature sensor 51a for detecting an aqueous medium inlet temperature Twr, which is the temperature of the aqueous medium in the inlet of the first usage-side heat exchanger 41a; and an aqueous medium outlet temperature sensor 52a for detecting an aqueous medium outlet temperature Tw1, which is the temperature of the aqueous medium in the outlet of the first usage-side heat exchanger 41a.

—Hot-Water Storage Unit—

The hot-water storage unit 8a is installed indoors, is connected to the first usage unit 4a via the aqueous medium communication tubes 15a, 16a, and constitutes a portion of the aqueous medium circuit 80a.

The hot-water storage unit 8a has primarily a hot-water storage tank 81a and a heat exchange coil 82a.

The hot-water storage tank 81a is a container for storing water as the aqueous medium for the hot water supply, a hot-water supply tube 83a for sending the aqueous medium as hot water to a faucet, shower, or the like is connected to the top of the hot-water storage tank 81a, and a water supply tube 84a for replenishing the aqueous medium expended by the hot-water supply tube 83a is connected to the bottom of the hot-water storage tank 81a.

The heat exchange coil 82a is provided inside the hot-water storage tank 81a, and is a heat exchanger for functioning as a heater of the aqueous medium in the hot-water storage tank 81a by exchanging heat between the aqueous medium circulating through the aqueous medium circuit 80a and the aqueous medium inside the hot-water storage tank 81a. The aqueous medium communication tube 16a is connected to the inlet of the heat exchange coil 82a, and the aqueous medium communication tube 15a is connected to the outlet thereof.

The hot-water storage unit 8a is thereby capable of heating the aqueous medium inside the hot-water storage tank 81a through the use of the aqueous medium circulating through the aqueous medium circuit 80a, which has been heated in the first usage unit 4a, and storing the heated aqueous medium as hot water. The type of hot-water storage unit 8a used herein is a hot-water storage unit for storing, in a hot-water storage tank, the aqueous medium heated by heat exchange with the aqueous medium heated in the first usage unit 4a, but a type of hot-water storage unit for storing an aqueous medium heated in the first usage unit 4a in a hot-water storage tank may also be used.

Various sensors are also provided to the hot-water storage unit 8a. Specifically, the hot-water storage unit 8a is provided with a hot-water storage temperature sensor 85a for detecting a hot-water storage temperature Twh, which is the temperature of the aqueous medium stored in the hot-water storage tank 81a.

—Hot-Water Air-Warming Unit—

The hot-water air-warming unit 9a is installed indoors, is connected to the first usage unit 4a via the aqueous medium communication tubes 15a, 16a, and constitutes a portion of the aqueous medium circuit 80a.

The hot-water air-warming unit 9a has primarily a heat exchange panel 91a, and is composed of a radiator and/or a floor heating panel and other components.

The heat exchange panel 91a is provided alongside a wall or elsewhere indoors when configured as a radiator, and is provided under the floor or elsewhere indoors when configured as a floor heating panel. The heat exchange panel 91a is a heat exchanger for functioning as a radiator or heater of the aqueous medium circulated through the aqueous medium circuit 80a, and the aqueous medium communication tube 16a is connected to the inlet of the heat exchange panel 91a, and the aqueous medium communication tube 15a is connected to the outlet of the heat exchange panel 91a.

—Aqueous Medium Communication Tubes—

The aqueous medium communication tube 15a is connected to the outlet of the heat exchange coil 82a of the hot-water storage unit 8a, and the outlet of the heat exchange panel 91a of the hot-water air-warming unit 9a. The aqueous medium communication tube 16a is connected to the inlet of the heat exchange coil 82a of the hot-water storage unit 8a, and the inlet of the heat exchange panel 91a of the hot-water air-warming unit 9a. The aqueous medium communication tube 16a is provided with an aqueous-medium-side switching mechanism 161a capable of switching between feeding the aqueous medium circulated through the aqueous medium circuit 80a to both the hot-water storage unit 8a and the hot-water air-warming unit 9a, or to any one of the hot-water storage unit 8a and the hot-water air-warming unit 9a. The aqueous-medium-side switching mechanism 161a is composed of a three-way valve.

—Second Usage Unit—

The second usage unit 10a is installed indoors, is connected to the heat source unit 2 via the refrigerant communication tubes 13, 14, and constitutes a portion of the heat-source-side refrigerant circuit 20.

The second usage unit 10a has primarily a second usage-side heat exchanger 101a and a second usage-side flow rate adjustment valve 102a.

The second usage-side heat exchanger 101a is a heat exchanger for functioning as a radiator or evaporator of the heat-source-side refrigerant by exchanging heat between the heat-source-side refrigerant and indoor air as the air medium, a second usage-side liquid refrigerant tube 103a is connected to the liquid side of the second usage-side heat exchanger 101a, and a second usage-side gas refrigerant tube 104a is connected to the gas side of the second usage-side heat exchanger 101a. The liquid refrigerant communication tube 13 is connected to the second usage-side liquid refrigerant tube 103a, and the gas refrigerant communication tube 14 is connected to the second usage-side gas refrigerant tube 104a. The air medium for exchanging heat with the heat-source-side refrigerant in the second usage-side heat exchanger 101a is fed by a usage-side fan 105a driven by a usage-side fan motor 106a.

The second usage-side flow rate adjustment valve 102a is an electrical expansion valve whereby the flow rate of heat-source-side refrigerant flowing through the second usage-side heat exchanger 101a can be varied by controlling the opening degree of the second usage-side flow rate adjustment valve 102a, and the second usage-side flow rate adjustment valve 102a is provided to the second usage-side liquid refrigerant tube 103a.

The second usage unit 10a is thereby configured so that an air-cooling operation can be performed in which the second usage-side heat exchanger 101a is caused to function as an evaporator of the heat-source-side refrigerant introduced from the liquid refrigerant communication tube 13 in the heat-source-side radiating operation state of the heat-source-side switching mechanism 23, whereby the heat-source-side refrigerant evaporated in the second usage-side heat exchanger 101a is directed to the gas refrigerant communication tube 14, and the air medium is cooled by evaporation of the heat-source-side refrigerant in the second usage-side heat exchanger 101a. The second usage unit 10a is also configured so that an air-warming operation can be performed in which the second usage-side heat exchanger 101a is caused to function as a radiator of the heat-source-side refrigerant introduced from the gas refrigerant communication tube 14 in the heat-source-side evaporating operation state of the heat-source-side switching mechanism 23, whereby the heat-source-side refrigerant radiated in the second usage-side heat exchanger 101a is directed to the liquid refrigerant communication tube 13, and the air medium is heated by radiation of the heat-source-side refrigerant in the second usage-side heat exchanger 101a.

Various sensors are provided to the second usage unit 10a. Specifically, the second usage unit 10a is provided with an outdoor temperature sensor 107a for detecting an outdoor temperature Tr.

The heat pump system 1 is also provided with a controller (not shown) for performing the operations and/or various types of control described below.

<Operation>

The operation of the heat pump system 1 will next be described.

The operation modes of the heat pump system 1 include a hot-water supply operation mode for performing only the hot-water supply operation (i.e., operation of the hot-water storage unit 8a and/or the hot-water air-warming unit 9a) of the first usage unit 4a; an air-cooling operation mode for performing only the air-cooling operation of the second usage unit 10a; an air-warming operation mode for performing only the air-warming operation of the second usage unit 10a; a hot-water supply/air-warming operation mode for performing the hot-water supply operation of the first usage unit 4a as well as the air-warming operation of the second usage unit 10a; and a hot-water supply/air-cooling operation mode for performing the hot-water supply operation of the first usage unit 4a as well as the air-cooling operation of the second usage unit 10a.

The operation in the five operating modes of the heat pump system 1 will next be described.

—Hot-Water Supply Operation Mode—

In the case of performing only the hot-water supply operation of the first usage unit 4a, the heat-source-side switching mechanism 23 is switched to the heat-source-side evaporating operation state (indicated by dashed lines in the heat-source-side switching mechanism 23 in FIG. 1), and the intake return expansion valve 26a and the second usage-side flow rate adjustment valve 102a are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is heated by radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls, the indoor floor and other indoor areas are thereby heated.

The operations in the hot-water supply operation mode for performing only the hot-water supply operation of the first usage unit 4a are thus performed.

—Air-Cooling Operation Mode—

In the case of performing only the air-cooling operation of the second usage unit 10a, the heat-source-side switching mechanism 23 is switched to the heat-source-side radiating operation state (indicated by solid lines in the heat-source-side switching mechanism 23 in FIG. 1), and the first usage-side flow rate adjustment valve 42a is closed in the heat-source-side refrigerant circuit 20.

In the heat-source-side refrigerant circuit 20 in such a state, the heat-source-side refrigerant at the low pressure in the refrigeration cycle is drawn into the heat-source-side compressor 21 through the heat-source-side intake tube 21c and compressed to the high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the liquid refrigerant communication tube 13 is sent to the second usage unit 10a. The high-pressure heat-source-side refrigerant sent to the second usage unit 10a is sent to the second usage-side flow rate adjustment valve 102a. The high-pressure heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-cooling operation mode for performing only the air-cooling operation of the second usage unit 10a are thus performed.

—Air-Warming Operation Mode—

In the case of performing only the air-warming operation of the second usage unit 10a, the heat-source-side switching mechanism 23 is switched to the heat-source-side radiating operation state (indicated by dashed lines in the heat-source-side switching mechanism 23 in FIG. 1), and the intake return expansion valve 26a and the first usage-side flow rate adjustment valve 42a are closed in the heat-source-side refrigerant circuit 20.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21*b*. In the oil separator 22*a*, the refrigeration machine oil is separated from the high-pressure heat-source-side refrigerant discharged to the heat-source-side discharge tube 21*b*. The refrigeration machine oil separated from the heat-source-side refrigerant in the oil separator 22*a* is returned to the heat-source-side intake tube 21*c* through the oil return tube 22*b*. The high-pressure heat-source-side refrigerant from which the refrigeration machine oil has been separated is sent from the heat source unit 2 to the gas refrigerant communication tube 14 through the heat-source-side switching mechanism 23, the second heat-source-side gas refrigerant tube 23*b*, and the gas-side shutoff valve 30.

The high-pressure heat-source-side refrigerant sent to the gas refrigerant communication tube 14 is sent to the second usage unit 10*a*. The high-pressure heat-source-side refrigerant sent to the second usage unit 10*a* is sent to the second usage-side heat exchanger 101*a* through the second usage-side gas refrigerant tube 104*a*. The high-pressure heat-source-side refrigerant sent to the second usage-side heat exchanger 101*a* is heat-exchanged with the air medium fed by the usage-side fan 105*a* and radiated in the second usage-side heat exchanger 101*a*, and indoor air warming is thereby performed. The high-pressure heat-source-side refrigerant radiated in the second usage-side heat exchanger 101*a* is sent from the second usage unit 10*a* to the liquid refrigerant communication tube 13 through the second usage-side flow rate adjustment valve 102*a* and the second usage-side liquid refrigerant tube 103*a*.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24*a*. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23*a* and the heat-source-side switching mechanism 23. The low-pressure heat-source-side refrigerant sent to the heat-source-side accumulator 28 is again drawn into the heat-source-side compressor 21 through the heat-source-side intake tube 21*c*.

The operations in the air-warming operation mode for performing only the air-warming operation of the second usage unit 10*a* are thus performed.

—Hot-Water Supply/Air-Warming Operation Mode—

In the case of performing the hot-water supply operation of the first usage unit 4*a* as well as the air-warming operation of the second usage unit 10*a*, the heat-source-side switching mechanism 23 is switched to the heat-source-side evaporating operation state (indicated by dashed lines in the heat-source-side switching mechanism 23 in FIG. 1), and the intake return expansion valve 26*a* is closed in the heat-source-side refrigerant circuit 20. In the aqueous medium circuit 80*a*, the aqueous-medium-side switching mechanism 161*a* is switched to a state in which the aqueous medium is fed to the hot-water storage unit 8*a* and/or the hot-water air-warming unit 9*a*.

In the heat-source-side refrigerant circuit 20 in such a state, the heat-source-side refrigerant at a low pressure in the refrigeration cycle is drawn into the heat-source-side compressor 21 through the heat-source-side intake tube 21*c* and compressed to a high pressure in the refrigeration cycle, and subsequently discharged to the heat-source-side discharge tube 21*b*. In the oil separator 22*a*, the refrigeration machine oil is separated from the high-pressure heat-source-side refrigerant discharged to the heat-source-side discharge tube 21*b*. The refrigeration machine oil separated from the heat-source-side refrigerant in the oil separator 22*a* is returned to the heat-source-side intake tube 21*c* through the oil return tube 22*b*. A portion of the high-pressure heat-source-side refrigerant from which the refrigeration machine oil has been separated is sent from the heat source unit 2 to the discharge refrigerant communication tube 12 through the heat-source-side discharge branch tube 21*d* and the discharge-side shutoff valve 31, and the remainder is sent from the heat source unit 2 to the gas refrigerant communication tube 14 through the second heat-source-side gas refrigerant tube 23*b* and the gas-side shutoff valve 30.

The high-pressure heat-source-side refrigerant sent to the gas refrigerant communication tube 14 is sent to the second usage unit 10*a*. The high-pressure heat-source-side refrigerant sent to the second usage unit 10*a* is sent to the second usage-side heat exchanger 101*a* through the second usage-side gas refrigerant tube 104*a*. The high-pressure heat-source-side refrigerant sent to the second usage-side heat exchanger 101*a* is heat-exchanged with the air medium fed by the usage-side fan 105*a* and radiated in the second usage-side heat exchanger 101*a*, and indoor air warming is thereby performed. The high-pressure heat-source-side refrigerant radiated in the second usage-side heat exchanger 101*a* is sent from the second usage unit 10*a* to the liquid refrigerant communication tube 13 through the second usage-side flow rate adjustment valve 102*a* and the second usage-side liquid refrigerant tube 103*a*.

The high-pressure heat-source-side refrigerant sent to the discharge refrigerant communication tube 12 is sent to the first usage unit 4*a*. The high-pressure heat-source-side refrigerant sent to the first usage unit 4*a* is sent to the first usage-side heat exchanger 41*a* through the first usage-side discharge refrigerant tube 46*a* and the first usage-side discharge non-return valve 49*a*. The high-pressure heat-source-side refrigerant sent to the first usage-side heat exchanger 41*a* is heat-exchanged with the aqueous medium circulated through the aqueous medium circuit 80*a* by the circulation pump 43*a* and radiated in the first usage-side heat exchanger 41*a*. The high-pressure heat-source-side refrigerant radiated in the first usage-side heat exchanger 41*a* is sent from the first usage unit 4*a* to the liquid refrigerant communication tube 13 through the first usage-side flow rate adjustment valve 42*a* and the first usage-side liquid refrigerant tube 45*a*.

The heat-source-side refrigerant sent from the second usage unit 10*a* and the first usage unit 4*a* to the liquid refrigerant communication tube 13 merges in the liquid refrigerant communication tube 13, and is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heatsource-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the aqueous medium circuit 80a, the aqueous medium circulated through the aqueous medium circuit 80a is heated by the radiating of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls and other indoor areas are thereby heated, and the indoor floor is heated.

The operations in the hot-water supply/air-warming operation mode for performing the hot-water supply operation of the first usage unit 4a as well as the air-warming operation of the second usage unit 10a are thus performed.

—Hot-Water Supply/Air-Cooling Operation Mode—

In the case of performing the hot-water supply operation of the first usage unit 4a as well as the air-cooling operation of the second usage unit 10a, the heat-source-side switching mechanism 23 is switched to the heat-source-side radiating operation state (indicated by solid lines in the heat-source-side switching mechanism 23 in FIG. 1) in the heat-source-side refrigerant circuit 20. In the aqueous medium circuit 80a, the aqueous-medium-side switching mechanism 161a is switched to a state in which the aqueous medium is fed to the hot-water storage unit 8a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

The heat-source-side refrigerant sent from the heat source unit 2 and the first usage unit 4a to the liquid refrigerant communication tube 13 merges in the liquid refrigerant communication tube 13, and is sent to the second usage unit 10a. The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to a low-pressure gas-liquid two-phase state and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air-cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is heated by radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated.

The operations in the hot-water supply/air-cooling operation mode for performing the hot-water supply operation of the first usage unit 4a as well as the air-cooling operation of the second usage unit 10a are thus performed.

—Control of the Flow Rate of the Aqueous Medium Circulating Through the Aqueous Medium Circuit—

Described next is control of the flow rate of the aqueous medium circulating through the aqueous medium circuit 80a in the above-described hot-water supply operation, hot-water supply/air-warming operation, and hot-water supply/air-cooling operation.

In the heat pump system 1, the capacity of the circulation pump 43a is controlled so that the aqueous medium outlet/inlet temperature difference $\Delta Tw$ becomes a predetermined target aqueous medium outlet/inlet temperature difference $\Delta Tws$, the aqueous medium outlet/inlet temperature difference $\Delta Tw$ being the difference (i.e., Tw1−Twr) between the temperature of the aqueous medium in the outlet of the first usage-side heat exchanger 41a (i.e., the aqueous medium outlet temperature Tw1) and the temperature of the aqueous medium in the inlet of the first usage-side heat exchanger 41a (i.e., the aqueous medium inlet temperature Twr). More specifically, in the case that the aqueous medium outlet/inlet temperature difference $\Delta Tw$ is greater than the target aqueous medium outlet/inlet temperature difference $\Delta Tws$, it is determined that the flow rate of the aqueous medium circulating in the aqueous medium circuit 80a is low, and the operating capacity of the circulation pump 43a is increased by increasing the rotational speed (i.e., operational frequency) of the circulation pump motor 44a; and in the case that the aqueous medium outlet/inlet temperature difference $\Delta Tw$ is less than the target aqueous medium outlet/inlet temperature difference $\Delta Tws$, it is determined that the flow rate of the aqueous medium circulating in the aqueous medium circuit 80a is high, and the operating capacity of the circulation pump 43a is reduced by reducing the rotational speed (i.e., operational frequency) of the circulation pump motor 44a. The flow rate of the aqueous medium circulating through the aqueous medium circuit 80a is thereby designed to be suitably controlled. The target aqueous medium outlet/inlet temperature difference $\Delta Tws$ is set with consideration given to the design conditions of the heat-exchange capacity of the first usage-side heat exchanger 41a, or other factors.

However, in operating conditions in which the temperature of the aqueous medium is low, such as immediately after the operation of the first usage unit 4a has started, lubrication deficiency is liable to occur when the pressure of the heat-source-side refrigerant (i.e., the heat-source-side discharge pressure Pd1) in the discharge of the heat-source-side compressor 21 falls; the heat-source-side outlet/inlet pressure difference $\Delta P1$, which is the pressure difference (Pd1−Ps1) between the heat-source-side discharge pressure Pd1 and the pressure of the heat-source-side refrigerant in the intake of the heat-source-side compressor 21 (i.e., the heat-source-side intake pressure Ps1) becomes smaller; and the circulation of refrigeration machine oil inside the heat-source-side compressor 21 worsens.

Nevertheless, when the capacity of the circulation pump 43a is controlled so that the flow rate of the aqueous medium circulating through the aqueous medium circuit 80a is increased, the temperature of the aqueous medium flowing through the first usage-side heat exchanger 41a is less likely to increase and the heat-source-side outlet/inlet pressure difference $\Delta P1$ is prevented from increasing.

Figure 2:
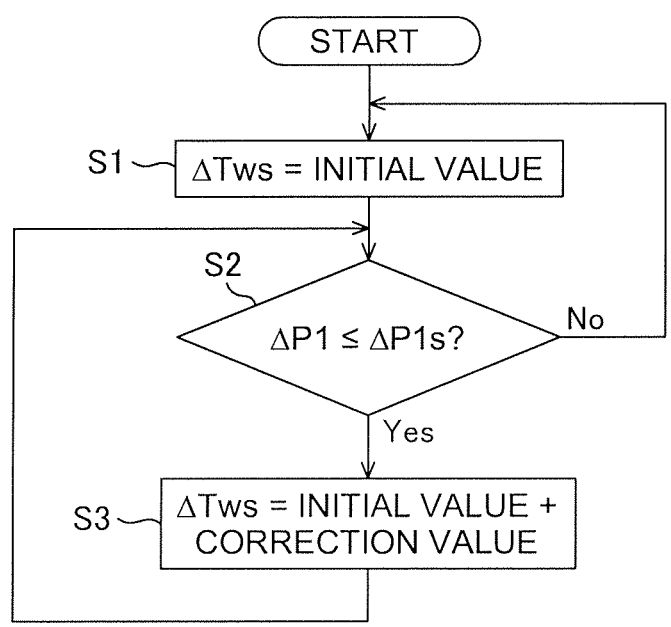
FIG. 2 is a flowchart showing the control of the flow rate of the aqueous medium circulated through the aqueous medium circuit in the first embodiment and a second embodiment.

In view of the above, in the heat pump system 1, the capacity of the circulation pump 43a is controlled so that the flow rate of the aqueous medium circulating through the aqueous medium circuit 80a is reduced in the case that the heat-source-side outlet/inlet pressure difference $\Delta P1$ is equal to or less than a predetermined heat-source-side low differential pressure protection pressure difference $\Delta P1s$. More specifically, the operating capacity of the circulation pump 43a is controlled (step S1) so that the aqueous medium outlet/inlet temperature difference $\Delta Tw$ becomes the target aqueous medium outlet/inlet temperature difference $\Delta Tws$ ($\Delta Tws$=initial value) as described above in the case that the heat-source-side outlet/inlet pressure difference $\Delta P1$ is greater than the heat-source-side low differential pressure protection pressure difference $\Delta P1s$ (from step S2 to step S1), as shown in FIG. 2; and in the case that the heat-source-side outlet/inlet pressure difference $\Delta P1$ is equal to or less than the heat-source-side low differential pressure protection pressure difference $\Delta P1s$ (from step S2 to step S3), it is determined that the flow rate of the aqueous medium circulating through the aqueous medium circuit 80a must be reduced by increasing the target aqueous medium outlet/inlet temperature difference $\Delta Tws$ (step S3, $\Delta Tws$=initial value+correction value), and control is performed to reduce the operating capacity of the circulation pump 43a by reducing the rotational speed (i.e., operational frequency) of the circulation pump motor 44a. The heat-source-side low differential pressure protection pressure difference $\Delta P1s$ is set with consideration given to the design conditions or the like of the lubrication structure of the heat-source-side compressor 21.

The temperature of the aqueous medium flowing through the first usage-side heat exchanger 41a is thereby more readily increased, and it is possible to promote an increase in the heat-source-side outlet/inlet pressure difference $\Delta P1$.

After the heat-source-side outlet/inlet pressure difference $\Delta P1$ has become greater than the heat-source-side low differential pressure protection pressure difference $\Delta P1s$ (from step S2 to step S1), the target aqueous medium outlet/inlet temperature difference $\Delta Tws$ is reduced (step S1, $\Delta Tws$=initial value) and a transition is made to normal capacity control of the circulation pump 43a.

<Characteristics>

The heat pump system 1 has the following characteristics.

—A—

In the heat pump system 1, not only can operation be performed for heating an aqueous medium by radiation of the heat-source-side refrigerant in the first usage-side heat exchanger 41a, but operation is performed for heating the aqueous medium by radiation of the heat-source-side refrigerant in the first usage-side heat exchanger 41a, and it is possible to utilize the heat of cooling obtained by the heat-source-side refrigerant by heating of the aqueous medium for operation in which an air medium is cooled by evaporation of the heat-source-side refrigerant in the second usage-side heat exchanger 101a. Therefore, in such cases as when the aqueous medium heated in the first usage unit 4a is used to supply hot water, and the air medium cooled in the second usage unit 10a is used for indoor air cooling, for example, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

—B—

In the heat pump system 1, in the heat-source-side radiating operation state of the heat-source-side switching mechanism 23, operation (air-cooling operation) can be performed for cooling the air medium by evaporation of the heat-source-side refrigerant in the second usage-side heat exchanger 101a, and in the heat-source-side evaporating operation state of the heat-source-side switching mechanism 23, operation (air-warming operation) can be performed for heating the air medium by radiation of the heat-source-side refrigerant in the second usage-side heat exchanger 101a. Therefore, the aqueous medium heated in the first usage unit 4a can be used to supply hot water, and the second usage unit 10a can be used for indoor air cooling or air warming, for example.

—C—

In the heat pump system 1, the heat-source-side compressor 21 is not forced to operate unstably, the heat-source-side outlet/inlet pressure difference ΔP1 is maintained, and lubrication deficiency in the heat-source-side compressor 21 can be suppressed even in a case in which the temperature of the aqueous medium is low, and the heat-source-side outlet/inlet pressure difference ΔP1 is prone to decrease, such as immediately after the start of operation by the first usage unit 4a. In the heat pump system 1, the capacity of the circulation pump 43a is controlled so that the aqueous medium outlet/inlet temperature difference ΔTw is equal to the target aqueous medium outlet/inlet temperature difference ΔTws in a case in which the heat-source-side outlet/inlet pressure difference ΔP1 is greater than the heat-source-side low differential pressure protection pressure difference ΔP1s. The heat pump system can therefore operate in conditions suited to the heat exchange capability of the first usage-side heat exchanger 41a. Furthermore, in the heat pump system 1, the flow rate of the aqueous medium circulated through the aqueous medium circuit 80a is reduced by increasing the target aqueous medium outlet/inlet temperature difference ΔTws in the control of the capacity of the circulation pump 43a, which is performed to make the aqueous medium outlet/inlet temperature difference ΔTw equal to the target aqueous medium outlet/inlet temperature difference ΔTws. Control of the capacity of the circulation pump 43a can therefore be employed which makes the aqueous medium outlet/inlet temperature difference ΔTw equal to the target aqueous medium outlet/inlet temperature difference ΔTws regardless of whether the heat-source-side outlet/inlet pressure difference ΔP1 is equal to or less than the heat-source-side low differential pressure protection pressure difference ΔP1s.

(1) Modification 1

In order to more effectively use the hot-water supply/air-cooling operation in the heat pump system 1 described above (see FIG. 1), it is possible for the first usage unit 4a to perform, as required, operation for heating the aqueous medium (hot-water supply operation) using the radiation of the heat-source-side refrigerant in the first usage-side heat exchanger 41a when the second usage unit 10a performs operation for cooling the air medium (air-cooling operation) by evaporation of the heat-source-side refrigerant in the second usage-side heat exchanger 101a.

For example, in the case that air-cooling operation is being performed, the first usage unit 4a may perform operation for heating the aqueous medium (hot-water supply operation) using the radiation of the heat-source-side refrigerant in the first usage-side heat exchanger 41a in the case that the hot-water storage temperature Twh of the hot-water storage unit 8a is equal to or less than the predetermined hot-water storage setting temperature Twhs (i.e., the hot-water supply/air-cooling operation mode).

The hot-water storage temperature Twh can be thereby kept at or above the hot-water storage setting temperature Twhs while making effective use of the heat obtained by the heat-source-side refrigerant by cooling the air medium.

(2) Modification 2

Figure 3:
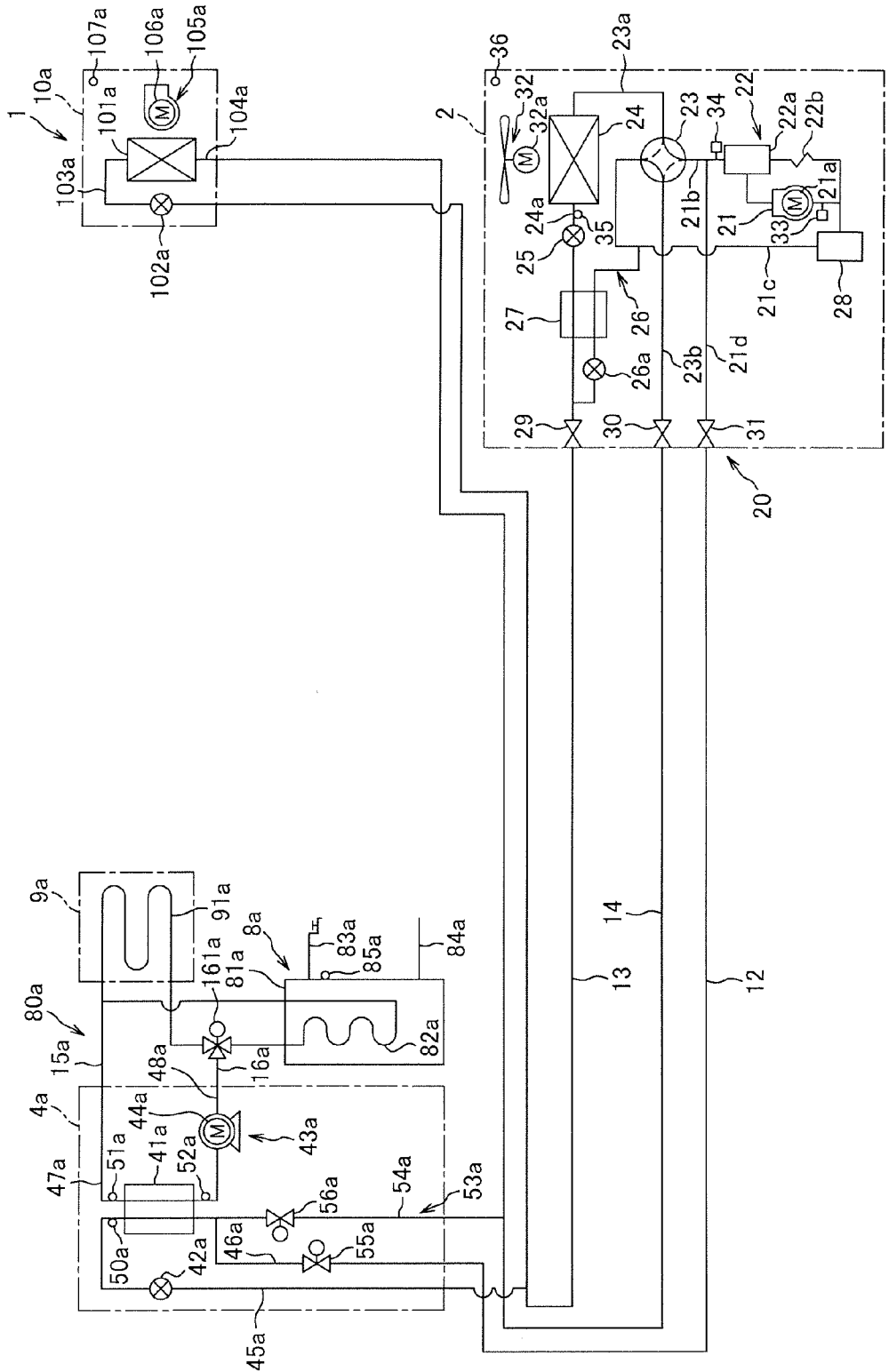
FIG. 3 is a view showing the general configuration of the heat pump system according to Modifications 2 through 5, and Modification 8 of the first embodiment.

In the heat pump system 1 (see FIG. 1) described above, hot-water supply operation is possible in which the first usage-side heat exchanger 41a is made to function as a radiator of the heat-source-side refrigerant, and the aqueous medium is thereby heated, but, as shown in FIG. 3, it is possible to further connect the first usage unit 4a to the gas refrigerant communication tube 14 and to further provide a first usage-side switching mechanism 53a capable of switching between an aqueous medium heating operation state in which the first usage-side heat exchanger 41a is made to function as a radiator of the heat-source-side refrigerant introduced from the discharge refrigerant communication tube 12, and an aqueous medium cooling operation state in which the first usage-side heat exchanger 41a is made to function as an evaporator of the heat-source-side refrigerant introduced from the liquid refrigerant communication tube 13; to enable operation (hot-water supply operation) to be performed in which the heat-source-side refrigerant radiated in the first usage-side heat exchanger 41a is directed to the liquid refrigerant communication tube 13, and the aqueous medium is heated by radiation of the heat-source-side refrigerant in the first usage-side heat exchanger 41a in the aqueous medium heating operation state of the first usage-side switching mechanism 53a; and to enable operation to be performed in which the heat-source-side refrigerant evaporated in the first usage-side heat exchanger 41a is directed to the gas refrigerant communication tube 14, and the aqueous medium is cooled by evaporation of the heat-source-side refrigerant in the first usage-side heat exchanger 41a in the aqueous medium cooling operation state of the first usage-side switching mechanism 53a.

The first usage-side discharge refrigerant tube 46a as well as a first usage-side gas refrigerant tube 54a are connected to the gas side of the flow passage through which the heat-source-side refrigerant flows in the first usage-side heat exchanger 41a. The gas refrigerant communication tube 14 is connected to the first usage-side gas refrigerant tube 54a. The first usage-side switching mechanism 53a has a first usage-side discharge on-off valve 55a (in this case, the first usage-side discharge non-return valve 49a is omitted) provided to the first usage-side discharge refrigerant tube 46a, and a first usage-side gas on-off valve 56a provided to the first usage-side gas refrigerant tube 54a; and by opening the first usage-side discharge on-off valve 55a and closing the first usage-side gas on-off valve 56a, the first usage-side switching mechanism 53a is placed in the aqueous medium heating operation state, and by closing the first usage-side discharge on-off valve 55a and opening the first usage-side gas on-off valve 56a, the first usage-side switching mechanism 53a is placed in the aqueous medium cooling operation state. The first usage-side discharge on-off valve 55a and the first usage-side gas on-off valve 56a are composed of solenoid valves, both being capable of on-off control. The first usage-side switching mechanism 53a may be configured using a three-way valve or the like.

In this heat pump system 1, by placing the first usage-side switching mechanism 53a in the aqueous medium heating operation state (i.e., a state in which the first usage-side discharge on-off valve 55a is open and the first usage-side gas on-off valve 56a is closed), the same operations in the hot-water supply operation mode and/or the hot-water supply air-warming mode are possible as in the heat pump system 1 (see FIG. 1) described above. In this heat pump system 1, operation is also possible in a cold-water supply/air-cooling operation mode for performing cold-water supply operation of the first usage unit 4a as well as air-cooling operation of the second usage unit 10a.

Operation in the cold-water supply/air-cooling operation mode will next be described.

In the case of performing the cold-water supply operation of the first usage unit 4a as well as the air-cooling operation of the second usage unit 10a, the heat-source-side switching mechanism 23 is switched to the heat-source-side radiating operation state (indicated by solid lines in the heat-source-side switching mechanism 23 in FIG. 3), and the first usage-side switching mechanism 53a is switched to the aqueous medium cooling operation state (i.e., the first usage-side discharge on-off valve 55a is closed and the first usage-side gas on-off valve 56a is open) in the heat-source-side refrigerant circuit 20. In the aqueous medium circuit 80a, the aqueous-medium-side switching mechanism 161a is switched to the state of feeding the aqueous medium to the hot-water air-warming unit 9a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The heat-source-side refrigerant sent to the liquid refrigerant communication tube 13 is diverted in the liquid refrigerant communication tube 13 and sent to the first usage unit 4a and the second usage unit 10a.

The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to a low-pressure gas-liquid two-phase state, and sent to the first usage-side heat exchanger 41a through the first usage-side liquid refrigerant tube 45a. The low-pressure heat-source-side refrigerant sent to the first usage-side heat exchanger 41a is heat-exchanged with the aqueous medium circulated through the aqueous medium circuit 80a by the circulation pump 43a and evaporated in the first usage-side heat exchanger 41a. The low-pressure heat-source-side refrigerant evaporated in the first usage-side heat exchanger 41a is sent from the first usage unit 4a to the gas refrigerant communication tube 14 through the first usage-side gas on-off valve 56a and the first usage-side gas refrigerant tube 54a which constitute the first usage-side switching mechanism 53a.

The heat-source-side refrigerant sent to the gas refrigerant communication tube 14 from the second usage unit 10a and the first usage unit 4a merges in the gas refrigerant communication tube 14, and is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is cooled by the evaporation of the heat-source-side refrigerant in the first usage-side heat exchanger 41a. The aqueous medium cooled in the first usage-side heat exchanger 41a is drawn into the circulation pump 43a through the first usage-side water outlet tube 48a and pressurized, and is subsequently sent from the first usage unit 4a to the aqueous medium communication tube 16a. The aqueous medium sent to the aqueous medium communication tube 16a is sent to the hot-water air-warming unit 9a through the aqueous-medium-side switching mechanism 161a. The aqueous medium sent to the hot-water air-warming unit 9a is heat-absorbed in the heat exchange panel 91a, the walls and other indoor areas are thereby cooled, and the indoor floor is cooled.

The operations in the hot-water supply/air-cooling operation mode for performing the cold-water supply operation of the first usage unit 4a as well as the air-cooling operation of the second usage unit 10a are thus performed.

The heat pump system 1 is thereby configured so that it is possible to switch between operation (hot-water supply operation) for heating the aqueous medium by radiation of the heat-source-side refrigerant in the first usage-side heat exchanger 41a, and operation (cold-water supply operation) for cooling the aqueous medium by evaporation of the heat-source-side refrigerant in the first usage-side heat exchanger 41a; and it is possible to perform operation (air-cooling operation) for cooling the air medium by evaporation of the heat-source-side refrigerant in the second usage-side heat exchanger 101a, as well as operation (cold-water supply operation) for cooling the aqueous medium by evaporation of the heat-source-side refrigerant in the first usage-side heat exchanger 41a. It is therefore possible to provide comfortable air conditioning by a combination of the first usage unit 4a and the second usage unit 10a, whereby the air medium cooled in the second usage unit 10a is used for indoor air cooling while the aqueous medium cooled in the first usage unit 4a is used in a radiator, a floor air-warming panel, or the like, for example.

(3) Modification 3

In the heat pump system 1 (see FIG. 3) having the configuration of Modification 2, by the operations in the hot-water supply operation mode, the air-warming operation mode, and the hot-water supply/air-warming operation mode, defrosting operation may be performed in which the heat-source-side heat exchanger 24 is caused to function as a radiator of the heat-source-side refrigerant, and the second usage-side heat exchanger 101a is caused to function as an evaporator of the heat-source-side refrigerant by placing the heat-source-side switching mechanism 23 in the heat-source-side radiating operation state, and the first usage-side heat exchanger 41a is caused to function as an evaporator of the heat-source-side refrigerant by placing the first usage-side switching mechanism 53a in the aqueous-medium cooling operation state (i.e., a state in which the first usage-side discharge on-off valve 55a is closed and the first usage-side gas on-off valve 56a is open) in a case in which defrosting of the heat-source-side heat exchanger 24 is determined to be necessary.

Figure 4:
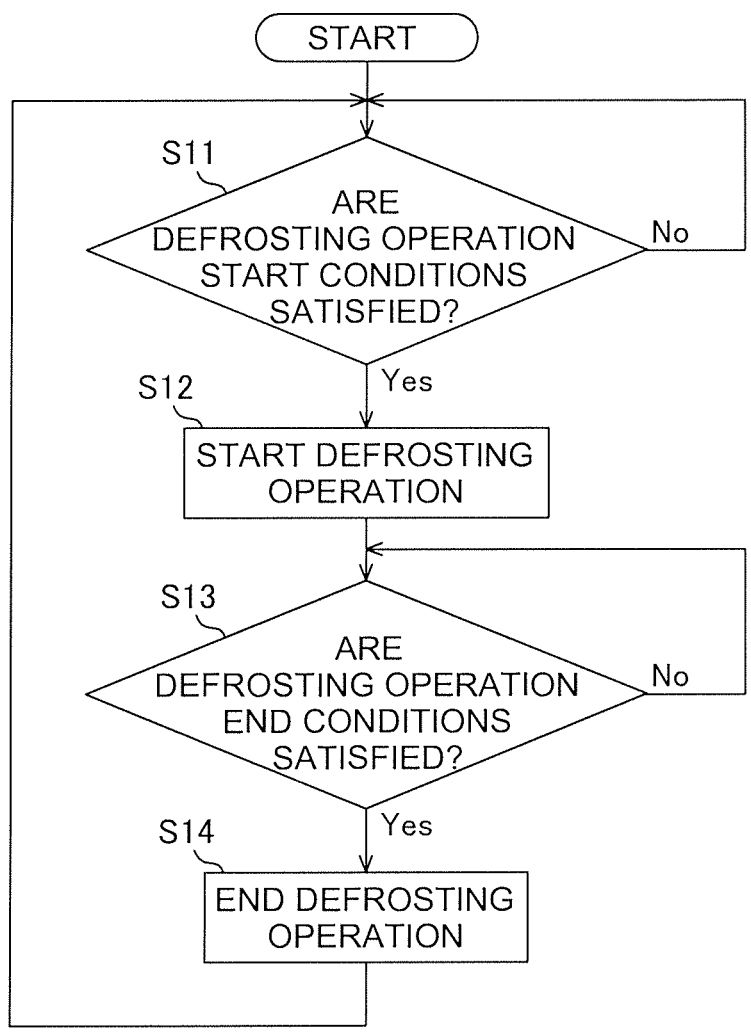
FIG. 4 is a flowchart showing the defrosting operation in Modification 3 of the first embodiment and Modification 2 of the second embodiment.

Operation in the defrosting operation is described below with reference to FIG. 4.

First, it is determined whether predetermined defrosting operation start conditions have been satisfied (i.e., whether defrosting of the heat-source-side heat exchanger 24 is required) (step S11). Here, it is determined whether the defrosting operation start conditions have been satisfied on the basis of whether the defrosting time interval $\Delta tdf$ (i.e., the cumulative operation time from the end of the previous defrosting operation) has reached the predetermined defrosting time interval setting value $\Delta tdfs$.

The process starts the defrosting operation below in the case that it has been determined that the defrosting operation start conditions have been satisfied (step S12).

When the defrosting operation is started, a switch is made in the heat-source-side refrigerant circuit 20 to switch the heat-source-side switching mechanism 23 to the heat-source-side radiating operation state (the state indicated by the solid line of heat-source-side switching mechanism 23 of FIG. 3), the first usage-side switching mechanism 53a is switched to the aqueous medium cooling operation state (i.e., the state in which the first usage-side discharge on-off valve 55a is closed and the first usage-side gas on-off valve 56a is open), and the intake return expansion valve 26a is set in a closed state.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with ice adhering to the heat-source-side heat exchanger 24 and radiated in the heat-source-side heat exchanger 24. The high-pressure heat-source-side refrigerant radiated in the heat-source-side heat exchanger is sent to the subcooler 27 through the heat-source-side expansion valve 25. Since the heat-source-side refrigerant does not flow in the intake return tube 26, the heat-source-side refrigerant sent to the subcooler 27 is sent from the heat source unit 2 to the liquid refrigerant communication tube 13 through the heat-source-side liquid refrigerant tube 24a and the liquid-side shutoff valve 29 without exchanging heat.

The heat-source-side refrigerant sent to the liquid refrigerant communication tube 13 branches in the liquid refrigerant communication tube 13 and is sent to the first usage unit 4a and the second usage unit 10a.

The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to become a low-pressure gas-liquid two-phase state, and is then sent to the first usage-side heat exchanger 41a by way of the first usage-side liquid refrigerant tube 45a. The low-pressure, heat-source-side refrigerant sent to the first usage-side heat exchanger 41a undergoes heat exchange with an aqueous medium circulated through the aqueous medium circuit 80a by the circulation pump 43a, and evaporates in the first usage-side heat exchanger 41a. The low-pressure, heat-source-side refrigerant thus evaporated in the first usage-side heat exchanger 41a is sent from the first usage unit 4a to the gas refrigerant communication tube 14 by way of the first usage-side gas refrigerant tube 54a and the first usage-side gas on-off valve 56a constituting the first usage-side switching mechanism 53a.

The heat-source-side refrigerant sent from the second usage unit 10a and the first usage unit 4a to the gas refrigerant communication tube 14 merges in the gas refrigerant communication tube 14 and is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In this manner, the heat-source-side switching mechanism 23 is placed in an operation state for dissipating heat-source-side heat, whereby the heat-source-side heat exchanger 24 is made to function as a radiator of the heat-source-side refrigerant and the second usage-side heat exchanger 101a is made to function as an evaporator of the heat-source-side refrigerant; and the first usage-side switching mechanism 53a is placed in an operation state for cooling the aqueous medium, whereby a defrosting operation is started for causing the first usage-side heat exchanger 41a to function as an evaporator of the heat-source-side refrigerant.

It is determined whether predetermined defrosting operation end conditions have been satisfied (i.e., whether defrosting of the heat-source-side heat exchanger 24 has ended; step S13). Here, it is determined whether the defrosting operation end conditions have been satisfied depending on whether the heat-source-side heat exchanger temperature Thx has reached a predetermined defrosting completion temperature Thxs, or whether the defrosting operation time tdf, which is the time elapsed from the start of the defrosting operation, has reached a predetermined defrosting operation setting time tdfs.

In the case that it has been determined that the defrosting operation end conditions have been satisfied, the defrosting operation is ended and the process returns to the hot-water supply operation mode, the air-warming operation mode, and/or the hot-water supply/air-warming operation mode (step S14).

With the heat pump system 1, the second usage-side heat exchanger 101a is thereby made to function as an evaporator of the heat-source-side refrigerant and the first usage-side heat exchanger 41a is made to function as an evaporator of the heat-source-side refrigerant when the heat-source-side heat exchanger 24 is to be defrosted. Therefore, the defrosting operation time tdf can be made shorter than in the case in which only the second usage-side heat exchanger 101a is made to function as an evaporator of the heat-source-side refrigerant, and it is possible to prevent the air medium cooled in the second usage unit 10a from reaching a low temperature.

(4) Modification 4

In the defrosting operation used in the heat pump system 1 in Modification 3, the aqueous medium cooled by evaporation of the heat-source-side refrigerant is liable to freeze because not only is the second usage-side heat exchanger 101a made to function as an evaporator of the heat-source-side refrigerant, but the first usage-side heat exchanger 41a is also made to function as an evaporator of the heat-source-side refrigerant.

Figure 5:
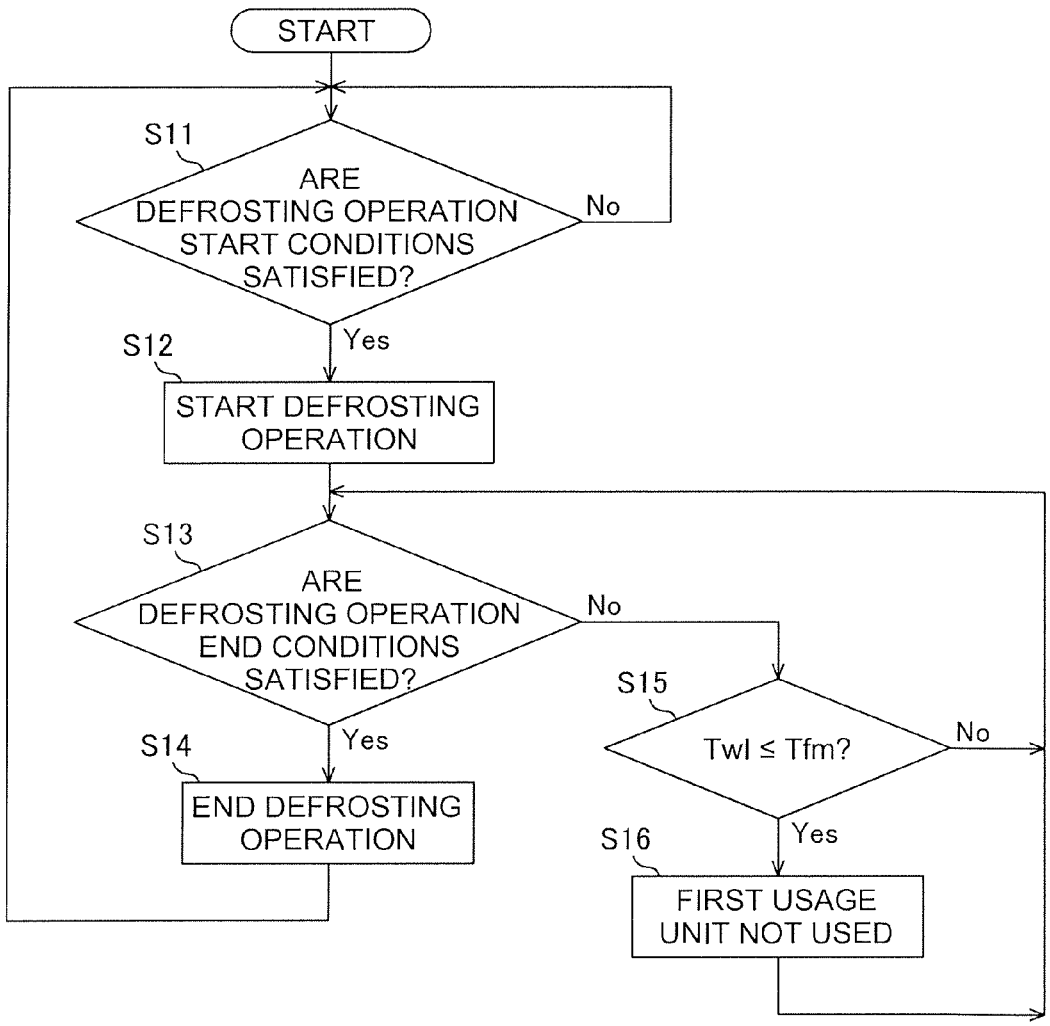
FIG. 5 is a flowchart showing the defrosting operation in Modification 4 of the first embodiment and Modification 3 of the second embodiment.

In view of the above, in the defrosting operation of the heat pump system 1, the first usage-side heat exchanger 41a is made to stop functioning as an evaporator of the heat-source-side refrigerant (step S16) in the case that the temperature of the aqueous medium (in this case, the aqueous medium outlet temperature Tw1) cooled by the evaporation of the heat-source-side refrigerant in the first usage-side heat exchanger 41a has fallen to a predetermined freezing-lower-limit temperature Tfm or less (step S15) before it has been determined that the defrosting operation end conditions have been satisfied (step S13), as shown in FIG. 5. Here, the first usage-side flow rate adjustment valve 42a and/or the first usage-side gas on-off valve 56a is closed in order to stop the first usage-side heat exchanger 41a from functioning as an evaporator of the heat-source-side refrigerant. After the first usage-side heat exchanger 41a has been stopped from functioning as an evaporator of the heat-source-side refrigerant, a defrosting operation is carried out to cause only the second usage-side heat exchanger 101a to function as an evaporator of the heat-source-side refrigerant until the defrosting operation end conditions have been satisfied (from step S13 to step S14).

With the heat pump system 1, the aqueous medium can be prevented from freezing due to the defrosting operation because the first usage-side heat exchanger 41a is stopped from being made to function as an evaporator of the heat-source-side refrigerant in the case that the temperature of the aqueous medium (in this case, the aqueous medium outlet temperature Tw1) cooled by evaporation of the heat-source-side refrigerant in the first usage-side heat exchanger 41a has fallen to the freezing-lower-limit temperature Tfm or less.

(5) Modification 5

With the defrosting operation used in the heat pump system 1 in Modification 3, the aqueous medium cooled by evaporation of the heat-source-side refrigerant is liable to freeze because not only is the second usage-side heat exchanger 101a made to function as an evaporator of the heat-source-side refrigerant, but the first usage-side heat exchanger 41a is also made to function as an evaporator of the heat-source-side refrigerant.

Figure 6:
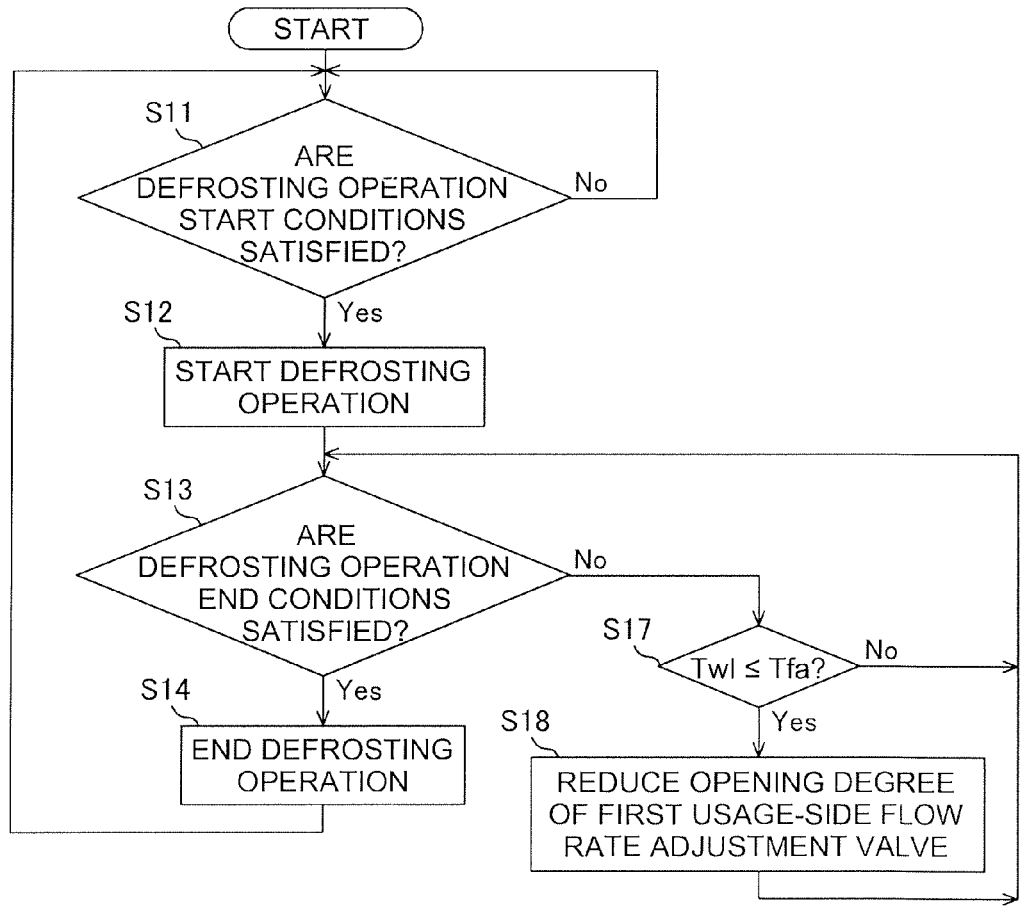
FIG. 6 is a flowchart showing the defrosting operation in Modification 5 of the first embodiment and Modification 4 of the second embodiment.

In view whereof, in the defrosting operation of the heat pump system 1, a control is performed to reduce the opening degree of the first usage-side flow rate adjustment valve 42a (step S18) in the case that the temperature of the aqueous medium (in this case, the aqueous medium outlet temperature Tw1) cooled by the evaporation of the heat-source-side refrigerant in the first usage-side heat exchanger 41a has fallen to a predetermined freeze-warning temperature Tfa or less (step S17) before it has been determined that the defrosting operation end conditions have been satisfied (step S13), as shown in FIG. 6. The defrosting operation in which the first usage-side heat exchanger 41a and the second usage-side heat exchanger 101a are made to function as an evaporator of the heat-source-side refrigerant is performed until the defrosting operation end conditions are satisfied while the function of the first usage-side heat exchanger 41a as an evaporator of the heat-source-side refrigerant is gradually reduced (from step S13 to step S14). Here, the freeze-warning temperature Tfa may be modified so as to be reduced in accompaniment with the reduction in the opening degree of the first usage-side flow rate adjustment valve 42a.

With the heat pump system 1, the defrosting operation can thereby be continued while the aqueous medium is prevented from freezing because a control is performed to reduce the opening degree of the first usage-side flow rate adjustment valve 42a in the case that the temperature of the aqueous medium (in this case, the aqueous medium outlet temperature Tw1) cooled by the evaporation of the heat-source-side refrigerant in the first usage-side heat exchanger 41a has fallen to the freeze-warning temperature Tfa or less during the defrosting operation.

Although the aqueous medium can be kept from freezing when the opening degree of the first usage-side flow rate adjustment valve 42a is reduced, defrosting of the heat-source-side heat exchanger 24 is insufficiently performed and unmelted ice remains. When such a defrosting operation is repeated, ice-up occurs in which ice grows in the heat-source-side heat exchanger 24 and the heat-source-side heat exchanger 24 is liable to no longer sufficiently function as an evaporator of the heat-source-side refrigerant.

Figure 7:
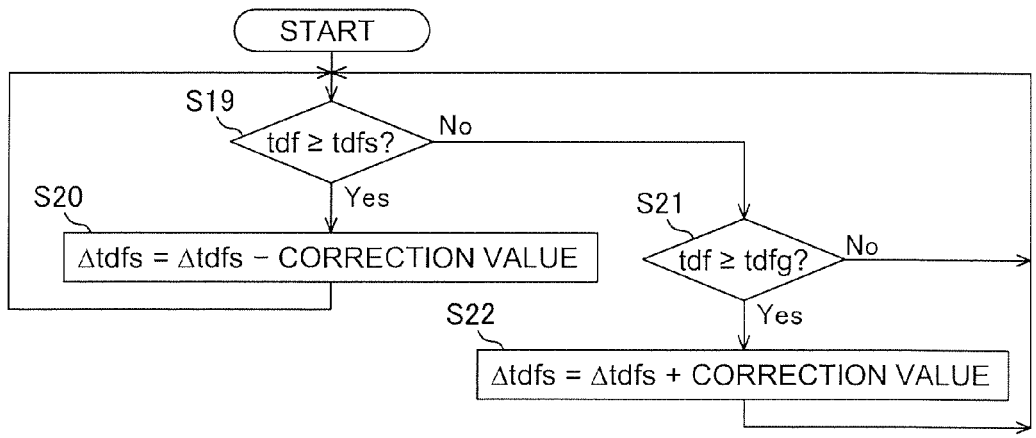
FIG. 7 is a flowchart showing the processing for changing the defrosting time interval in Modification 5 of the first embodiment and Modification 4 of the second embodiment.

In view of this situation, in addition to the control of the first usage-side flow rate adjustment valve 42a in the defrosting operation of the heat pump system 1, the defrosting time interval-setting value Δtdfs until the start of the next defrosting operation of the heat-source-side heat exchanger 24 is reduced (step S20; Δtdfs=Δtdfs−correction value) in the case that the defrosting of the heat-source-side heat exchanger 24 is not completed when the defrosting operation time tdf is equal to or less than the defrosting operation setting time tdfs, i.e., in the case that the defrosting operation time tdf reaches the defrosting operation setting time tdfs before the heat-source-side heat exchanger temperature Thx reaches the predetermined defrosting completion temperature Thxs (step S19), as shown in FIG. 7. Conversely, in the case that defrosting of the heat-source-side heat exchanger 24 has been completed when the defrosting operation time tdf is less than the defrosting operation setting time tdfs, i.e., in the case that the heat-source-side heat exchanger temperature Thx has reached the predetermined defrosting completion temperature Thxs before the defrosting operation time tdf has reached the defrosting operation setting time tdfs (step S19), and in the further case that it has been determined whether the defrosting operation time tdf is equal to or less than a predetermined defrosting operation completion time tdfg (step S21) and the defrosting operation time tdf is not equal to or less than the defrosting operation completion time tdfg, the defrosting time interval-setting value Δtdfs in the next defrosting operation is kept at the current setting value (from step S21 to step S19; Δtdfs=Δtdfs); and in the case that the defrosting operation time tdf is equal to or less than the defrosting operation completion time tdfg, the defrosting time interval-setting value Δtdfs is increased (step S22; Δtdfs=Δtdfs+correction value).

In addition to performing control to reduce the opening degree of the first usage-side flow rate adjustment valve 42a in the heat pump system 1, in the case that the temperature of the aqueous medium (in this case, the aqueous medium outlet temperature Tw1) cooled by the evaporation of the heat-source-side refrigerant in the first usage-side heat exchanger 41a is equal to or less than the freeze-warning temperature Tfa during the defrosting operation, the defrosting time interval-setting value Δtdfs until the start of the next defrosting of the heat-source-side heat exchanger 24 is reduced in the case that the defrosting of the heat-source-side heat exchanger 24 has not been completed at the defrosting operation setting time tdfs or less, whereby the defrosting operation can be carried out while the freezing of the aqueous medium is prevented and occurrence of ice-up is minimized.

(6) Modification 6

A configuration such as that of the heat pump system 1 (see FIG. 3) in Modifications 2 to 5 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant discharged from the heat-source-side compressor 21 stagnates in the discharge refrigerant communication tube 12 and the flow rate of the heat-source-side refrigerant taken into the heat-source-side compressor 21 is liable to be insufficient (i.e., an insufficient refrigerant-circulation rate) in the case that the first usage unit 4a performs operation for cooling the aqueous medium by evaporation of the heat-source-side refrigerant (cool water-supply operation), or in the case that the operation of the first usage unit 4a is stopped and the second usage unit 10a (air-cooling operation and/or air-warming operation) is operated (i.e., the case in which the discharge refrigerant communication tube 12 is not used).

Figure 8:
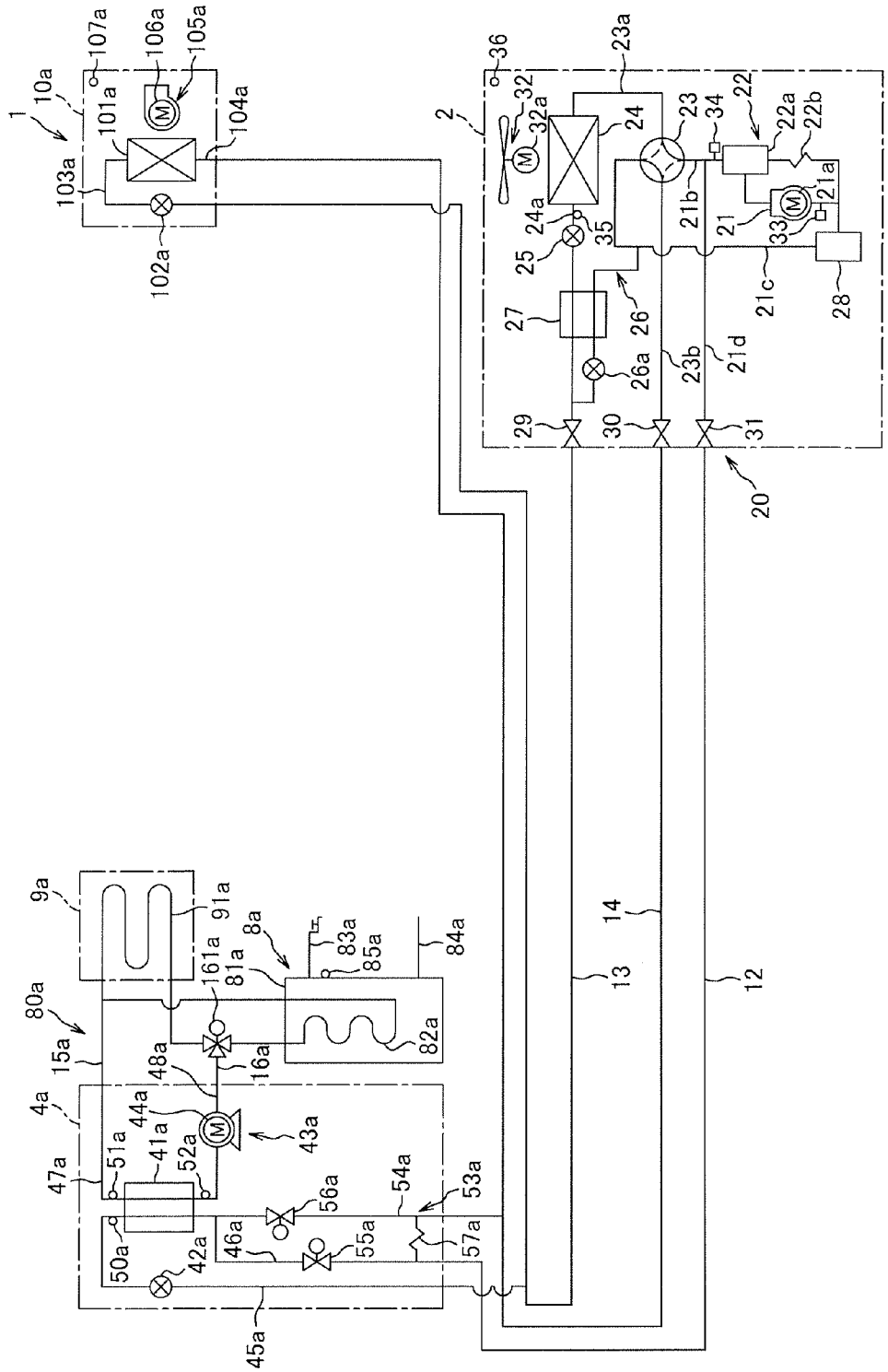
FIG. 8 is a view showing the general configuration of the heat pump system according to Modifications 6 and 8 of the first embodiment.

In view of the above, the heat pump system 1 is provided with a first refrigerant recovery mechanism 57a for placing the discharge refrigerant communication tube 12 and the gas refrigerant communication tube 14 in communication when the first usage-side switching mechanism 53a is in the aqueous medium-heating operation state or the aqueous medium cooling operation state, as shown in FIG. 8. Here, the first refrigerant recovery mechanism 57a is a refrigerant tube having a capillary tube in which one end is connected to the portion of the first usage-side discharge refrigerant tube 46a that connects the first usage-side discharge on-off valve 55a and the discharge refrigerant communication tube 12, and the other end is connected to the portion of the first usage-side gas refrigerant tube 54a that connects the first usage-side gas on-off valve 56a and the gas refrigerant communication tube 14; and the discharge refrigerant communication tube 12 and the gas refrigerant communication tube 14 are in communication regardless of the on-off state of the first usage-side discharge on-off valve 55a and/or the first usage-side gas on-off valve 56a.

In the heat pump system 1, the heat-source-side refrigerant is thereby made less likely to stagnate in the discharge refrigerant communication tube 12, and it is therefore possible to minimize the occurrence of an insufficient refrigerant-circulation rate in the heat-source-side refrigerant circuit 20.

(7) Modification 7

A configuration such as that of the heat pump systems 1 (see FIGS. 3 and 8) in Modifications 2 to 6 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant stagnates in the first usage-side heat exchanger 41a and the flow rate of the heat-source-side refrigerant taken into the heat-source-side compressor 21 is liable to be insufficient (i.e., an insufficient refrigerant-circulation rate) in the case that the operation of the first usage unit 4a is stopped and the second usage unit 10a is operated (air-cooling operation or air-warming operation).

Figure 9:
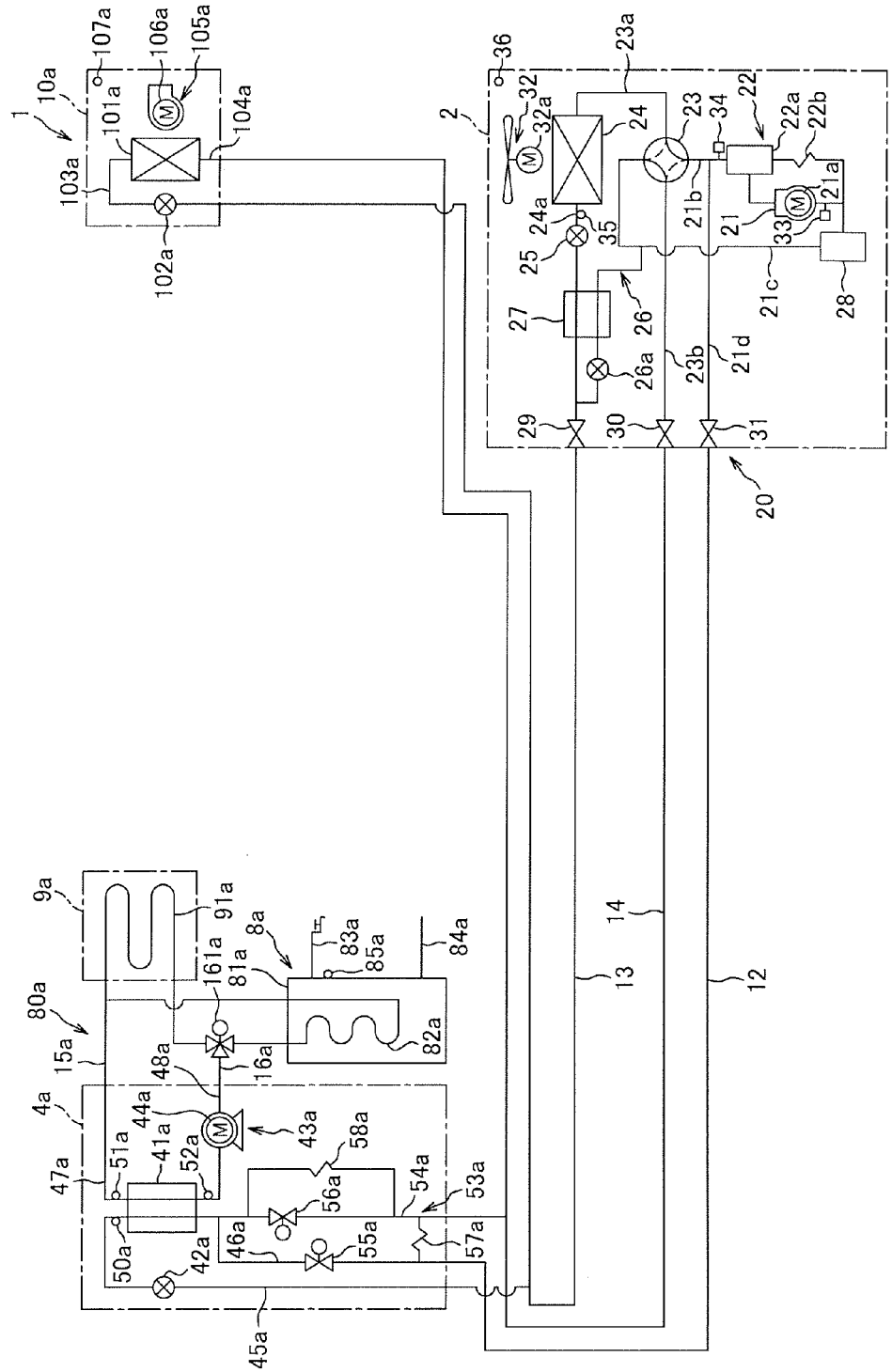
FIG. 9 is a view showing the general configuration of the heat pump system according to Modifications 7 and 8 of the first embodiment.

In view of the above, in this heat pump system 1, there is provided a second refrigerant recovery mechanism 58a placing the first usage-side heat exchanger 41a and the gas refrigerant communication tube 14 in communication when the first usage-side switching mechanism 53a is in an aqueous medium-heating operation state or in an aqueous medium cooling operation state, as shown in FIG. 9. Here, the second refrigerant recovery mechanism 58a is a tube having a capillary tube in which one end is connected to the portion of the first usage-side gas refrigerant tube 54a that connects the gas side of the first usage-side heat exchanger 41a and the first usage-side gas on-off valve 56a, and the other end is connected to the portion of the first usage-side gas refrigerant tube 54a that connects the first usage-side gas on-off valve 56a and the gas refrigerant communication tube 14; and the second refrigerant recovery mechanism 58a bypasses the first usage-side gas on-off valve 56a and places the first usage-side heat exchanger 41a and the gas refrigerant communication tube 14 in communication even in the case that the operation of the first usage unit 4a is stopped.

In this heat pump system 1, the heat-source-side refrigerant is thereby made less likely to stagnate in the first usage-side heat exchanger 41a, and it is therefore possible to minimize the occurrence of an insufficient refrigerant-circulation rate in the heat-source-side refrigerant circuit 20.

(8) Modification 8

A configuration such as that of the heat pump systems 1 (see FIGS. 3, 8, and 9) in Modifications 2 to 7 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant discharged from the heat-source-side compressor 21 stagnates in the discharge refrigerant communication tube 12 and the flow rate of the heat-source-side refrigerant taken into the heat-source-side compressor 21 is liable to be insufficient (i.e., an insufficient refrigerant-circulation rate) in the case that the first usage unit 4a performs an operation for cooling the aqueous medium by the cooling of the heat-source-side refrigerant (cool water-supply operation), or in the case that the operation of the first usage unit 4a is stopped and the second usage unit 10a (air-cooling operation and/or air-warming operation) is operated (i.e., the case of operation in which the discharge refrigerant communication tube 12 is not used); and in the case that the operation of the first usage unit 4a is stopped and the second usage unit 10a is operated (air-cooling operation and/or air-warming operation), the heat-source-side refrigerant stagnates in the first usage-side heat exchanger 41a and the flow rate of the heat-source-side refrigerant taken into the heat-source-side compressor 21 is liable to be insufficient (i.e., an insufficient refrigerant-circulation rate).

Such an insufficient refrigerant-circulation rate is thought to be mostly resolved by providing the first refrigerant recovery mechanism 57a and/or the second refrigerant recovery mechanism 58a in Modifications 7 and 8. However, an insufficient flow rate of the heat-source-side refrigerant (i.e., an insufficient refrigerant-circulation rate) taken into the heat-source-side compressor 21 is still liable to occur in the case that operation is continued for a long period of time under conditions in which the above-described insufficient refrigerant-circulation rate readily occurs, and/or when the first usage-side discharge on-off valve 55a and/or the first usage-side gas on-off valve 56a constituting the first usage-side switching mechanism 53a has not been sufficiently closed off, or due to some other factor.

Figure 10:
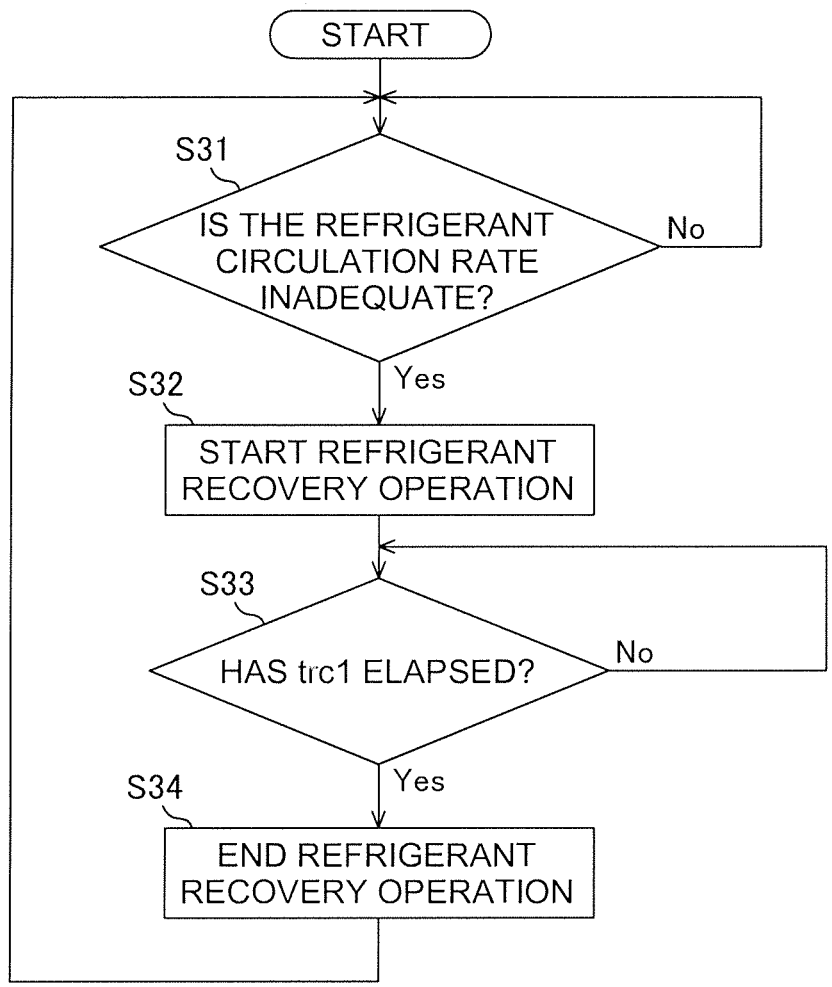
FIG. 10 is a flowchart showing the refrigerant recovery operation in Modification 8 of the first embodiment and Modification 7 of the second embodiment.

In view whereof, in this heat pump system 1, a refrigerant recovery operation in which the first usage-side heat exchanger 41a is made to function as a radiator of the heat-source-side refrigerant is performed by setting the first usage-side switching mechanism 53a in an aqueous medium-heating operation state (step S32), in the case that the first usage-side switching mechanism 53a is in an aqueous medium cooling operation state and at least the second usage unit 10a is operating, and in the case that it has been determined that the flow rate of the heat-source-side refrigerant taken into the heat-source-side compressor 21 is insufficient (step S31), as shown in FIG. 10. Here, in relation to determining whether the flow rate of the heat-source-side refrigerant being taken into the heat-source-side compressor 21 is insufficient, an insufficient refrigerant-circulation rate is determined to have occurred when, e.g., the heat-source-side intake pressure Ps1 is equal to or less than the predetermined refrigerant circulation-rate insufficiency pressure Prc1. Also, the state of operation prior to the refrigerant recovery operation is maintained in relation to the operation of the second usage unit 10a during the refrigerant recovery operation. After the refrigerant recovery operation has been performed for a predetermined refrigerant recovery operation time trc1 (step S33), the first usage unit 4a is restored to the operation state that existed prior to the refrigerant recovery operation (step S34).

In this heat pump system 1, the heat-source-side refrigerant is thereby made less likely to stagnate in the discharge refrigerant communication tube 12, and since the heat-source-side refrigerant is less likely to stagnate in the first usage-side heat exchanger 41a, it is therefore possible to minimize the occurrence of an insufficient refrigerant-circulation rate in the heat-source-side refrigerant circuit 20.

(9) Modification 9

In the heat pump systems 1 (see FIGS. 3, 8, and 9) in the Modifications 2 to 8, the first usage-side switching mechanism 53a is composed of the first usage-side discharge on-off valve 55a and the first usage-side gas on-off valve 56a, and the heat-source-side refrigerant is therefore fed from only the discharge refrigerant communication tube 12 to the first usage unit 4a in any operation mode that accompanies a hot-water supply operation.

However, the heat-source-side refrigerant is at the high pressure of the refrigeration cycle not only in the discharge refrigerant communication tube 12, but also in the gas refrigerant communication tube 14 in the hot-water supply operation mode and/or the hot-water supply/air-warming operation mode among the operation modes that accompany hot-water supply operation. Therefore, it is also possible to allow high-pressure, heat-source-side refrigerant to be sent from not only the discharge refrigerant communication tube 12, but also from the gas refrigerant communication tube 14 to the first usage unit 4a in the hot-water supply operation mode and/or the hot-water supply/air-warming operation mode.

Figure 11:
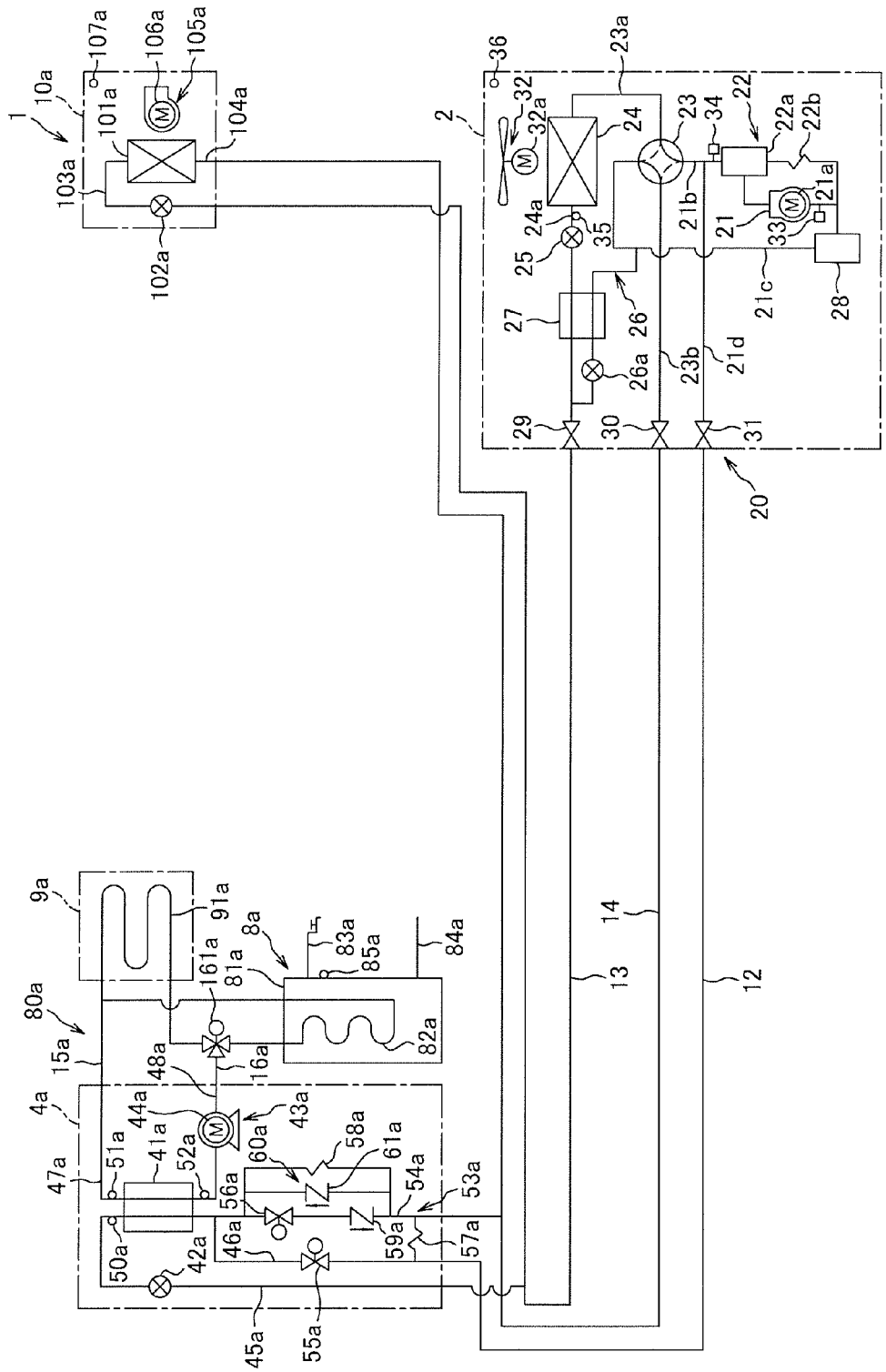
FIG. 11 is a view showing the general configuration of the heat pump system according to Modification 9 of the first embodiment.

In view of the above, in this heat pump system 1, a first usage-side gas non-return valve 59a and a first usage-side bypass refrigerant tube 60a are furthermore provided to the first usage-side gas refrigerant tube 54a; and, together with the first usage-side discharge on-off valve 55a and the first usage-side gas on-off valve 56a, constitute the first usage-side switching mechanism 53a, as shown in FIG. 11. Here, the first usage-side gas non-return valve 59a is provided to the portion of the first usage-side gas refrigerant tube 54a that connects the first usage-side gas on-off valve 56a and the gas refrigerant communication tube 14. The first usage-side gas non-return valve 59a is a non-return valve that allows the flow of heat-source-side refrigerant from the first usage-side heat exchanger 41a toward the gas refrigerant communication tube 14, and prohibits the flow of the heat-source-side refrigerant from the gas refrigerant communication tube 14 toward the first usage-side heat exchanger 41a; and the flow of heat-source-side refrigerant from the gas refrigerant communication tube 14 toward the first usage-side heat exchanger 41a by way of the first usage-side gas on-off valve 56a is thereby prohibited. The first usage-side bypass refrigerant tube 60a is connected to the first usage-side gas refrigerant tube 54a so as to bypass the first usage-side gas on-off valve 56a and the first usage-side gas non-return valve 59a, and constitutes a portion of the first usage-side gas refrigerant tube 54a. The first usage-side bypass refrigerant tube 60a is provided with the first usage-side gas non-return valve 59a for allowing the flow of heat-source-side refrigerant from the gas refrigerant communication tube 14 to the first usage-side heat exchanger 41a and prohibiting the flow of heat-source-side refrigerant from the first usage-side heat exchanger 41a to the gas refrigerant communication tube 14, whereby the flow of heat-source-side refrigerant from the gas refrigerant communication tube 14 to the first usage-side heat exchanger 41a is allowed by way of the first usage-side bypass refrigerant tube 60a.

In this heat pump system 1, high-pressure, heat-source-side refrigerant can thereby be sent from not only the discharge refrigerant communication tube 12, but also from the gas refrigerant communication tube 14 to the first usage unit 4a in the hot-water supply operation mode and the hot-water supply/air-warming operation mode. Therefore, the loss of pressure of the heat-source-side refrigerant fed from the heat source unit 2 to the first usage unit 4a is reduced, which can contribute to an improvement in the hot-water supply capacity and/or operation efficiency.

(10) Modification 10

Figure 12:
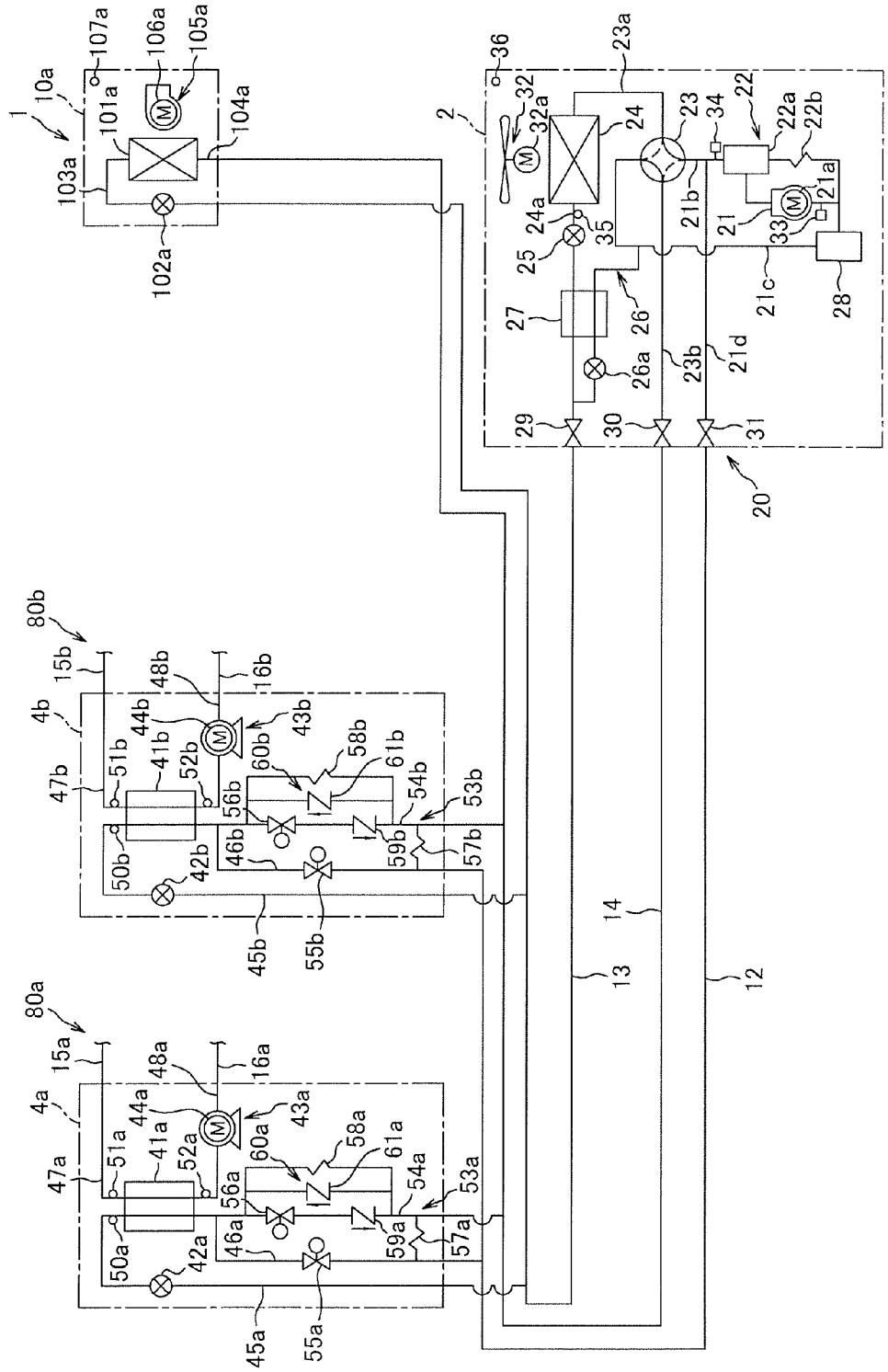
FIG. 12 is a view showing the general configuration of the heat pump system according to Modification 10 of the first embodiment.
Figure 13:
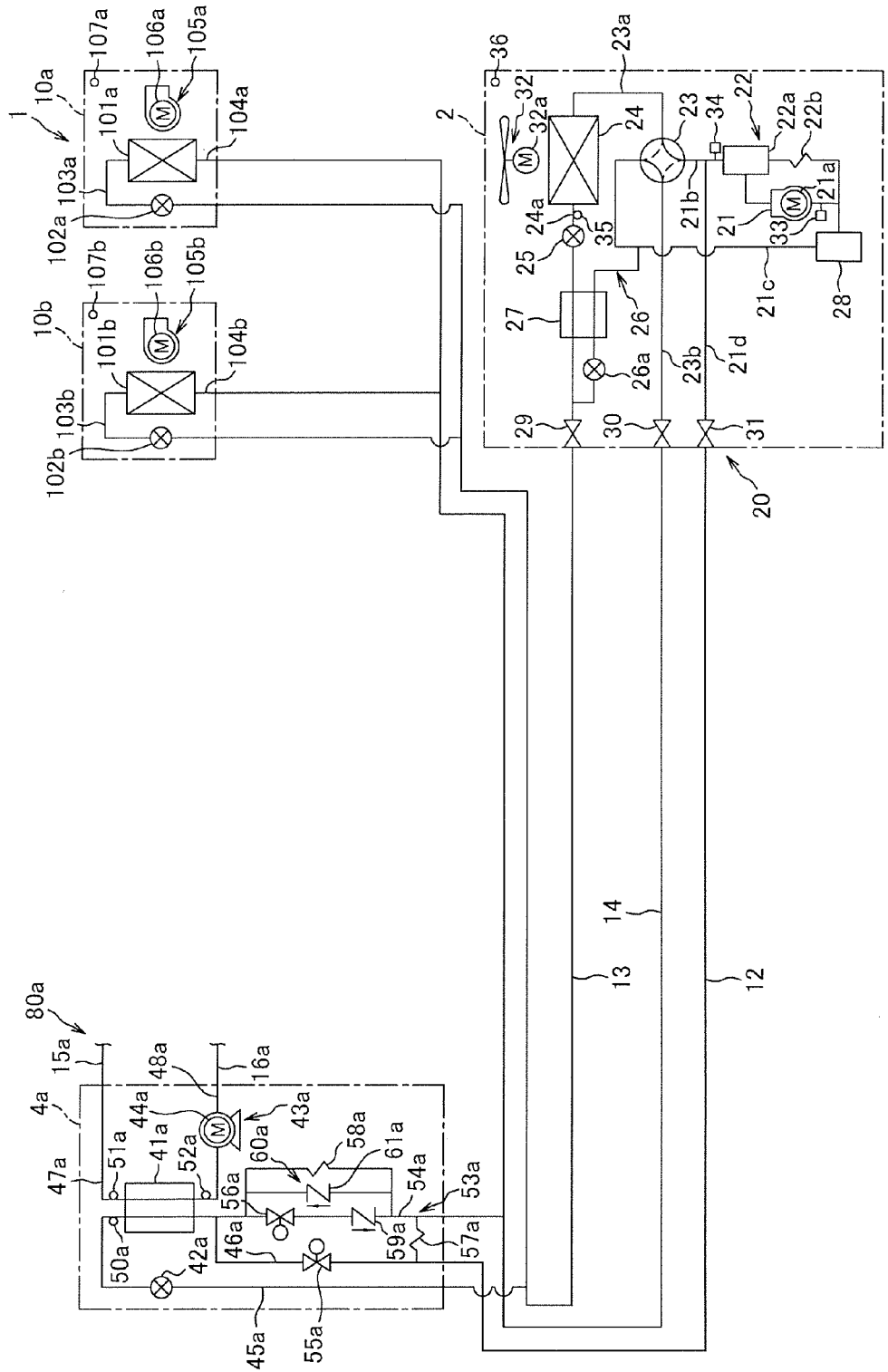
FIG. 13 is a view showing the general configuration of the heat pump system according to Modification 10 of the first embodiment.
Figure 14:
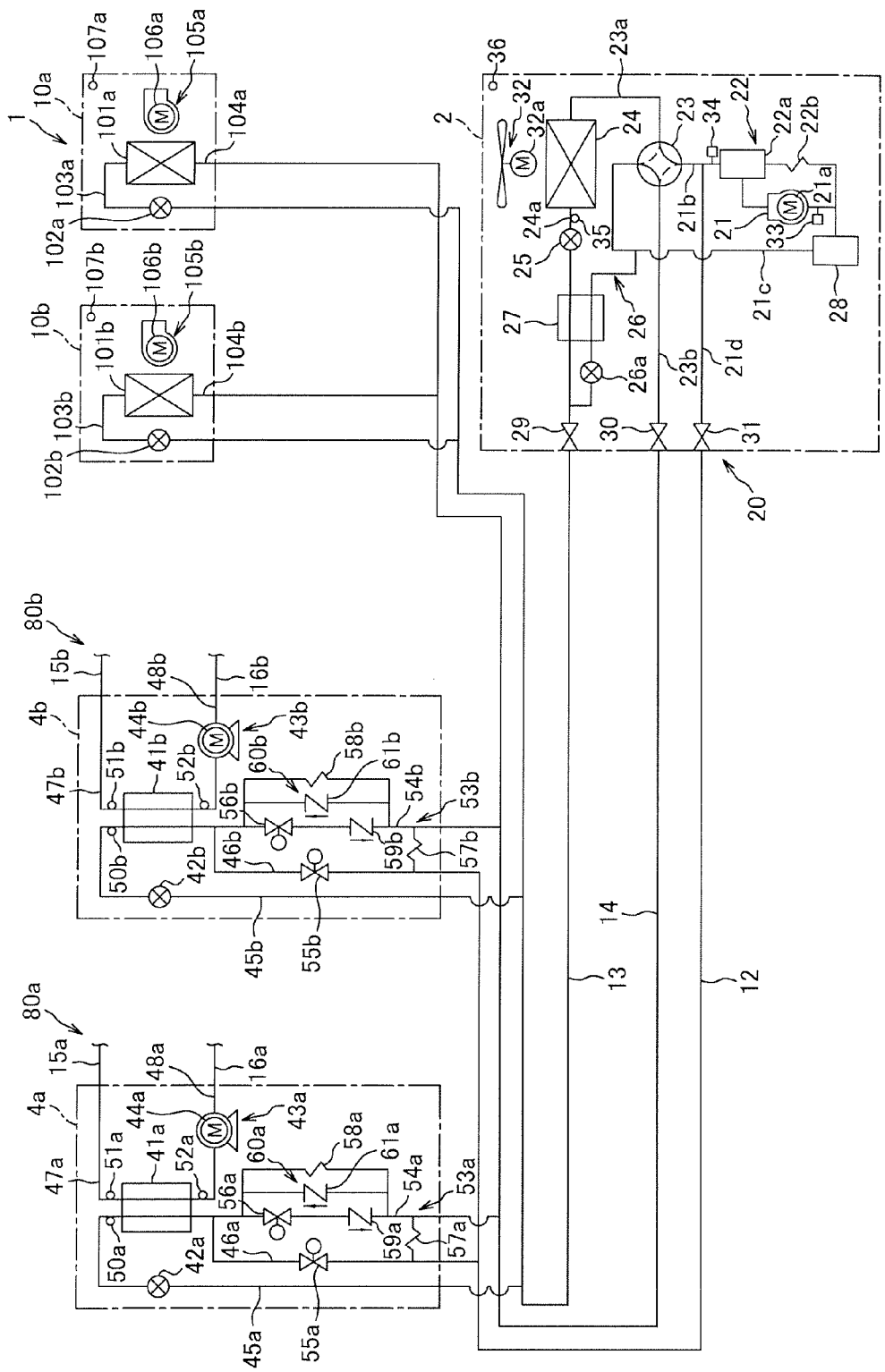
FIG. 14 is a view showing the general configuration of the heat pump system according to Modification 10 of the first embodiment.

In the heat pump systems 1 described above (see FIGS. 3, 8, 9, and 11), a single first usage unit 4a and a single second usage unit 10a are connected to the heat source unit 2 via the refrigerant communication tubes 12, 13, 14, but a plurality of first usage units 4a, 4b (two, in this case) may be connected in parallel to each other via the refrigerant communication tubes 12, 13, 14, and/or a plurality of second usage units 10a, 10b (two, in this case) may be connected in parallel to each other via the refrigerant communication tubes 13, 14, as shown in FIGS. 12 to 14 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10a, and a description of each part of the second usage unit 10b is therefore omitted.

In these heat pump systems 1, it is possible to accommodate a plurality of locations and/or applications that require heating of the aqueous medium, and it is possible to accommodate a plurality of locations and/or applications that require cooling of the air medium.

(11) Modification 11

Figure 15:
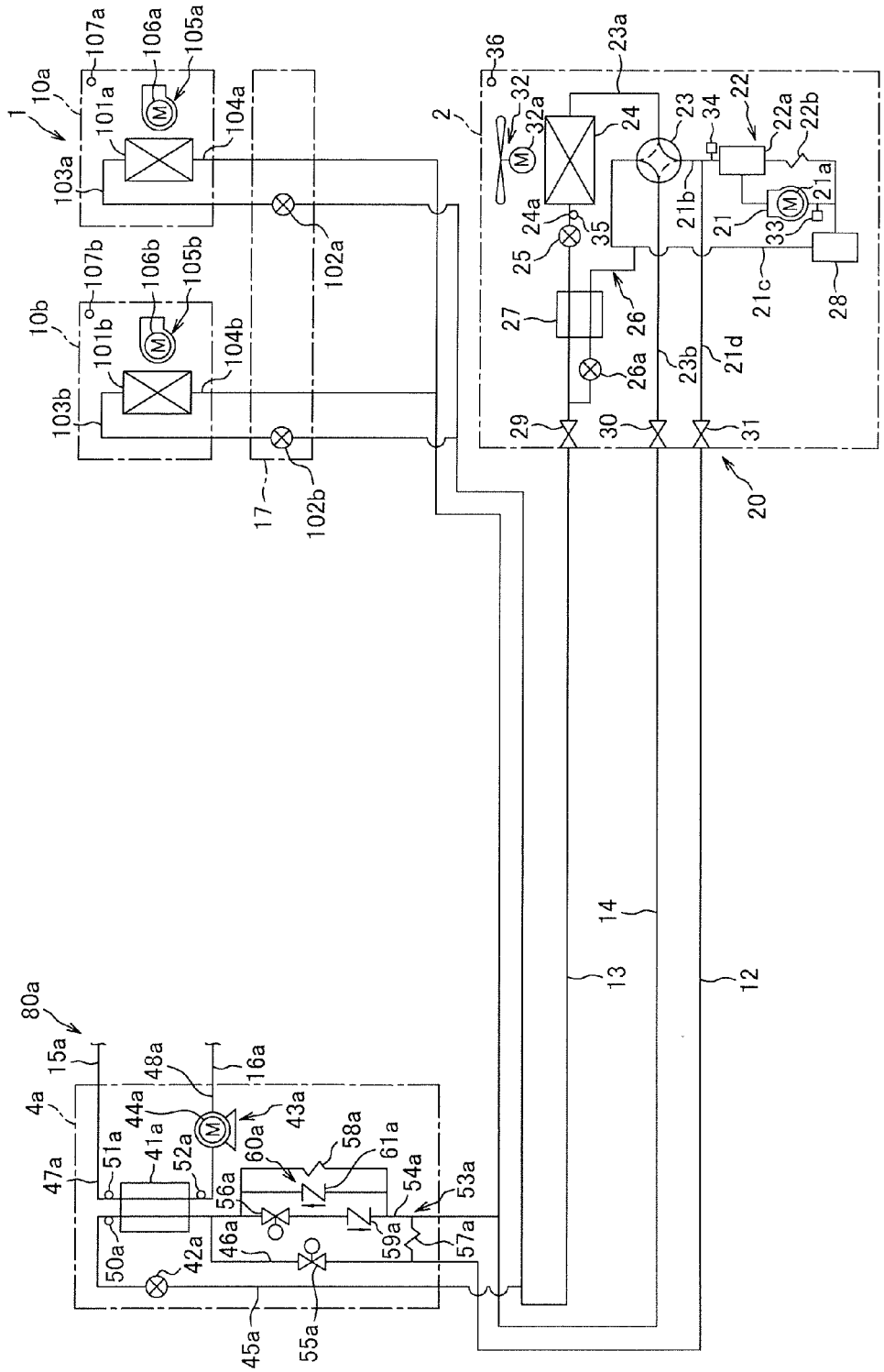
FIG. 15 is a view showing the general configuration of the heat pump system according to Modification 11 of the first embodiment.

In the heat pump systems 1 described above (see FIGS. 3, 8, 9, and 11 to 14), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 15 (in this case, the hot-water/air-warming unit, the hot-water storage unit, the aqueous medium circuits 80a, and the like are not shown).

Second Embodiment

In the heat pump system 1 in the first embodiment and modifications thereof described above, operation must be carried out under conditions in which the pressure of the heat-source-side refrigerant in the discharge of the heat-source-side compressor 21 is increased, or under other poor conditions in order to obtain a high-temperature aqueous medium such as hot water at, e.g., 65° C. or higher, and such an operation is not regarded as a preferred operation.

Figure 16:
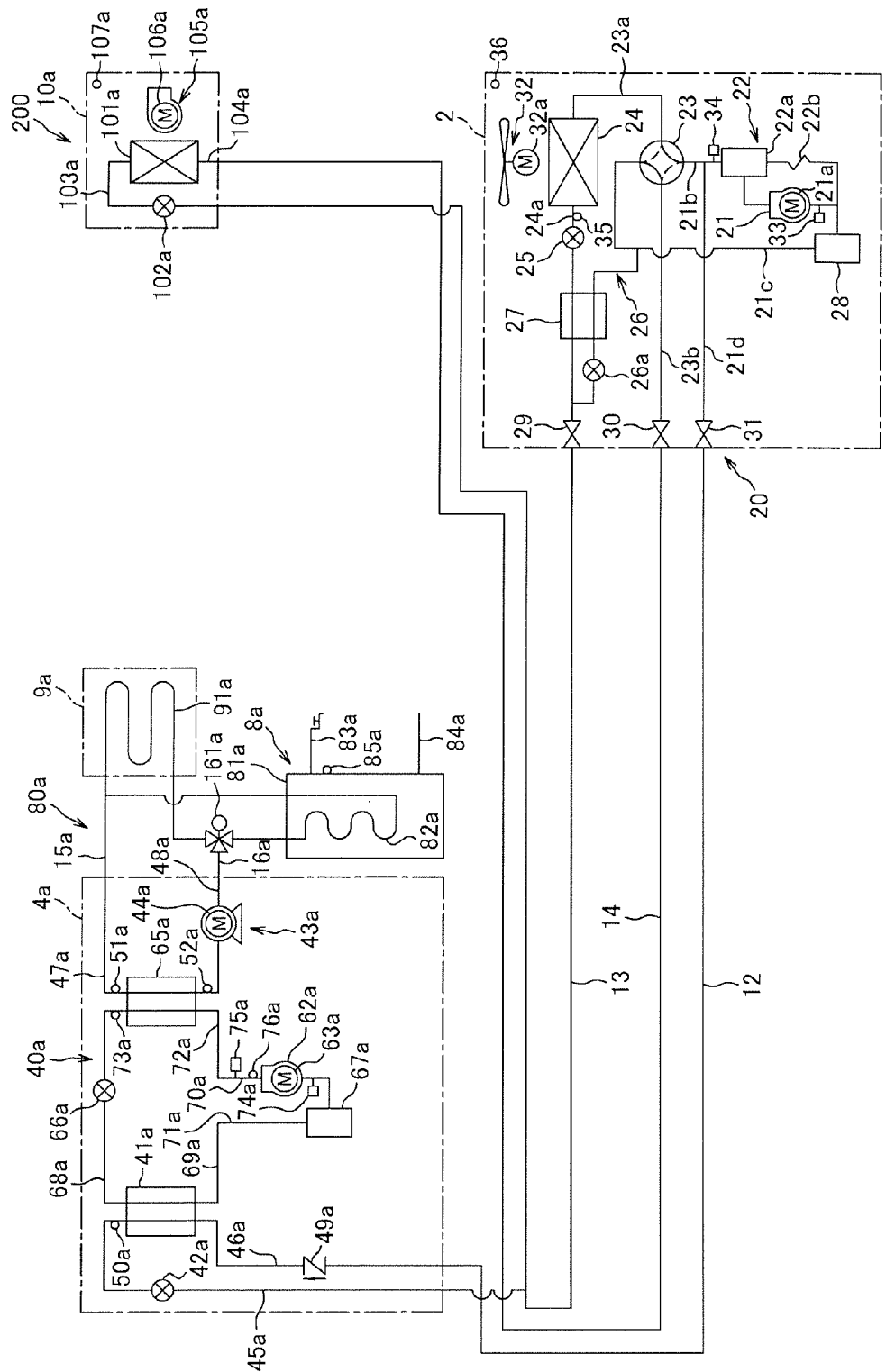
FIG. 16 is a view showing the general configuration of the heat pump system according to the second embodiment and Modification 1 of the present invention.

In view of the above, with the heat pump system 200, the first usage-side heat exchanger 41a in the configuration of the heat pump system 1 in the first embodiment described above (FIG. 1) is a heat exchanger for exchanging heat between the heat-source-side refrigerant introduced from the discharge refrigerant communication tube 12 and the usage-side refrigerant, which is separate from the heat-source-side refrigerant; and the first usage unit 4a is further provided with a usage-side compressor 62a (described later) for compressing the usage-side refrigerant, and/or a refrigerant/water heat exchanger 65a (described later) that can function as a radiator of the usage-side refrigerant and heat the aqueous medium, and, together with the first usage-side heat exchanger 41a, thereby constituting the usage-side refrigerant circuit 40a through which the usage-side refrigerant circulates, as shown in FIG. 16. The configuration of the heat pump system 200 is described below.

<Configuration>

—Overall Configuration—

FIG. 16 is a schematic structural diagram of the heat pump system 200 according to the second embodiment of the present invention. The heat pump system 200 is an apparatus capable of performing an operation for heating an aqueous medium, and other operation using a vapor compression heat pump cycle.

The heat pump system 200 mainly has a heat source unit 2, a first usage unit 4a, a second usage unit 10a, a discharge refrigerant communication tube 12, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water as the aqueous medium circulates in the aqueous medium circuit 80a.

In the description related to the configurations below, the same reference numerals will be used and a description omitted for the configuration of the heat source unit 2, the second usage unit 10a, the hot-water storage unit 8a, the hot-water air-warming unit 9a, the discharge refrigerant communication tube 12, the liquid refrigerant communication tube 13, the gas-refrigerant communication tube 14, and the aqueous medium communication tubes 15a, 16a, all of which have the same configuration as those of heat pump system 1 in the first embodiment (see FIG. 1). Only the configuration of the first usage unit 4a will be described.

—First Usage Unit—

The first usage unit 4a is arranged indoors, is connected to the heat source unit 2 and the second usage unit 10a via the refrigerant communication tubes 12, 13, and constitutes a portion of the heat-source-side refrigerant circuit 20. The first usage unit 4a constitutes the usage-side refrigerant circuit 40a. The first usage unit 4a is connected to the hot-water storage unit 8a and the hot-water air-warming unit 9a via the aqueous medium communication tubes 15a, 16a and constitutes a portion of aqueous medium circuit 80a.

The first usage unit 4a mainly has the first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

The first usage-side heat exchanger 41a is a heat exchanger that functions as a radiator of the heat-source-side refrigerant by performing heat exchange between the heat-source-side refrigerant and the usage-side refrigerant. A first usage-side liquid refrigerant tube 45a is connected to the liquid side of the channel through which the heat-source-side refrigerant flows. A first usage-side discharge refrigerant tube 46a is connected to the gas side of the channel through which the heat-source-side refrigerant flows. A cascade-side liquid-refrigerant tube 68a is connected to the liquid side of the channel through which the usage-side refrigerant flows, and a second cascade-side gas-refrigerant tube 69a is connected to the gas side of the channel through which the usage-side refrigerant flows. The liquid refrigerant communication tube 13 is connected to the first usage-side liquid refrigerant tube 45a. The discharge refrigerant communication tube 12 is connected to the first usage-side discharge refrigerant tube 46a. The refrigerant/water heat exchanger 65a is connected to the cascade-side liquid-refrigerant tube 68a, and the usage-side compressor 62a is connected to the second cascade-side gas-refrigerant tube 69a.

The first usage-side flow rate adjustment valve 42a is an electrical expansion valve that can vary the flow rate of the heat-source-side refrigerant that flows through the first usage-side heat exchanger 41a by controlling the opening degree, and is provided to the first usage-side liquid refrigerant tube 45a.

The first usage-side discharge refrigerant tube 46a is provided with a first usage-side discharge non-return valve 49a for allowing the flow of heat-source-side refrigerant from the discharge refrigerant communication tube 12 to the first usage-side heat exchanger 41a and for prohibiting the flow of heat-source-side refrigerant from the first usage-side heat exchanger 41a to the discharge refrigerant communication tube 12.

The usage-side compressor 62a is a mechanism for compressing the usage-side refrigerant, and in this case, is a sealed compressor having rotary elements, scroll elements, or other type of positive displacement compression elements (not shown) accommodated in a casing (not shown), and is driven by a usage-side compression motor 63a accommodated in the same casing. A high-pressure space (not shown) which is filled with the usage-side refrigerant that has been compressed in the compression element is formed inside the casing of the usage-side compressor 62a, and refrigeration machine oil is accumulated in this high-pressure space. The rotational speed (i.e., operational frequency) of the usage-side compression motor 63a can be varied by using an inverter device (not shown), whereby the capacity of the usage-side compressor 62a can be controlled. A cascade-side discharge tube 70a is connected to the discharge of the usage-side compressor 62a, and a cascade-side intake tube 71a is connected to the intake of the usage-side compressor 62a. The cascade-side gas-refrigerant tube 71a is connected to the second cascade-side gas-refrigerant tube 69a.

The refrigerant/water heat exchanger 65a is a heat exchanger that functions as a radiator of the usage-side refrigerant by heat exchange between the usage-side refrigerant and the aqueous medium. A cascade-side liquid-refrigerant tube 68a is connected to the liquid side of the channel through which the usage-side refrigerant flows. A first cascade-side gas-refrigerant tube 72a is connected to the gas side of the channel through which the usage-side refrigerant flows. A first usage-side water inlet tube 47a is connected to the inlet side of the channel through which the aqueous medium flows. A first usage-side water outlet tube 48a is connected to the outlet side of the channel through which the aqueous medium flows. The first cascade-side gas-refrigerant tube 72a is connected to the cascade-side discharge tube 70a. An aqueous medium communication tube 15a is connected to the first usage-side water inlet tube 47a and an aqueous medium communication tube 16a is connected to the first usage-side water outlet tube 48a.

The refrigerant/water heat exchange-side flow rate adjustment valve 66a is an electrical expansion valve that can vary the flow rate of the usage-side refrigerant that flows through the refrigerant/water heat exchanger 65a by controlling the opening degree, and is provided to the cascade-side liquid-refrigerant tube 68a.

The usage-side accumulator 67a is a container provided to the cascade-side intake tube 71a and is used for temporarily accumulating the usage-side refrigerant circulating through the usage-side refrigerant circuit 40a before the usage-side refrigerant is taken from the cascade-side intake tube 71a into the usage-side compressor 62a.

In this manner, the usage-side compressor 62a, the refrigerant/water heat exchanger 65a, the refrigerant/water heat exchange-side flow rate adjustment valve 66a, and the first usage-side heat exchanger 41a are connected via the refrigerant tubes 71a, 70a, 72a, 68a, 69a to thereby constitute the usage-side refrigerant circuit 40a.

The circulation pump 43a is a mechanism for increasing the pressure of the aqueous medium, and in this configuration, is a pump in which a centrifugal and/or positive-displacement pump element (not shown) is driven by a circulation pump motor 44a. The circulation pump 43a is provided to the first usage-side water outlet tube 48a. The rotational speed (i.e., operational frequency) of the circulation pump motor 44a can be varied by using an inverter device (not shown), whereby the capacity of the circulation pump 43a can be controlled.

The first usage unit 4a can thereby perform hot-water supply operation by causing the first usage-side heat exchanger 41a to function as a radiator of the heat-source-side refrigerant introduced from the discharge refrigerant communication tube 12, whereby the heat-source-side refrigerant, which has released heat in the first usage-side heat exchanger 41a, is directed out to the liquid refrigerant communication tube 13, the usage-side refrigerant that circulates through the usage-side refrigerant circuit 40a is heated by the radiation of the heat-source-side refrigerant in the first usage-side heat exchanger 41a, the usage-side refrigerant thus heated is compressed in the usage-side compressor 62a, and the aqueous medium is thereafter heated by the radiation of the refrigerant/water heat exchanger 65a.

Various types of sensors are provided to the first usage unit 4a. Specifically provided to the first usage unit 4a are a first usage-side heat exchange temperature sensor 50a for detecting a first usage-side refrigerant temperature Tsc1, which is the temperature of the heat-source-side refrigerant in the liquid side of the first usage-side heat exchanger 41a; a first refrigerant/water heat exchange temperature sensor 73a for detecting a cascade-side refrigerant temperature Tsc2, which is the temperature of the usage-side refrigerant in the liquid side of the refrigerant/water heat exchanger 65a; an aqueous medium inlet temperature sensor 51a for detecting an aqueous medium inlet temperature Twr, which is the temperature of the aqueous medium in the inlet of the refrigerant/water heat exchanger 65a; an aqueous medium outlet temperature sensor 52a for detecting an aqueous medium outlet temperature Tw1, which is the temperature of the aqueous medium in the outlet of the refrigerant/water heat exchanger 65a; a usage-side intake pressure sensor 74a for detecting a usage-side intake pressure Ps2, which is the pressure of the usage-side refrigerant in the intake of the usage-side compressor 62a; a usage-side discharge pressure sensor 75a for detecting the usage-side discharge pressure Pd2, which is the pressure of the usage-side refrigerant in the discharge of the usage-side compressor 62a; and a usage-side discharge temperature sensor 76a for detecting the usage-side discharge temperature Td2, which is the temperature of the usage-side refrigerant in the discharge of the usage-side compressor 62a.

A control unit (not shown) for performing the following operations and/or various controls is provided to the heat pump system 200.

<Operation>

Next, the operation of the heat pump system 200 will be described.

The operation modes of the heat pump system 200 include a hot-water supply operation mode in which only the hot-water supply operation of the first usage unit 4a is performed (i.e., operation of the hot-water storage unit 8a and/or the hot-water air-warming unit 9a), an air-cooling operation mode in which only air-cooling operation of the second usage unit 10a is performed, an air-warming operation mode in which only air-warming operation of the second usage unit 10a is performed, a hot-water supply/air-warming operation mode in which hot-water supply operation of the first usage unit 4a is performed together with the air-warming operation of the second usage unit 10a, and a hot-water supply/air-cooling operation mode in which hot-water supply operation of the first usage unit 4a is performed together with the air-cooling operation of the second usage unit 10a.

Operation in the five operation modes of the heat pump system 200 is described below.

—Hot-Water Supply Operation Mode—

In the case that only hot-water supply operation of the first usage unit 4a is to be performed, the heat-source-side switching mechanism 23 is switched to the heat-source-side evaporating operation state (the state of the heat-source-side switching mechanism 23 indicated by the broken line in FIG. 16) in the heat-source-side refrigerant circuit 20, and an intake-return expansion valve 26a and the second usage-side flow rate adjustment valve 102a are set in a closed state. Also, in the aqueous medium circuit 80a, the aqueous-medium-side switching mechanism 161a is switched to a state in which the aqueous medium is fed to the hot-water storage unit 8a and/or hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a via the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated.

Operation in the hot-water supply operation mode for performing only hot-water supply operation of the first usage unit 4a is performed in this manner.

—Air-Cooling Operation Mode—

In the case that only air-cooling operation of the second usage unit 10a is to be performed, the heat-source-side switching mechanism 23 is switched to the heat-source-side radiating operation state (the state of the heat-source-side switching mechanism 23 indicated by the solid line in FIG. 16) in the heat-source-side refrigerant circuit 20, and the first usage-side flow rate adjustment valve 42a is set in a shutoff state.

In the heat-source-side refrigerant circuit 20 in such a state, the low-pressure, heat-source-side refrigerant in the refrigeration cycle is taken into the heat-source-side compressor 21 via the heat-source-side intake tube 21c, and is discharged to the heat-source-side discharge tube 21b after having been compressed to high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and a first heat-source-side gas-refrigerant tube 23a. The high-pressure, heat-source-side refrigerant sent to the heat-source-side heat exchanger 24 undergoes heat exchange with outdoor air fed by a heat-source-side fan 32 and releases heat in the heat-source-side heat exchanger 24. The high-pressure, heat-source-side refrigerant having released heat in the heat-source-side heat exchanger is sent to the subcooler 27 via the heat-source-side expansion valve 25. The heat-source-side refrigerant sent to the subcooler 27 undergoes heat exchange with the heat-source-side refrigerant branched from the heat-source-side liquid-refrigerant tube 24a to the intake return tube 26 and is cooled to a subcooled state. The heat-source-side refrigerant that flows through the intake return tube 26 is returned to the heat-source-side intake tube 21c. The heat-source-side refrigerant cooled in the subcooler 27 is sent from the heat source unit 2 to the liquid refrigerant communication tube 13 by way of the heat-source-side liquid-refrigerant tube 24a and the liquid-side shutoff valve 29.

The high-pressure, heat-source-side refrigerant sent to the liquid refrigerant communication tube 13 is sent to the second usage unit 10a. The high-pressure, heat-source-side refrigerant sent to the second usage unit 10a is sent to the second usage-side flow rate adjustment valve 102a. The high-pressure, heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a to thereby perform indoor air cooling. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-cooling operation mode for performing only air-cooling operation of the second usage unit 10a is performed in this manner.

—Air-Warming Operation Mode—

In the case that only air-warming operation of the second usage unit 10a is to be performed, the heat-source-side switching mechanism 23 is switched to the heat-source-side radiating operation state (the state of the heat-source-side switching mechanism 23 indicated by the broken line in FIG. 16) in the heat-source-side refrigerant circuit 20, and the intake-return expansion valve 26a and the first usage-side flow rate adjustment valve 42a are in a shutoff state.

In the heat-source-side refrigerant circuit 20 in such a state, low-pressure, heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure, heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the gas-refrigerant communication tube 14 by way of the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with an air medium fed by the usage-side fan 105a and releases heat in the second usage-side heat exchanger 101a to thereby perform indoor air warming. The high-pressure, heat-source-side refrigerant thus having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

The heat-source-side refrigerant sent to the liquid-refrigerant communication tube 13 is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to form a low-pressure, gas-liquid two-phase state, and is then sent to the heat-source-side heat exchanger 24 by way of the heat-source-side liquid-refrigerant tube 24a. The low-pressure, heat-source-side refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-warming operation mode for performing only air-warming operation of the second usage unit 10a is performed in this manner.

—Hot-Water Supply/Air-Warming Operation Mode—

In the case that hot-water supply operation of the first usage unit 4a and the air-warming operation of the second usage unit 10a are to be performed together, the heat-source-side switching mechanism 23 is switched to the heat-source-side evaporating operation state (the state of the heat-source-side switching mechanism 23 indicated by the broken line in FIG. 16) in the heat-source-side refrigerant circuit 20, and the intake-return expansion valve 26a is in a shutoff state. Also, the aqueous-medium-side switching mechanism 161a is switched in the aqueous medium circuit 80a to a state in which the aqueous medium is fed to the hot-water storage unit 8a and/or the hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent from the heat source unit 2 to the gas-refrigerant communication tube 14 by way of the heat-source-side switching mechanism 23, the second heat-source-side gas refrigerant tube 23b and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with the air medium fed by the usage-side fan 105a to release heat in the second usage-side heat exchanger 101a and thereby perform indoor air warming. The high-pressure, heat-source-side refrigerant having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

The heat-source-side refrigerant sent from the second usage unit 10a and the first usage unit 4a to the liquid refrigerant communication tube 13 merges in the liquid refrigerant communication tube 13 and is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of the heat-source-side liquid-refrigerant tube 24a. The low-pressure refrigerant sent to the heat-source-side heat exchanger 24 undergoes heat exchange with outdoor air fed by the heat-source-side fan 32 and evaporates in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-wafer storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated. Operation in the hot-water supply/air-warming operation mode for performing hot-water supply operation of the first usage unit 4a and air-warming operation of the second usage unit 10a are performed in this manner.

—Hot-Water Supply/Air-Cooling Operation Mode—

In the case that hot-water supply operation of the first usage unit 4a and the air-cooling operation of the second usage unit 10a are to be performed together, the heat-source-side switching mechanism 23 is switched to the heat-source-side radiating operation state (the state of the heat-source-side switching mechanism 23 indicated by the solid line in FIG. 16) in the heat-source-side refrigerant circuit 20. Also, the aqueous-medium-side switching mechanism 161a is switched in the aqueous medium circuit 80a to a state in which the aqueous medium is fed to the hot-water storage unit 8a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent to the heat-source-side heat exchanger 24 by way of the heat-source-side switching mechanism 23 and the first heat-source-side gas-refrigerant tube 23a. The high-pressure, heat-source-side refrigerant sent to the heat-source-side heat exchanger 24 undergoes heat exchange with outdoor air fed by the heat-source-side fan 32 and releases heat in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 undergoes heat exchange with the heat-source-side refrigerant branched from the heat-source-side liquid-refrigerant tube 24a to the intake return tube 26 and is cooled to a subcooled state. The heat-source-side refrigerant that flows through the intake return tube 26 is returned to the heat-source-side intake tube 21c. The heat-source-side refrigerant cooled in the subcooler 27 is sent from the heat source unit 2 to the liquid refrigerant communication tube 13 by way of the heat-source-side liquid-refrigerant tube 24a and the liquid-side shutoff valve 29.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that circulates through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

The heat-source-side refrigerant sent from the heat source unit 2 and the first usage unit 4a to the liquid refrigerant communication tube 13 merges in the liquid refrigerant communication tube 13 and is sent to the second usage unit 10a. The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure heat-source-side refrigerant sent to the second usage-side heat exchanger 101a undergoes heat exchange with the air medium fed by the usage-side fan 105a and evaporates in the second usage-side heat exchanger 101a to thereby perform indoor air cooling. The low-pressure, heat-source-side refrigerant evaporated in the second usage-side heat exchanger 101a is sent from the second usage unit 10a to the gas-refrigerant communication tube 14 by way of the second usage-side gas refrigerant tube 104a.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a by way of the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated.

Operation in the hot-water supply/air-cooling operation mode for performing hot-water supply operation of the first usage unit 4a and air-cooling operation of the second usage unit 10a are performed in this manner.

—Control of the Flow Rate of the Aqueous Medium Circulating Through the Aqueous Medium Circuit—

Described next is control of the flow rate of the aqueous medium circulating through the aqueous medium circuit 80a in the above-described hot-water supply operation, hot-water supply/air-warming operation, and hot-water supply/air-cooling operation.

In the heat pump system 200, the capacity of the circulation pump 43a is controlled so that the aqueous medium outlet/inlet temperature difference $\Delta Tw$ becomes a predetermined target aqueous medium outlet/inlet temperature difference $\Delta Tws$, the aqueous medium outlet/inlet temperature difference $\Delta Tw$ being the difference (i.e., Tw1−Twr) between the temperature of the aqueous medium in the outlet of the refrigerant/water heat exchanger 65a (i.e., the aqueous medium outlet temperature Tw1) and the temperature of the aqueous medium in the inlet of the refrigerant/water heat exchanger 65a (i.e., the aqueous medium inlet temperature Twr). More specifically, in the case that the aqueous medium outlet/inlet temperature difference $\Delta Tw$ is greater than the target aqueous medium outlet/inlet temperature difference $\Delta Tws$, it is determined that the flow rate of the aqueous medium circulating in the aqueous medium circuit 80a is low, and the operating capacity of the circulation pump 43a is increased by increasing the rotational speed (i.e., operational frequency) of the circulation pump motor 44a; and in the case that the aqueous medium outlet/inlet temperature difference $\Delta Tw$ is less than the target aqueous medium outlet/inlet temperature difference $\Delta Tws$, it is determined that the flow rate of the aqueous medium circulating in the aqueous medium circuit 80a is high, and the operating capacity of the circulation pump 43a is reduced by reducing the rotational speed (i.e., operational frequency) of the circulation pump motor 44a. The flow rate of the aqueous medium circulating through the aqueous medium circuit 80a is thereby designed to be suitably controlled. The target aqueous medium outlet/inlet temperature difference $\Delta Tws$ is set with consideration given to the design conditions of the heat-exchange capacity of the refrigerant/water heat exchanger 65a, or other factors.

However, in operating conditions in which the temperature of the aqueous medium is low, such as immediately after the operation of the first usage unit 4a has started or at other times, lubrication is liable to be deficient when the pressure of the usage-side refrigerant (i.e., the usage-side discharge pressure Pd2) in the discharge of the usage-side compressor 62a falls; the usage-side outlet/inlet pressure difference $\Delta P2$, which is the pressure difference (Pd2−Ps2) between the usage-side discharge pressure Pd2 and the pressure of the usage-side refrigerant in the intake of the usage-side compressor 62a (i.e., the usage-side intake pressure Ps2) becomes smaller; and the circulation of refrigeration machine oil inside the usage-side compressor 62a worsens.

Nevertheless, when the capacity of the circulation pump 43a is controlled so that the flow rate of the aqueous medium circulating through the aqueous medium circuit 80a is increased, the temperature of the aqueous medium flowing through the refrigerant/water heat exchanger 65a is less likely to increase and the usage-side outlet/inlet pressure difference $\Delta P2$ is prevented from increasing.

In view of the above, in the heat pump system 200, the capacity of the circulation pump 43a is controlled so that the flow rate of the aqueous medium circulating through the aqueous medium circuit 80a is reduced in the case that the usage-side outlet/inlet pressure difference $\Delta P2$ is equal to or less than a predetermined usage-side low differential pressure protection pressure difference $\Delta P2s$. More specifically, the operating capacity of the circulation pump 43a is controlled so that the aqueous medium outlet/inlet temperature difference $\Delta Tw$ becomes the target aqueous medium outlet/inlet temperature difference $\Delta Tws$ ($\Delta Tws$=initial value) as described above (step S1) in the case that the usage-side outlet/inlet pressure difference $\Delta P2$ is greater than the usage-side low differential pressure protection pressure difference $\Delta P2s$ (from step S2 to step S1), as shown in FIG. 2 (note that, $\Delta P2$ and $\Delta P2s$ are substituted for $\Delta P1$ and $\Delta P1s$ in step S2); and in the case that the usage-side outlet/inlet pressure difference $\Delta P2$ is equal to or less than the usage-side low differential pressure protection pressure difference $\Delta P2s$ (from step S2 to step S3), it is determined that the flow rate of the aqueous medium circulating through the aqueous medium circuit 80a must be reduced by increasing the target aqueous medium outlet/inlet temperature difference $\Delta Tws$ (step S3, $\Delta Tws$=initial value+correction value), and control is performed to reduce the operating capacity of the circulation pump 43a by reducing the rotational speed (i.e., operational frequency) of the circulation pump motor 44a. The usage-side low differential pressure protection pressure difference $\Delta P2s$ is set with consideration given to the design conditions of the lubrication structure of the usage-side compressor 62a, or other factors.

The temperature of the aqueous medium flowing through the refrigerant/water heat exchanger 65a is thereby more readily increased and it is possible to promote an increase in the usage-side outlet/inlet pressure difference $\Delta P2$. The temperature of the usage-side refrigerant that circulates through the usage-side refrigerant circuit 40a can also be readily increased because the temperature of the aqueous medium flowing through the refrigerant/water heat exchanger 65a is more readily increased. Therefore, the temperature of the heat-source-side refrigerant for performing heat exchange with the usage-side refrigerant is more readily increased in the first usage-side heat exchanger 41a, and an increase in the heat-source-side outlet/inlet pressure difference $\Delta P1$ in the heat-source-side compressor 21 is thereby facilitated.

After the usage-side outlet/inlet pressure difference $\Delta P2$ has become greater than the usage-side low differential pressure protection pressure difference $\Delta P2s$ (from step S2 to step S1), the target aqueous medium outlet/inlet temperature difference $\Delta Tws$ is reduced (step S1, $\Delta Tws$=initial value) and a transition is made to normal capacity control of the circulation pump 43a.

<Characteristics>

The heat pump system 200 has the following characteristics.

—A—

The heat pump system 200 differs from the heat pump system 1 in the first embodiment in that the usage-side refrigerant circuit 40a is disposed between the heat-source-side refrigerant circuit 20 and the aqueous medium circuit 80a, and not only is it possible to perform operation for heating the aqueous medium using the radiation of the heat-source-side refrigerant in the first usage-side heat exchanger 41a, but it is also possible to use the heat of cooling which is obtained by the heat-source-side refrigerant due to heating of the aqueous medium in the operation for cooling the air medium by evaporation of the heat-source-side refrigerant in the second usage-side heat exchanger 101a together with the operation for heating the aqueous medium performed using the radiation of the heat-source-side refrigerant in the first usage-side heat exchanger 41a, in the same manner as the heat pump system 1 in the first embodiment. Therefore, as described above, it is possible to effectively use heat of cooling such as when the aqueous medium heated in the first usage unit 4a is used in hot-water supply and the air medium cooled in the second usage unit 10a is used for indoor air cooling, whereas heat of cooling is not effectively used in conventional heat pump water heaters, which merely cool outside air in a heat-source-side heat exchanger; and energy savings can thereby be ensured in a heat pump system capable of using the heat pump cycle to heat an aqueous medium. Also, in the heat pump system 200, the first usage-side heat exchanger 41a is a heat exchanger for directly receiving heat by heat exchange between the heat-source-side refrigerant and the usage-side refrigerant, thus contributing to obtaining a high-temperature aqueous medium with little heat loss when heat is received in the usage-side refrigerant circuit 40a from the heat-source-side refrigerant circuit 20.

—B—

With this heat pump system 200, the usage-side refrigerant circulating through the usage-side refrigerant circuit 40a is heated by the radiation of the heat-source-side refrigerant in the first usage-side heat exchanger 41a, and the usage-side refrigerant circuit 40a can achieve a higher-temperature refrigeration cycle than the refrigeration cycle in the heat-source-side refrigerant circuit 20 though which the heat-source-side refrigerant is circulating, by using the heat obtained from the heat-source-side refrigerant. Therefore, a high-temperature aqueous medium can be obtained by the release of heat by the usage-side refrigerant in the refrigerant/water heat exchanger 65a.

—C—

With this heat pump system 200, operation for cooling the air medium (air-cooling operation) by evaporation of the heat-source-side refrigerant in the second usage-side heat exchanger 101a can be performed with the heat-source-side switching mechanism 23 in the heat-source-side heat-release operation state; and the operation for heating the air medium (air-warming operation) by the heat released from the heat-source-side refrigerant can be performed in the second usage-side heat exchanger 101a with the heat-source-side switching mechanism 23 in the heat-source-side evaporating operation state. Therefore, as described above, the aqueous medium heated in the first usage unit 4a can be used for hot-water supply and the second usage unit 10a can be used for indoor air cooling and air warming.

—D—

With this heat pump system 200, the usage-side outlet/inlet pressure difference ΔP2 is ensured and lubrication deficiency in the usage-side compressor 62a is less liable to occur without forcing unstable operation in the usage-side compressor 62a, even when the temperature of the aqueous medium is low and the heat-source-side outlet/inlet pressure difference ΔP1 is readily reduced such as immediately after the operation of the first usage unit 4a has started. Also, the temperature of the aqueous medium that flows through the refrigerant/water heat exchanger 65a more readily increases, and as a result, lubrication deficiency in the heat-source-side compressor 21 is less likely to occur because the heat-source-side outlet/inlet pressure difference ΔP1 in the heat-source-side compressor 21 is also ensured. Also, with this heat pump system 200, the capacity of the circulation pump 43a is controlled so that the aqueous medium outlet/inlet temperature difference ΔTw becomes the target aqueous medium outlet/inlet temperature difference ΔTws in the case that the usage-side outlet/inlet pressure difference ΔP2 is greater than the usage-side low differential pressure protection pressure difference ΔP2s, and operation can therefore be performed under conditions suitable to the heat exchange capacity of the refrigerant/water heat exchanger 65a. Furthermore, with this heat pump system 200, the flow rate of the aqueous medium circulating through the aqueous medium circuit 80a is reduced by increasing the target aqueous medium outlet/inlet temperature difference ΔTws in the control of the capacity of the circulation pump 43a for bringing the aqueous medium outlet/inlet temperature difference ΔTw to the target aqueous medium outlet/inlet temperature difference ΔTws. Therefore, it is possible to control the capacity of the circulation pump 43a for bringing the aqueous medium outlet/inlet temperature difference ΔTw to the target aqueous medium outlet/inlet temperature difference ΔTws regardless of whether the usage-side outlet/inlet pressure difference ΔP2 is equal to or less than the usage-side low differential pressure protection pressure difference ΔP2s.

(1) Modification 1

In order to more effectively use the hot-water supply/air-cooling operation in the heat pump system 200 described above (see FIG. 16), it is possible for the first usage unit 4a to perform, as required, operation for heating the aqueous medium (hot-water supply operation) using the radiation of the heat-source-side refrigerant in the first usage-side heat exchanger 41a (i.e., heat release by the usage-side refrigerant in the refrigerant/water heat exchanger 65a) when the second usage unit 10a performs operation for cooling the air medium (air-cooling operation) by evaporation of the heat-source-side refrigerant in the second usage-side heat exchanger 101a, in the same manner as the heat pump system 1 in Modification 1 of the first embodiment.

For example, in the case that air-cooling operation is being performed, the first usage unit 4a may perform operation for heating the aqueous medium (hot-water supply operation) using the radiation of the heat-source-side refrigerant in the first usage-side heat exchanger 41a (i.e., radiation of the usage-side refrigerant in the refrigerant/water heat exchanger 65a) in the case that the hot-water storage temperature Twh of the hot-water storage unit 8a is equal to or less than the predetermined hot-water storage setting temperature Twhs (i.e., the hot-water supply/air-cooling operation mode).

The hot-water storage temperature Twh can thereby be kept at or above the hot-water storage setting temperature Twhs while making effective use of the heat obtained by the heat-source-side refrigerant by cooling the air medium.

(2) Modification 2

In the heat pump system 200 (see FIG. 16) described above, as shown in FIG. 17, it is possible to furthermore provide the usage-side refrigerant circuit 40a with a second usage-side switching mechanism 64a capable of switching between a usage-side heat-release operation state in which the refrigerant/water heat exchanger 65a is made to function as a radiator of the usage-side refrigerant and the first usage-side heat exchanger 41a is made to function as an evaporator of the usage-side refrigerant, and a usage-side evaporating operation state in which the refrigerant/water heat exchanger 65a is made to function as an evaporator of the usage-side refrigerant and the first usage-side heat exchanger 41a is made to function as a radiator of the usage-side refrigerant; and it is possible to further connect the first usage unit 4a to the gas-refrigerant communication tube 14 and to further provide a first usage-side switching mechanism 53a capable of switching between an aqueous medium-heating operation state in which the first usage-side heat exchanger 41a is made to function as a radiator of the heat-source-side refrigerant introduced from the discharge refrigerant communication tube 12, and an aqueous medium-cooling operation state in which the first usage-side heat exchanger 41a is made to function as an evaporator of the heat-source-side refrigerant introduced from the liquid refrigerant communication tube 13.

Here, the second usage-side switching mechanism 64a is a four-way switching valve, and is connected to the cascade-side discharge tube 70a, the cascade-side intake tube 71a, the first cascade-side gas-refrigerant tube 72a, and the second cascade-side gas-refrigerant tube 69a. The second usage-side switching mechanism 64a is capable of switching between placing the cascade-side discharge tube 70a and the first cascade-side gas-refrigerant tube 72a in communication and the second cascade-side gas-refrigerant tube 69a and the cascade-side intake tube 71a in communication (corresponding to the usage-side heat-release operation state; see the solid line of second usage-side switching mechanism 64a in FIG. 17), and placing the cascade-side discharge tube 70a and the second cascade-side gas-refrigerant tube 69a in communication and the first cascade-side gas-refrigerant tube 72a and the cascade-side intake tube 71a in communication (corresponding to the usage-side evaporating operation state; see the broken line of second usage-side switching mechanism 64a in FIG. 17). The second usage-side switching mechanism 64a is not limited to being a four-way switching valve, but may also be, e.g., a configuration in which a plurality of solenoid valves are used in combination to achieve a function similar to that described above for switching the direction of flow of the usage-side refrigerant.

The first usage-side gas refrigerant tube 54a is connected together with the first usage-side discharge refrigerant tube 46a to the gas side of the channel through which the heat-source-side refrigerant of the first usage-side heat exchanger 41a flows. The gas-refrigerant communication tube 14 is connected to the first usage-side gas refrigerant tube 54a. The first usage-side switching mechanism 53a has a first usage-side discharge on-off valve 55a (in this case, the first usage-side discharge non-return valve 49a is omitted) provided to the first usage-side discharge refrigerant tube 46a, and a first usage-side gas on-off valve 56a provided to the first usage-side gas refrigerant tube 54a; and is used for setting an aqueous medium-heating operation state by opening the first usage-side discharge on-off valve 55a and closing the first usage-side gas on-off valve 56a, and setting an aqueous medium-cooling operation state by closing the first usage-side discharge on-off valve 55a and opening the first usage-side gas on-off valve 56a. The first usage-side discharge on-off valve 55a and the first usage-side gas on-off valve 56a are composed of solenoid valves, both being capable of on-off control. The first usage-side switching mechanism 53a may be configured using a three-way valve or the like.

With the heat pump system 200 having such a configuration, in the case that defrosting of the heat-source-side heat exchanger 24 has been determined to be required depending on operation in the hot-water supply operation mode, the air-warming operation mode, and the hot-water supply/air-warming operation mode, it is possible to perform a defrosting operation in which the heat-source-side heat exchanger 24 is made to function as a radiator of the heat-source-side refrigerant by setting the heat-source-side switching mechanism 23 in a heat-source-side heat-release operation state; the second usage-side heat exchanger 101a is made to function as an evaporator of the heat-source-side refrigerant and the refrigerant/water heat exchanger 65a is made to function as an evaporator of the usage-side refrigerant by setting the second usage-side switching mechanism 64a in a usage-side evaporating operation state; and the first usage-side heat exchanger 41a is made to function as a radiator of the usage-side refrigerant.

Operation in the defrosting operation is described below with reference to FIG. 4. First, it is determined whether predetermined defrosting operation start conditions have been satisfied (i.e., whether defrosting of the heat-source-side heat exchanger 24 is required) (step S11). Here, it is determined whether the defrosting operation start conditions have been satisfied on the basis of whether the defrosting time interval $\Delta tdf$ (i.e., the cumulative operation time from the end of the previous defrosting operation) has reached the predetermined defrosting time interval setting value $\Delta tdfs$.

The process starts the defrosting operation below in the case that it has been determined that the defrosting operation start conditions have been satisfied (step S12).

Figure 17:
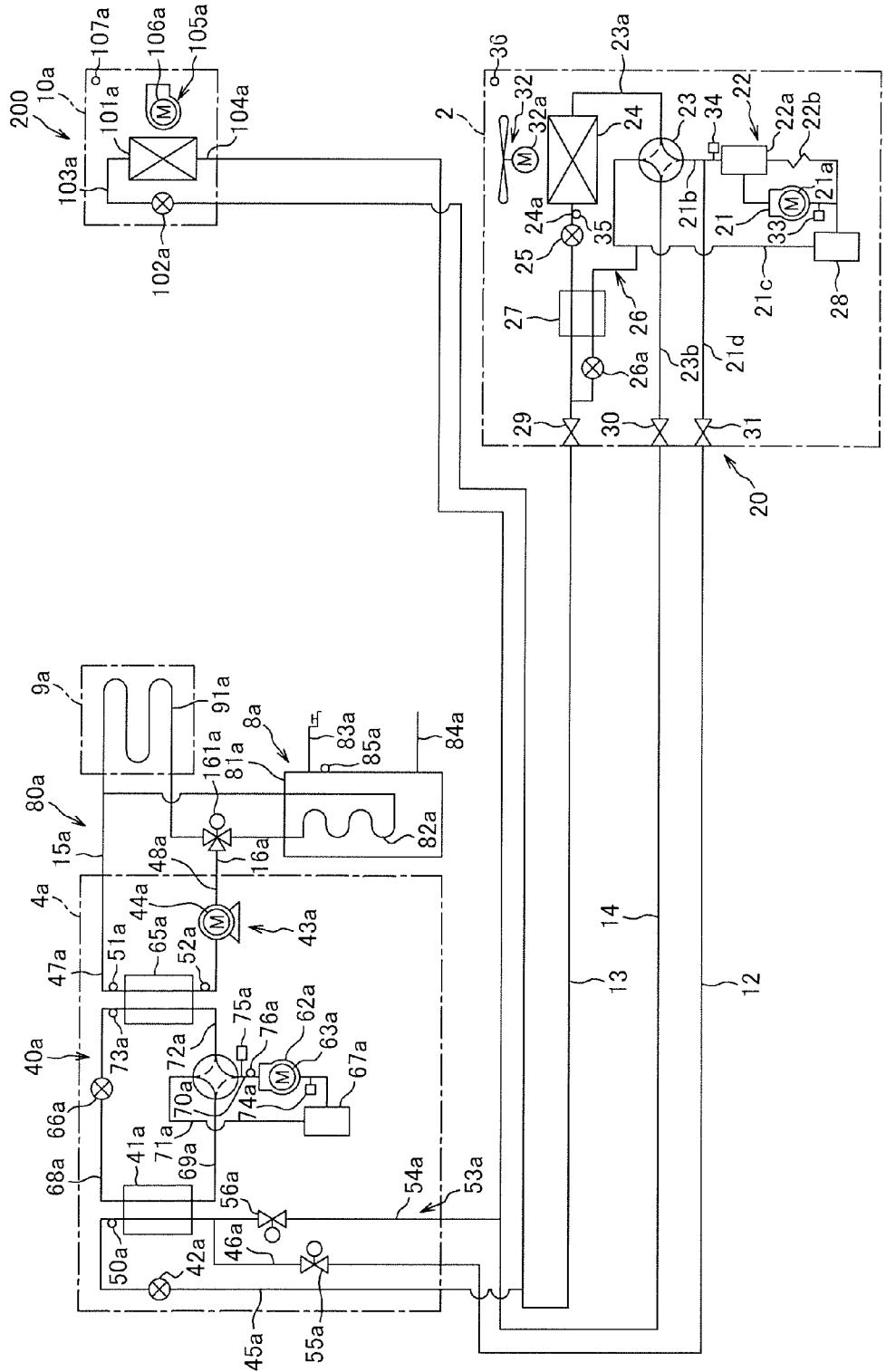
FIG. 17 is a view showing the general configuration of the heat pump system according to Modifications 2 through 4 and Modification 8 of the second embodiment.

When the defrosting operation is started, a switch is made in the heat-source-side refrigerant circuit 20 to switch the heat-source-side switching mechanism 23 to the heat-source-side heat-release operation state (the state indicated by the solid line of heat-source-side switching mechanism 23 of FIG. 17), a switch is made in the usage-side refrigerant circuit 40a to switch the second usage-side switching mechanism 64a to the usage-side evaporating operation state (the state indicated by the broken line of second usage-side switching mechanism 64a in FIG. 17), the first usage-side switching mechanism 53a is switched to the aqueous medium-cooling operation state (i.e., the state in which the first usage-side discharge on-off value 55a is closed and the first usage-side gas on-off valve 56a is open), and the intake-return expansion valve 26a is set in a closed state.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to high pressure in the refrigeration cycle, and thereafter discharged to the heat-source-side discharge tube 21b. The high-pressure heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and the first heat-source-side gas-refrigerant tube 23a. The high-pressure, heat-source-side refrigerant sent to the heat-source-side heat exchanger 24 undergoes heat exchange with ice deposited in the heat-source-side heat exchanger 24 and heat is released in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 is sent from the heat source unit 2 to the liquid refrigerant communication tube 13 by way of the heat-source-side liquid-refrigerant tube 24a and the liquid-side shutoff valve 29 without undergoing heat exchange because the heat-source-side refrigerant does not flow in the intake return tube 26.

The heat-source-side refrigerant sent to the liquid refrigerant communication tube 13 branches in the liquid refrigerant communication tube 13 and is sent to the first usage unit 4a and the second usage unit 10a.

The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to become a low-pressure gas-liquid two-phase state, and is then sent to the first usage-side heat exchanger 41a by way of the first usage-side liquid refrigerant tube 45a. The low-pressure, heat-source-side refrigerant sent to the first usage-side heat exchanger 41a undergoes heat exchange with the high-pressure usage-side refrigerant in the refrigeration cycle that is circulated through the usage-side refrigerant circuit 40a and evaporates in the first usage-side heat exchanger 41a. The low-pressure, heat-source-side refrigerant thus evaporated in the first usage-side heat exchanger 41a is sent from the first usage unit 4a to the gas refrigerant communication tube 14 by way of the first usage-side gas refrigerant tube 54a and the first usage-side gas on-off valve 56a constituting the first usage-side switching mechanism 53a.

The heat-source-side refrigerant sent from the second usage unit 10a and the first usage unit 4a to the gas refrigerant communication tube 14 merges in the gas refrigerant communication tube 14 and is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

The high-pressure, usage-side refrigerant in the refrigeration cycle that circulates through the usage-side refrigerant circuit 40a releases heat in the usage-side refrigerant circuit 40a by the evaporation of the heat-source-side refrigerant in the first usage-side heat exchanger 41a. The high-pressure, usage-side refrigerant having released heat in the first usage-side heat exchanger 41a is sent to the refrigerant/water heat exchange-side flow rate adjustment valve 66a. The high-pressure, usage-side refrigerant sent to the refrigerant/water heat exchange-side flow rate adjustment valve 66a is depressurized in the refrigerant/water heat exchange-side flow rate adjustment valve 66a to become a low-pressure gas-liquid two-phase state, and is then sent to the refrigerant/water heat exchanger 65a by way of the cascade-side liquid-refrigerant tube 68a. The low-pressure, usage-side refrigerant sent to the refrigerant/water heat exchanger 65a undergoes heat exchange with the aqueous medium circulated through the aqueous medium circuit 80a by the circulation pump 43a and evaporates in the refrigerant/water heat exchanger 65a. The low-pressure, usage-side refrigerant thus evaporated in the refrigerant/water heat exchanger 65a is sent to the usage-side accumulator 67a by way of the first cascade-side gas-refrigerant tube 72a and the second usage-side switching mechanism 64a. The low-pressure, usage-side refrigerant sent to the usage-side accumulator 67a is taken into the usage-side compressor 62a by way of the cascade-side intake tube 71a, compressed to high pressure in the refrigeration cycle, and thereafter discharged to the cascade-side discharge tube 70a. The high-pressure, usage-side refrigerant discharged to the cascade-side discharge tube 70a is again sent to the first usage-side heat exchanger 41a by way of the second usage-side switching mechanism 64a and the second cascade-side gas-refrigerant tube 69a.

In this manner, the defrosting operation is started in which the heat-source-side heat exchanger 24 is made to function as a radiator of the heat-source-side refrigerant by setting the heat-source-side switching mechanism 23 in the heat-source-side heat-release operation state; the second usage-side heat exchanger 101a is made to function as an evaporator of the heat-source-side refrigerant and the refrigerant/water heat exchanger 65a is made to function as an evaporator of the usage-side refrigerant by setting the second usage-side switching mechanism 64a in a usage-side evaporating operation state; and the first usage-side heat exchanger 41a is made to function as a radiator of the usage-side refrigerant (i.e., as an evaporator of the heat-source-side refrigerant).

It is determined whether predetermined defrosting operation end conditions have been satisfied (i.e., whether defrosting of the heat-source-side heat exchanger 24 has ended; step S13). Here, it is determined whether the defrosting operation end conditions have been satisfied depending on whether the heat-source-side heat exchanger temperature Thx has reached the predetermined defrosting completion temperature Thxs, or whether the defrosting operation time tdf, which is the time elapsed from the start of the defrosting operation, has reached a predetermined defrosting operation setting time tdfs.

In the case that it has been determined that the defrosting operation end conditions have been satisfied, the defrosting operation is ended and the process returns to the hot-water supply operation mode, the air-warming operation mode, and/or the hot-water supply/air-warming operation mode (step S14).

With the heat pump system 200, when the heat-source-side heat exchanger 24 is to be defrosted, not only is the heat-source-side heat exchanger 24 made to function as a radiator of the heat-source-side refrigerant by setting the heat-source-side switching mechanism 23 in the heat-source-side heat-release operation state, but also the refrigerant/water heat exchanger 65a is made to function as an evaporator of the usage-side refrigerant by setting the second usage-side switching mechanism 64a in the usage-side evaporating operation state because the first usage-side heat exchanger 41a is made to function as a radiator of the usage-side refrigerant, the heat-source-side refrigerant cooled by heat release in the heat-source-side heat exchanger 24 is heated by the radiation of the usage-side refrigerant in the first usage-side heat exchanger 41a, and the usage-side refrigerant cooled by heat release in the first usage-side heat exchanger 41a can be heated by evaporation in the refrigerant/water heat exchanger 65a. The defrosting of the heat-source-side heat exchanger 24 can thereby be reliably performed. The defrosting operation time tdf can be shortened, and it is possible to prevent the air medium cooled in the second usage unit 10a from reaching a low temperature because the second usage-side heat exchanger 101a is also made to function as an evaporator of the heat-source-side refrigerant.

(3) Modification 3

In the defrosting operation used in the heat pump system 200 in Modification 2, the aqueous medium cooled by evaporation of the heat-source-side refrigerant (i.e., evaporation of the usage-side refrigerant) is liable to freeze because not only is the second usage-side heat exchanger 101a made to function as an evaporator of the heat-source-side refrigerant, but the first usage-side heat exchanger 41a is also made to function as an evaporator of the heat-source-side refrigerant (i.e., causing the refrigerant/water heat exchanger 65a to also function as an evaporator of the usage-side refrigerant).

In view of the above, in the defrosting operation of the heat pump system 200, the first usage-side heat exchanger 41a is made to stop functioning (step S16) as an evaporator of the heat-source-side refrigerant (i.e., causing the refrigerant/water heat exchanger 65a to function as an evaporator of the usage-side refrigerant) in the case that the temperature of the aqueous medium (in this case, the aqueous medium outlet temperature Tw1) cooled by the evaporation of the heat-source-side refrigerant (i.e., evaporation of the usage-side refrigerant in the refrigerant/water heat exchanger 65a) in the first usage-side heat exchanger 41a has fallen to a predetermined freezing-lower-limit temperature Tfm or less (step S15) before it has been determined that the defrosting operation end conditions have been satisfied (step S13), as shown in FIG. 5. Here, the first usage-side flow rate adjustment valve 42a and/or the first usage-side gas on-off valve 56a is closed and the usage-side compressor 62a is stopped in order to stop the first usage-side heat exchanger 41a from functioning as an evaporator of the heat-source-side refrigerant (i.e., causing the refrigerant/water heat exchanger 65a to function as an evaporator of the usage-side refrigerant). After the first usage-side heat exchanger 41a has been stopped from functioning as an evaporator of the heat-source-side refrigerant (i.e., causing the refrigerant/water heat exchanger 65a to function as an evaporator of the usage-side refrigerant), the defrosting operation is carried out to cause only the second usage-side heat exchanger 101a to function as an evaporator of the heat-source-side refrigerant until the defrosting operation end conditions have been satisfied (from step S13 to step S14).

With the heat pump system 200, the aqueous medium can thereby be prevented from freezing due to the defrosting operation because the first usage-side heat exchanger 41a is made to stop functioning as an evaporator of the heat-source-side refrigerant (i.e., causing the refrigerant/water heat exchanger 65a to function as an evaporator of the usage-side refrigerant) in the case that the temperature of the aqueous medium (in this case, the aqueous medium outlet temperature Tw1) cooled by the evaporation of the heat-source-side refrigerant (i.e., evaporation of the usage-side refrigerant in the refrigerant/water heat exchanger 65a) in the first usage-side heat exchanger 41a is equal to or less than the freezing-lower-limit temperature Tfm during the defrosting operation.

(4) Modification 4

In the defrosting operation used in the heat pump system 200 in Modification 2, the aqueous medium cooled by evaporation of the heat-source-side refrigerant (i.e., evaporation of the usage-side refrigerant) is liable to freeze because not only is the second usage-side heat exchanger 101a made to function as an evaporator of the heat-source-side refrigerant, but the first usage-side heat exchanger 41a is also made to function as an evaporator of the heat-source-side refrigerant (i.e., because the refrigerant/water heat exchanger 65a is also made to function as an evaporator of the usage-side refrigerant).

In view of the above, in the defrosting operation of the heat pump system 200, the opening degree of the first usage-side flow rate adjustment valve 42a is reduced (step S18) in the case that the temperature of the aqueous medium (in this case, the aqueous medium outlet temperature Tw1) cooled by the evaporation of the heat-source-side refrigerant (i.e., evaporation of the usage-side refrigerant) in the first usage-side heat exchanger 41a has fallen to a predetermined freeze-warning temperature Tfa or less (step S17) before it has been determined that the defrosting operation end conditions have been satisfied (step S13), as shown in FIG. 6. The defrosting operation in which the first usage-side heat exchanger 41a and the second usage-side heat exchanger 101a are made to function as evaporators of the heat-source-side refrigerant is performed until the defrosting operation end conditions are satisfied while the function of the first usage-side heat exchanger 41a as an evaporator of the heat-source-side refrigerant (i.e., function as an evaporator of the usage-side refrigerant of the refrigerant/water heat exchanger 65a) is gradually reduced (from step S13 to step S14). Here, the freeze-warning temperature Tfa may be modified so as to be reduced in accompaniment with the reduction in the opening degree of the first usage-side flow rate adjustment valve 42a.

With the heat pump system 200, the defrosting operation can therefore be continued while the aqueous medium is prevented from freezing because control is performed to reduce the opening degree of the first usage-side flow rate adjustment valve 42a in the case that the temperature of the aqueous medium (in this case, the aqueous medium outlet temperature Tw1) cooled by the evaporation of the heat-source-side refrigerant in the first usage-side heat exchanger 41a (i.e., evaporation of the usage-side refrigerant in the refrigerant/water heat exchanger 65a) has fallen to the freeze-warning temperature Tfa or less during the defrosting operation.

Although the aqueous medium can be kept from freezing by reducing the opening degree of the first usage-side flow rate adjustment valve 42a, defrosting of the heat-source-side heat exchanger 24 is insufficiently performed and unmelted ice remains. When such defrosting operation is repeated, ice-up occurs in which ice grows in the heat-source-side heat exchanger 24 and the heat-source-side heat exchanger 24 is liable to no longer sufficiently function as an evaporator of the heat-source-side refrigerant.

In view of this situation, in addition to such control of the first usage-side flow rate adjustment valve 42a in the defrosting operation of the heat pump system 200, the defrosting time interval-setting value Δtdfs until the start of the next defrosting operation of the heat-source-side heat exchanger 24 is reduced (step S20; Δtdfs=Δtdfs−correction value) in the case that the defrosting of the heat-source-side heat exchanger 24 is not completed when the defrosting operation time tdf is equal to or less than the defrosting operation setting time tdfs, i.e., in the case that the defrosting operation time tdf reaches the defrosting operation setting time tdfs before the heat-source-side heat exchanger temperature Thx reaches the predetermined defrosting completion temperature Thxs (step S19), as shown in FIG. 7. Conversely, in the case that defrosting of the heat-source-side heat exchanger 24 has been completed when the defrosting operation time tdf is less than the defrosting operation setting time tdfs, i.e., in the case that the heat-source-side heat exchanger temperature Thx has reached the predetermined defrosting completion temperature Thxs before the defrosting operation time tdf has reached the defrosting operation setting time tdfs (step S19), and in the further case that it has been determined whether the defrosting operation time tdf is equal to or less than a predetermined defrosting operation completion time tdfg (step S21) and the defrosting operation time tdf is not equal to or less than the defrosting operation completion time tdfg, the defrosting time interval-setting value Δtdfs in the next defrosting operation is kept at the current setting value (from step S21 to step S19; Δtdfs=Δtdfs); and in the case that the defrosting operation time tdf is equal to or less than the defrosting operation completion time tdfg, the defrosting time interval-setting value Δtdfs is increased (step S22; Δtdfs=Δtdfs+correction value).

In addition to performing a control to reduce the opening degree of the first usage-side flow rate adjustment valve 42a in the heat pump system 200, in the case that the temperature of the aqueous medium (in this case, the aqueous medium outlet temperature Tw1) cooled by the evaporation of the heat-source-side refrigerant in the first usage-side heat exchanger 41a (i.e., evaporation of the usage-side refrigerant in the refrigerant/water heat exchanger 65a) is equal to or less than the freeze-warning temperature Tfa during the defrosting operation, the defrosting time interval-setting value Δtdfs until the start of the next defrosting of the heat-source-side heat exchanger 24 is reduced in the case that the defrosting of the heat-source-side heat exchanger 24 has not been completed at the defrosting operation setting time tdfs or less, whereby the defrosting operation can be carried out while the freezing of the aqueous medium is prevented and occurrence of ice-up is minimized.

(5) Modification 5

A configuration such as that of the heat pump system 200 (see FIG. 17) in Modifications 2 to 4 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant discharged from the heat-source-side compressor 21 stagnates in the discharge refrigerant communication tube 12 and the flow rate of the heat-source-side refrigerant taken into the heat-source-side compressor 21 is liable to be insufficient (i.e., an insufficient refrigerant-circulation rate) in the case that operation of the first usage unit 4a is stopped and the second usage unit 10a (air-cooling operation or air-warming operation) is operated (i.e., the case in which the discharge refrigerant communication tube 12 is not used).

Figure 18:
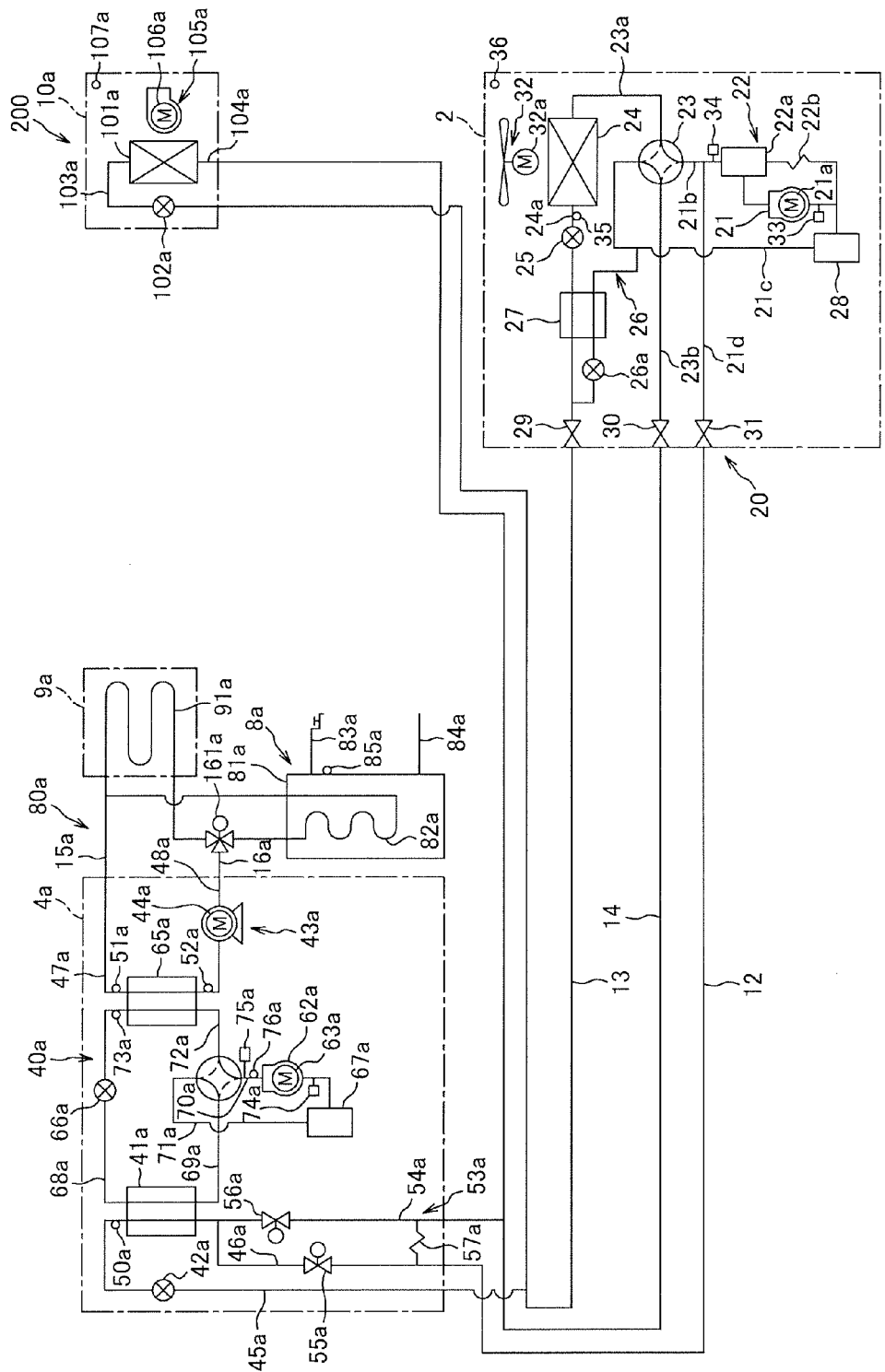
FIG. 18 is a view showing the general configuration of the heat pump system according to Modifications 5 and 7 of the second embodiment.

In view of the above, the heat pump system 200 is provided with a first refrigerant recovery mechanism 57a for placing the discharge refrigerant communication tube 12 and the gas refrigerant communication tube 14 in communication when the first usage-side switching mechanism 53a is in the aqueous medium-heating operation state or the aqueous medium cooling operation state in the same manner as Modification 6 (FIG. 8) of the first embodiment, as shown in FIG. 18.

In the heat pump system 200, the heat-source-side refrigerant is thereby made less likely to stagnate in the discharge refrigerant communication tube 12, and it is therefore possible to minimize the occurrence of an insufficient refrigerant-circulation rate in the heat-source-side refrigerant circuit 20.

(6) Modification 6

A configuration such as that of the heat pump system 200 (see FIGS. 17 and 18) in Modifications 2 to 5 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant stagnates in the first usage-side heat exchanger 41a and the flow rate of the heat-source-side refrigerant taken into the heat-source-side compressor 21 is liable to be insufficient (i.e., an insufficient refrigerant-circulation rate) in the case that the operation of the first usage unit 4a is stopped and the second usage unit 10a is operated (air-cooling operation and/or air-warming operation).

Figure 19:
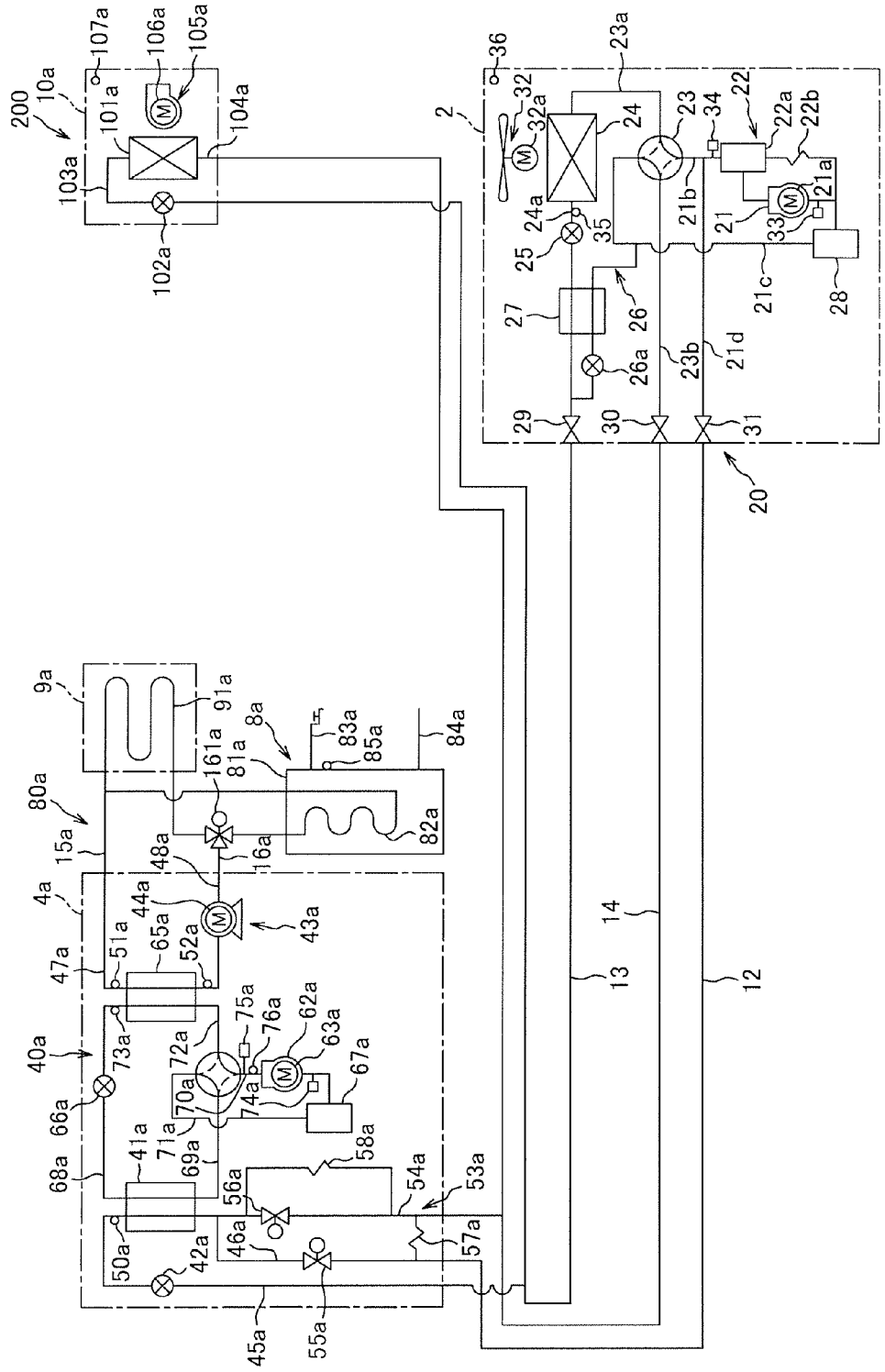
FIG. 19 is a view showing the general configuration of the heat pump system according to Modifications 6 and 7 of the second embodiment.

In view of the above, the heat pump system 200 is provided with a second refrigerant recovery mechanism 58a placing the first usage-side heat exchanger 41a and the gas refrigerant communication tube 14 in communication when the first usage-side switching mechanism 53a is in the aqueous medium-heating operation state or the aqueous medium cooling operation state in the same manner as Modification 7 (see FIG. 9) of the first embodiment, as shown in FIG. 19.

In this heat pump system 200, the heat-source-side refrigerant is thereby made less likely to stagnate in the first usage-side heat exchanger 41a, and it is therefore possible to minimize the occurrence of an insufficient refrigerant-circulation rate in the heat-source-side refrigerant circuit 20.

(7) Modification 7

A configuration such as that of the heat pump systems 200 (see FIGS. 17 to 19) in Modifications 2 to 6 is provided with the first usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant discharged from the heat-source-side compressor 21 stagnates in the discharge refrigerant communication tube 12 and the flow rate of the heat-source-side refrigerant taken into the heat-source-side compressor 21 is liable to be insufficient (i.e., an insufficient refrigerant-circulation rate) in the case that the operation of the first usage unit 4a is stopped and the second usage unit 10a (air-cooling operation or air-warming operation) is operated (i.e., the case of operation in which the discharge refrigerant communication tube 12 is not used); and in the case that the operation of the first usage unit 4a is stopped and the second usage unit 10a is operated (air-cooling operation or air-warming operation), the heat-source-side refrigerant stagnates in the first usage-side heat exchanger 41a and the flow rate of the heat-source-side refrigerant taken into the heat-source-side compressor 21 is liable to be insufficient (i.e., an insufficient refrigerant-circulation rate).

Such an insufficient refrigerant-circulation rate is thought to be mostly resolved by providing the first refrigerant recovery mechanism 57a and/or the second refrigerant recovery mechanism 58a in Modifications 6 and 7. However, an insufficient flow rate of the heat-source-side refrigerant (i.e., an insufficient refrigerant-circulation rate) taken into the heat-source-side compressor 21 is still liable to occur in the case that operation is continued for a long period of time under conditions in which the above-described insufficient refrigerant-circulation rate readily occurs, and/or when the first usage-side discharge on-off valve 55a and/or the first usage-side gas on-off valve 56a constituting the first usage-side switching mechanism 53a has not been sufficiently closed off, or due to some other factor.

In view whereof, in this heat pump system 200, a refrigerant recovery operation in which the first usage-side heat exchanger 41a is made to function as a radiator of the heat-source-side refrigerant is performed by setting the first usage-side switching mechanism 53a in an aqueous medium-heating operation state (step S32), in the case that the first usage-side switching mechanism 53a is in an aqueous medium cooling operation state and at least the second usage unit 10a is operating, and in the case that it has been determined that the flow rate of the heat-source-side refrigerant taken into the heat-source-side compressor 21 is insufficient (step S31), in the same manner as Modification 8 of the first embodiment, as shown in FIG. 10. Here, in relation to determining whether the flow rate of the heat-source-side refrigerant being taken into the heat-source-side compressor 21 is insufficient, an insufficient refrigerant-circulation rate is determined to have occurred when, e.g., the heat-source-side intake pressure Ps1 is equal to or less than the predetermined refrigerant circulation-rate insufficiency pressure Prc1. Also, the state of operation prior to the refrigerant recovery operation is maintained in relation to the operation of the second usage unit 10a during the refrigerant recovery operation. After the refrigerant recovery operation has been performed for a predetermined refrigerant recovery operation time trc1 (step S33), the first usage unit 4a is restored to the operation state that existed prior to the refrigerant recovery operation (step S34).

In this heat pump system 200, the heat-source-side refrigerant is thereby made less likely to stagnate in the discharge refrigerant communication tube 12, and since the heat-source-side refrigerant is less likely to stagnate in the first usage-side heat exchanger 41a, it is therefore possible to minimize the occurrence of an insufficient refrigerant-circulation rate in the heat-source-side refrigerant circuit 20.

(8) Modification 8

In the heat pump systems 200 (see FIGS. 17 to 19) in the Modifications 2 to 7, the first usage-side switching mechanism 53a is composed of the first usage-side discharge on-off valve 55a and the first usage-side gas on-off valve 56a, and the heat-source-side refrigerant is therefore fed from only the discharge refrigerant communication tube 12 to the first usage unit 4a in any operation mode that accompanies a hot-water supply operation.

However, the heat-source-side refrigerant is at the high pressure of the refrigeration cycle not only in the discharge refrigerant communication tube 12, but also in the gas refrigerant communication tube 14 in the hot-water supply operation mode and/or the hot-water supply/air-warming operation mode among the operation modes that accompany hot-water supply operation. Therefore, it is also possible to allow high-pressure, heat-source-side refrigerant to be sent from not only the discharge refrigerant communication tube 12, but also from the gas refrigerant communication tube 14 to the first usage unit 4a in the hot-water supply operation mode and/or the hot-water supply/air-warming operation mode.

Figure 20:
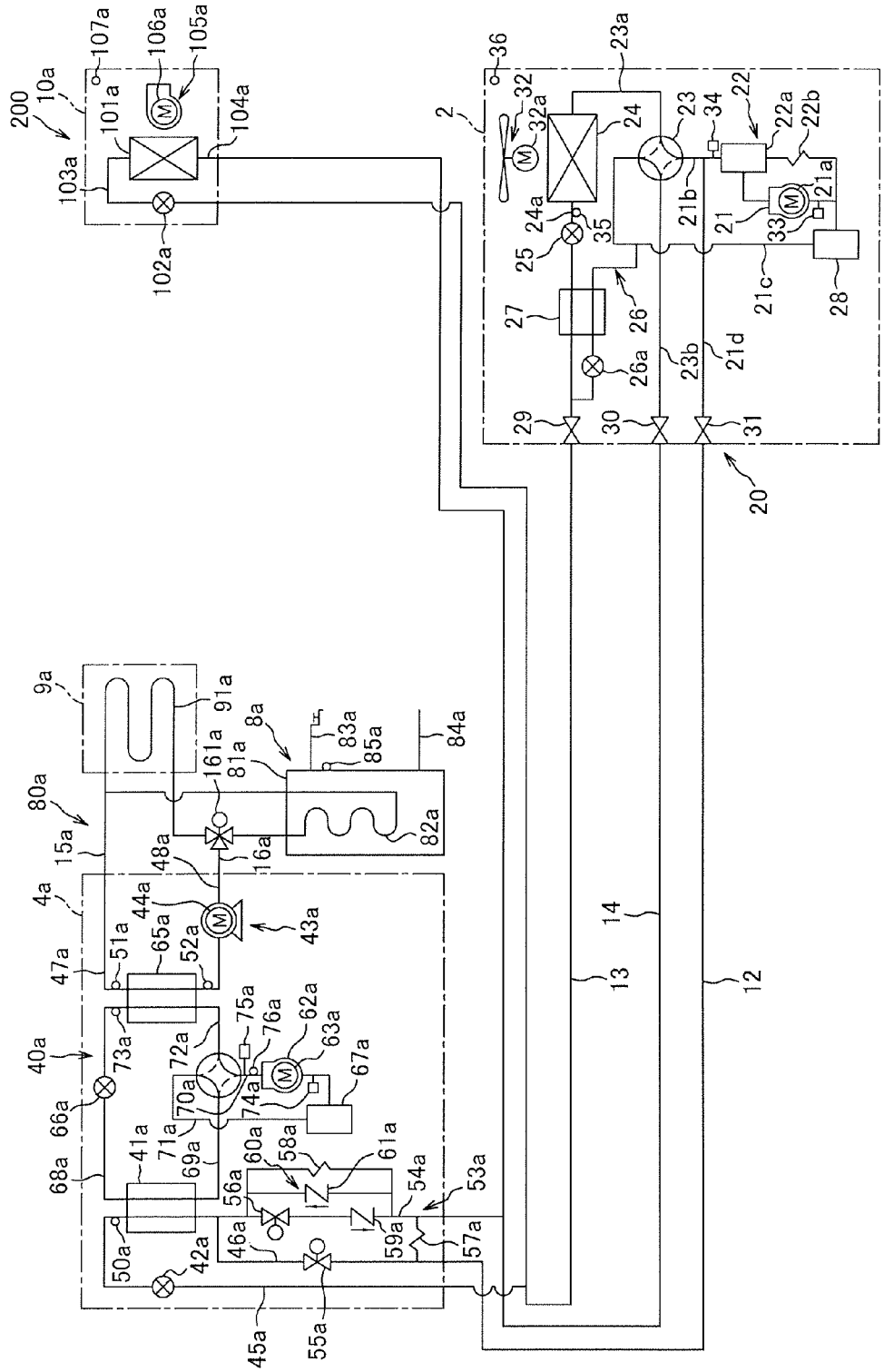
FIG. 20 is a view showing the general configuration of the heat pump system according to Modification 8 of the second embodiment.

In view of the above, in this heat pump system 200, the first usage-side gas non-return valve 59a and the first usage-side bypass refrigerant tube 60a are furthermore provided to the first usage-side gas refrigerant tube 54a, and together with the first usage-side discharge on-off valve 55a and the first usage-side gas on-off valve 56a, constitute the first usage-side switching mechanism 53a, as shown in FIG. 20, in the same manner as Modification 9 of the first embodiment (see FIG. 11).

In this heat pump system 200, high-pressure, heat-source-side refrigerant can thereby be sent from not only the discharge refrigerant communication tube 12, but also from the gas refrigerant communication tube 14 to the first usage unit 4a in the hot-water supply operation mode and the hot-water supply/air-warming operation mode. Therefore, the loss of pressure of the heat-source-side refrigerant fed from the heat source unit 2 to the first usage unit 4a is reduced, contributing to an improvement in the hot-water supply capacity and operation efficiency.

(9) Modification 9

Figure 21:
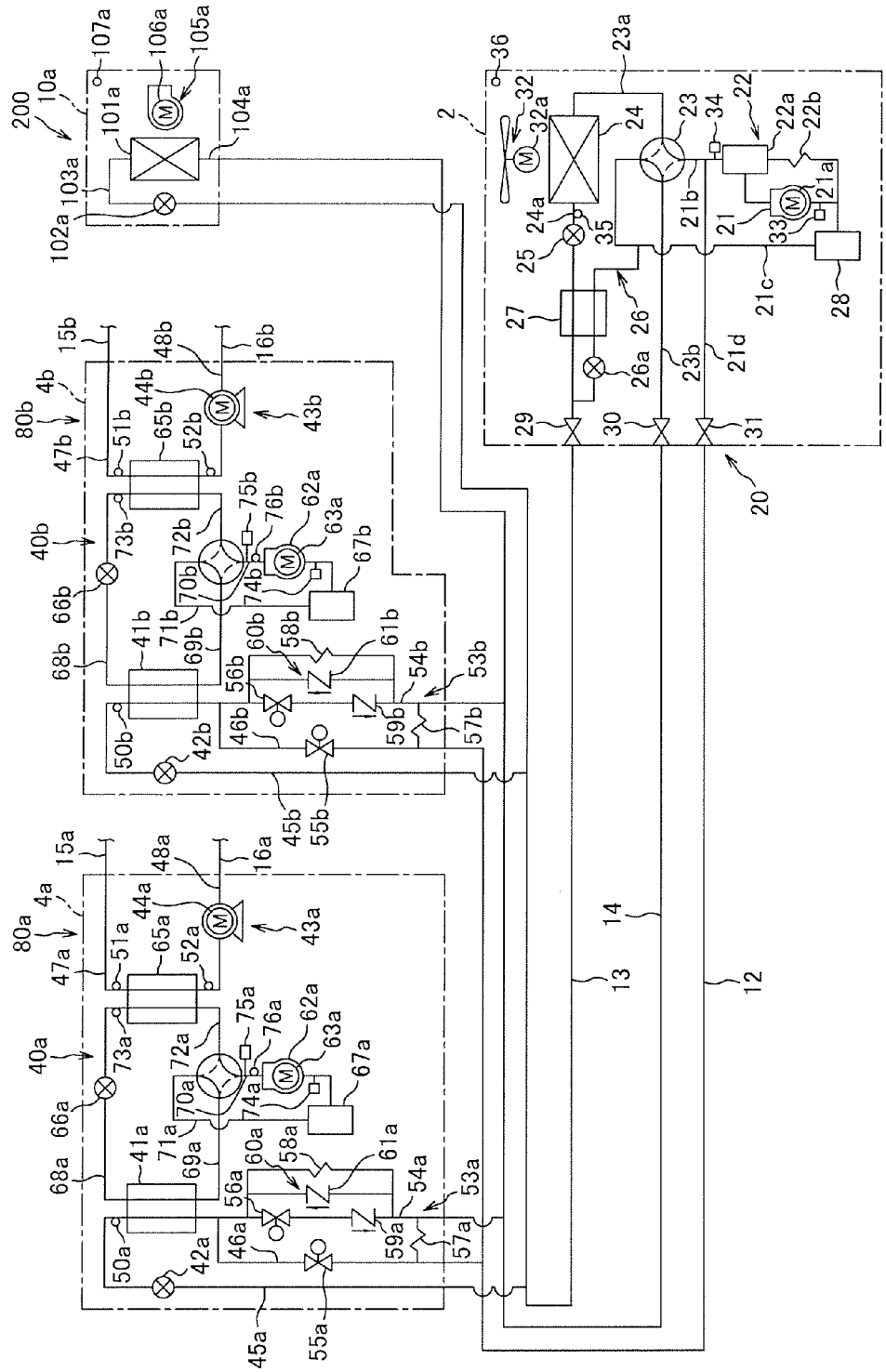
FIG. 21 is a view showing the general configuration of the heat pump system according to Modification 9 of the second embodiment.
Figure 22:
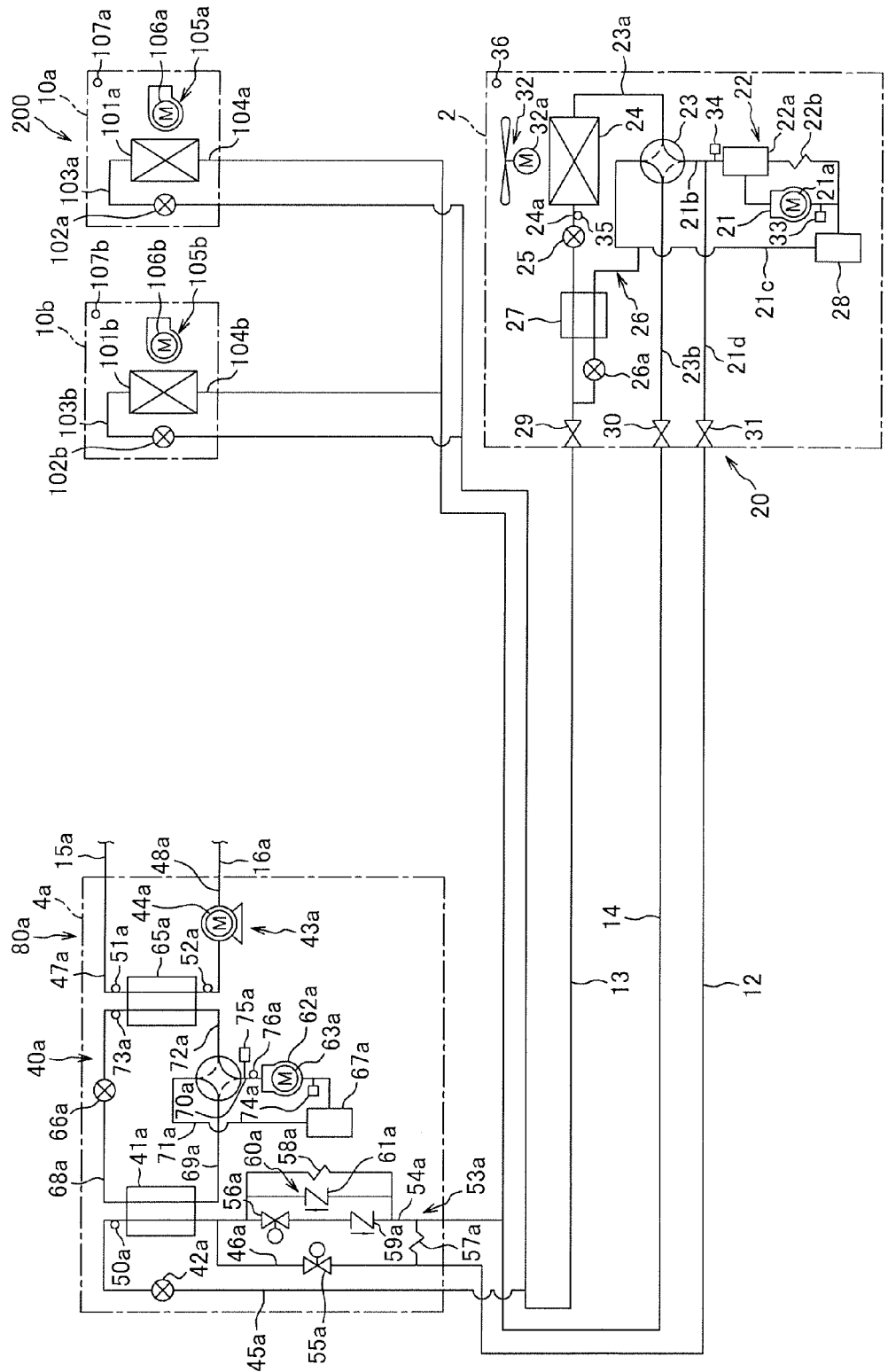
FIG. 22 is a view showing the general configuration of the heat pump system according to Modification 9 of the second embodiment.
Figure 23:
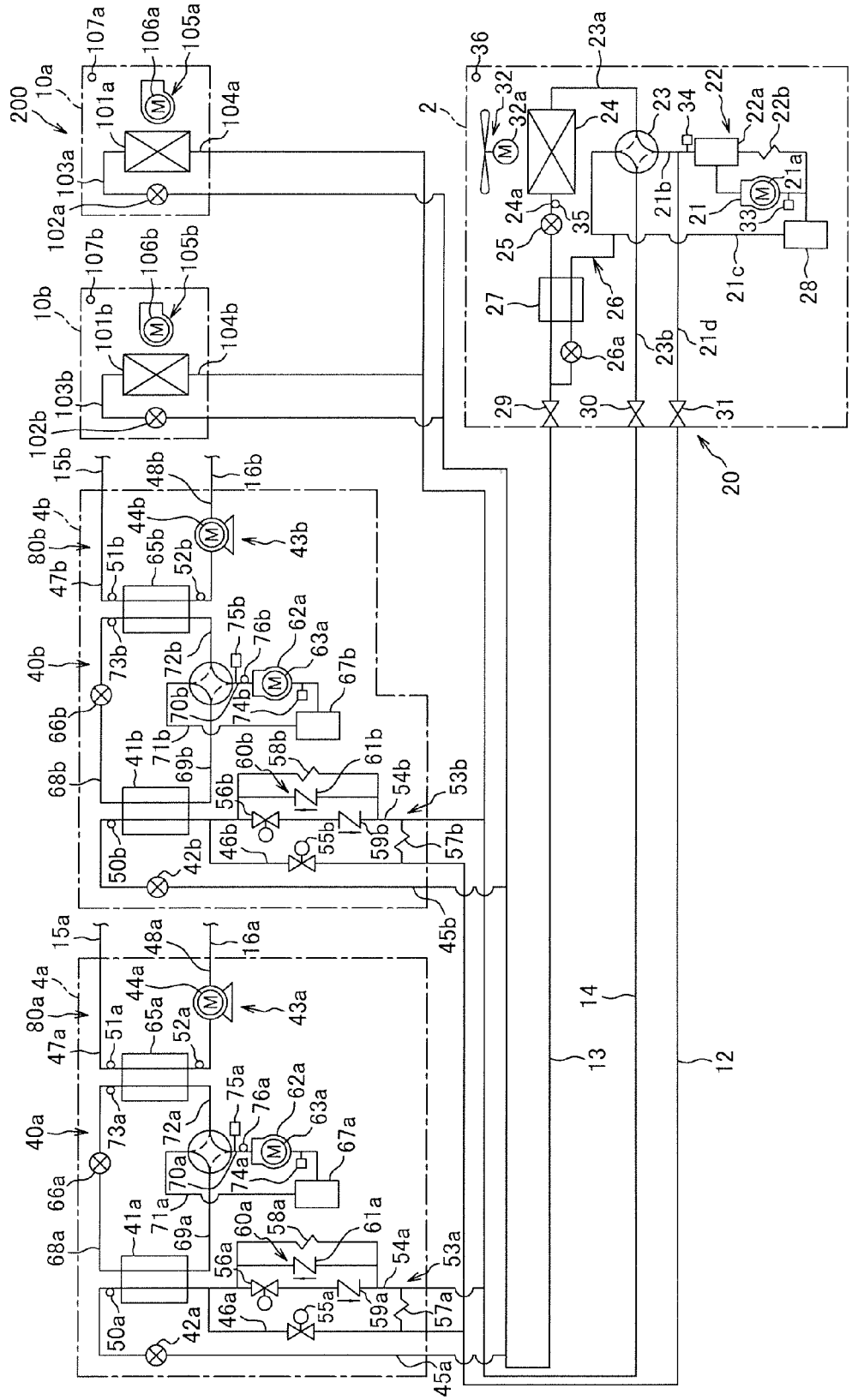
FIG. 23 is a view showing the general configuration of the heat pump system according to Modification 9 of the second embodiment.
Figure 24:
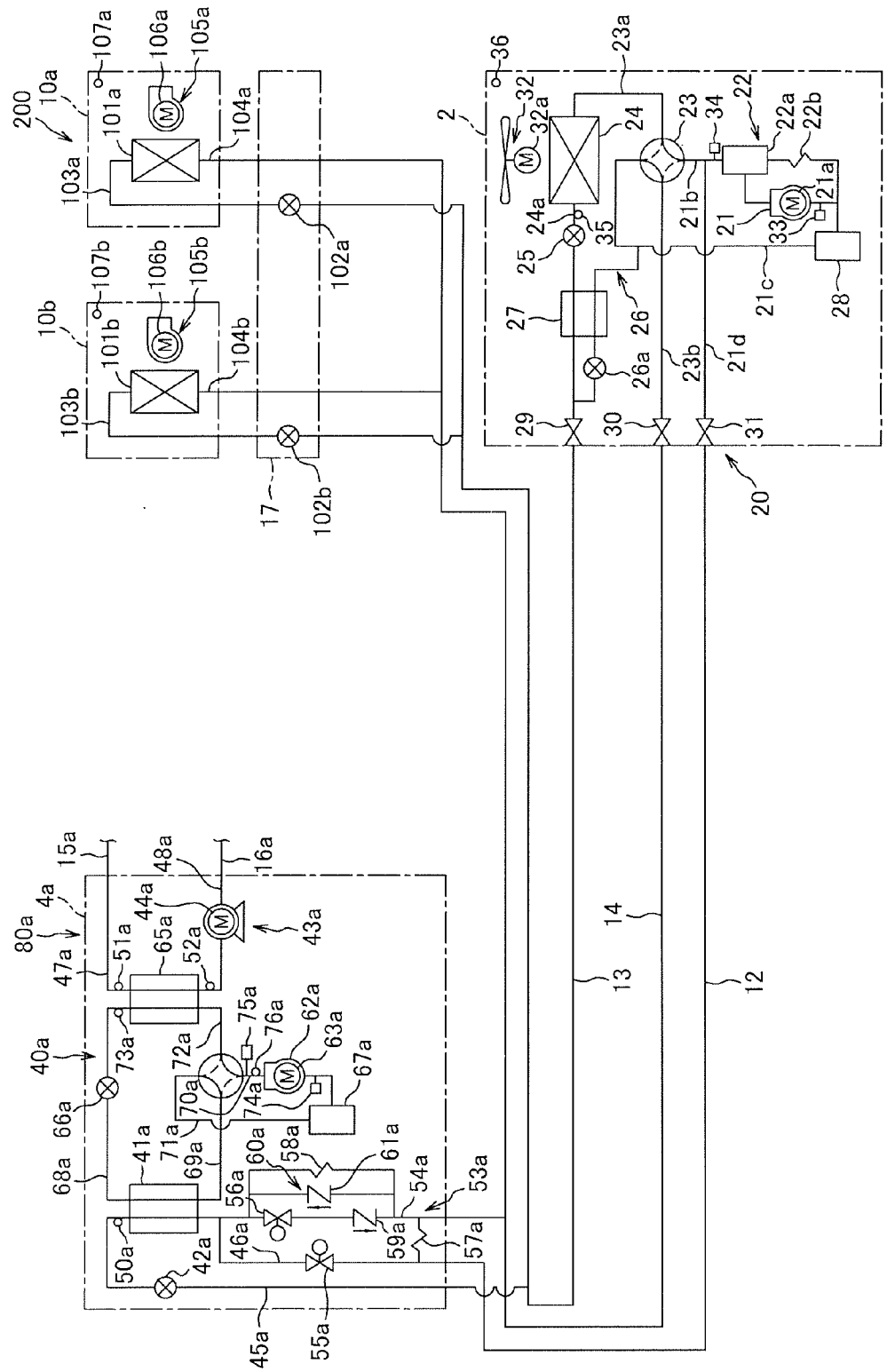
FIG. 24 is a view showing the general configuration of the heat pump system according to Modification 10 of the second embodiment.

In the heat pump systems 200 described above (see FIGS. 17 to 20), a single first usage unit 4a and a single second usage unit 10a are connected to the heat source unit 2 via the refrigerant communication tubes 12, 13, 14, but a plurality (two, in this case) of first usage units 4a, 4b may be connected in parallel to each other via the refrigerant communication tubes 12, 13, 14, and/or a plurality of (two, in this case) second usage units 10a, 10b may be connected in parallel to each other via the refrigerant communication tubes 12, 14 in the same manner as Modification 10 of the first embodiment (see FIGS. 12 to 14), as shown in FIGS. 21 to 23 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10a, and a description of each part of the second usage unit 10b is therefore omitted.

In these heat pump systems 200, it is possible to accommodate a plurality of locations and/or applications that require heating of the aqueous medium, and it is possible to accommodate a plurality of locations and/or applications that require cooling of the air medium.

(10) Modification 10

In the heat pump systems 200 described above (see FIGS. 17 to 21), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 24 (in this case, the hot-water/air-warming unit, the hot-water storage unit, the aqueous medium circuits 80a, and the like are not shown).

Other Embodiments Embodiments of the present invention and modifications thereof were described above with reference to the drawings, but specific configurations are not limited to these embodiments and modifications thereof, and it is possible to make modifications within a range that does not depart from the spirit of the invention.

<A>

In the heat pump system 1 of the first embodiment and modifications thereof, the gas-refrigerant communication tube 14 may be used as a refrigerant tube in which low-pressure, heat-source-side refrigerant flows in the refrigeration cycle by, e.g., placing the second heat-source-side gas refrigerant tube 23b and the heat-source-side intake tube 21c in communication, whereby the second usage-side heat exchangers 101a, 101b are made to function only as evaporators of the heat-source-side refrigerant, and the second usage units 10a, 10b are used as cooling-dedicated usage units. In this case as well, operation in the hot-water supply/air-cooling operation mode is possible and energy savings can be ensured.

<B>

In the heat pump system 200 of the second embodiment and modifications thereof, the gas-refrigerant communication tube 14 may be used as a refrigerant tube in which low-pressure, heat-source-side refrigerant flows in the refrigeration cycle by, e.g., placing the second heat-source-side gas refrigerant tube 23b and the heat-source-side intake tube 21c in communication, whereby the second usage-side heat exchangers 101a, 101b are made to function only as evaporators of the heat-source-side refrigerant, and the second usage units 10a, 10b are used as cooling-dedicated usage units. In this case as well, operation in the hot-water supply/air-cooling operation mode is possible and energy savings can be ensured.

<C>

In the heat pump systems 1, 200 of the first and second embodiments and modifications thereof, the second usage units 10a, 10b may be used for refrigeration and/or freezing, and purposes other than air cooling and air warming, rather than as usage units used for indoor air cooling and air warming.

<D>

In the heat pump system 200 of the second embodiment and modifications thereof, HFC-134a is used as the usage-side refrigerant, but no limitation is imposed thereby, and it is also possible to use, e.g., HFO-1234yf (2,3,3,3-tetrafluoro-1-propene) or another refrigerant in which the pressure that corresponds to a saturated gas temperature of 65° C. is a maximum gauge pressure of 2.8 MPa or less, preferably 2.0 MPa or less.

INDUSTRIAL APPLICABILITY

The use of the present invention makes it possible to ensure energy savings in a heat pump system that can heat an aqueous medium using a heat pump cycle.

What is claimed is:

1. A heat pump system comprising:
a heat source unit having
a heat-source-side compressor arranged to compress a heat-source-side refrigerant,
a heat-source-side heat exchanger, and
a heat-source-side switching mechanism switchable between
a heat-source-side radiating operation state in which said heat-source-side heat exchanger functions as a radiator of a heat-source-side refrigerant, and
a heat-source-side evaporating operation state in which said heat-source-side heat exchanger functions as an evaporator of the heat-source-side refrigerant;
a discharge refrigerant communication tube capable of directing the heat-source-side refrigerant to the outside of said heat source unit from a discharge of said heat-source-side compressor in said heat-source-side radiating operation state and said heat-source-side evaporating operation state of said heat-source-side switching mechanism;
a liquid refrigerant communication tube capable of
directing the heat-source-side refrigerant to the outside of said heat source unit from an outlet of said heat-source-side heat exchanger functioning as a radiator of the heat-source-side refrigerant in said heat-source-side radiating operation state of said heat-source-side switching mechanism, and
introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism;
a gas refrigerant communication tube capable of introducing the heat-source-side refrigerant into an intake of said heat-source-side compressor from outside said heat source unit;
a first usage unit directly connected only to said discharge refrigerant communication tube and said liquid refrigerant communication tube among said discharge refrigerant communication tube, said liquid refrigerant communication tube and said gas refrigerant communication tube, the first usage unit having a first usage-side heat exchanger capable of functioning as a radiator of the heat-source-side refrigerant introduced from said discharge refrigerant communication tube, and the first usage unit being capable of performing operation in which
the heat-source-side refrigerant radiated in said first usage-side heat exchanger is directed to said liquid refrigerant communication tube, and
an aqueous medium is heated by radiation of the heat-source-side refrigerant in said first usage-side heat exchanger;
a second usage unit directly connected only to said liquid refrigerant communication tube and said gas refrigerant communication tube among said discharge refrigerant communication tube, said liquid refrigerant communication tube and said gas refrigerant communication tube, the second usage unit having a second usage-side heat exchanger capable of functioning as an evaporator of the heat-source-side refrigerant introduced from said liquid refrigerant communication tube in said heat-source-side radiating operation state of said heat-source-side switching mechanism, and the second usage unit being capable of
directing the heat-source-side refrigerant evaporated in said second usage-side heat exchanger to said gas refrigerant communication tube, and performing operation in which an air medium is cooled by evaporation of the heat-source-side refrigerant in said second usage-side heat exchanger, the heat-source-side refrigerant radiated in said first usage-side heat exchanger being introduced to said second usage-side heat exchanger through the liquid refrigerant communication tube so as to utilize heat of cooling that the heat-source-side refrigerant obtained by heating the aqueous medium in said first usage-side heat exchanger for cooling the air medium by evaporation of the heat-source-side refrigerant in said second usage-side heat exchanger, said first usage unit performing operation in which the aqueous medium is heated by radiation of the heat-source-side refrigerant in said first usage-side heat exchanger when said second usage unit performs operation in which the air medium is cooled by evaporation of the heat-source-side refrigerant in said second usage-side heat exchanger; and a hot-water storage unit arranged to store the aqueous medium heated in said first usage unit, or the aqueous medium heated by heat exchange with the aqueous medium heated in said first usage unit, said first usage unit being configured to start operation in which the aqueous medium being heated by radiation of the heat-source-side refrigerant in said first usage-side heat exchanger when a hot-water storage temperature is equal to or less than a predetermined set temperature for hot-water storage, the hot water storage temperature being a temperature of the aqueous medium stored in said hot-water storage unit.

2. The heat pump system according to claim 1, wherein said gas refrigerant communication tube is capable of
introducing the heat-source-side refrigerant to an intake of said heat-source-side compressor from outside said heat source unit in said heat-source-side radiating operation state of said heat-source-side switching mechanism, and directing the heat-source-side refrigerant to the outside of said heat source unit from a discharge of said heat-source-side compressor in said heat-source-side evaporating operation state of said heat-source-side switching mechanism; and said second usage unit is capable of performing operation in which
said second usage-side heat exchanger functions as a radiator of the heat-source-side refrigerant introduced from said gas refrigerant communication tube in said heat-source-side evaporating operation state of said heat-source-side switching mechanism,
the heat-source-side refrigerant radiated in said second usage-side heat exchanger is directed to said liquid refrigerant communication tube, and
the air medium is heated by radiation of the heat-source-side refrigerant in said second usage-side heat exchanger.

* * * * *